(12) United States Patent
Weeks et al.

(10) Patent No.: US 12,443,904 B2
(45) Date of Patent: *Oct. 14, 2025

(54) COMPUTER SYSTEM AND METHOD FOR COORDINATING PROCESS OF CREATING AND MANAGING A PUNCH ITEM

(71) Applicant: Procore Technologies, Inc., Carpinteria, CA (US)

(72) Inventors: Mark Weeks, Santa Barbara, CA (US); Nicholas Murphy, Santa Barbara, CA (US); Steven Kang, Porter Ranch, CA (US); Arsh Kaur, Oxnard, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/492,741

(22) Filed: Oct. 23, 2023

(65) Prior Publication Data

US 2024/0135290 A1 Apr. 25, 2024
US 2024/0232764 A9 Jul. 11, 2024

Related U.S. Application Data

(63) Continuation of application No. 17/537,224, filed on Nov. 29, 2021, now Pat. No. 11,797,900, which is a
(Continued)

(51) Int. Cl.
*G06Q 10/0633* (2023.01)
*G06F 3/0482* (2013.01)
(Continued)

(52) U.S. Cl.
CPC ....... *G06Q 10/0633* (2013.01); *G06F 3/0482* (2013.01); *G06Q 10/063114* (2013.01); *G06Q 50/08* (2013.01)

(58) Field of Classification Search
None
See application file for complete search history.

(56) References Cited

U.S. PATENT DOCUMENTS

| 2010/0077316 A1* | 3/2010 | Omansky | G06Q 10/10 |
| | | | 345/173 |
| 2017/0053244 A1* | 2/2017 | Khalil | G06Q 10/1097 |

FOREIGN PATENT DOCUMENTS

AU 2014365836 B2 * 4/2020 ......... G06F 17/5004

OTHER PUBLICATIONS

Michael G. Tribe, Effective Capital Project Commissioning, 2008, Conference Record of 2008 54th Annual Pulp and Paper Industry Technical Conference (Year: 2008).*
(Continued)

*Primary Examiner* — Jerry O'Connor
*Assistant Examiner* — Matthew H Divelbiss
(74) *Attorney, Agent, or Firm* — Lee Sullivan Shea & Smith LLP

(57) ABSTRACT

A punch item management tool may be provided that coordinates and guides the process of taking a punch item from creation to completion. As one possibility, the punch item management tool may coordinate and guide the interactions between a creator of a punch item, a punch item manager for the punch item, and one or more assignees that are expected to perform work on the punch item. As another possibility, the punch item management tool may coordinate and guide the interactions between an individual serving the dual role of creator and punch item manager for a punch item and one or more assignees that are expected to perform work on the punch item. In either case, the punch item management tool may provide a user interface including various views through which these individuals may interact with one or more punch items.

20 Claims, 81 Drawing Sheets

Related U.S. Application Data continuation of application No. 16/183,703, filed on Nov. 7, 2018, now Pat. No. 11,188,858.

(60) Provisional application No. 62/728,695, filed on Sep. 7, 2018.

(51) Int. Cl.
*G06Q 10/0631* (2023.01)
*G06Q 50/08* (2012.01)

(56) References Cited

OTHER PUBLICATIONS

Procore, "Procore Punch List Interactive Workflow Diagram," retrieved from the Internet: https://support.procore.com/products/online/user-guide/project-level/punch-list, Nov. 7, 2018, 25 pages.
Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

COMPUTER SYSTEM AND METHOD FOR COORDINATING PROCESS OF CREATING AND MANAGING A PUNCH ITEM

CROSS REFERENCE TO RELATED APPLICATIONS

This application claims the benefit of priority under 35 USC § 120 as a continuation of U.S. patent application Ser. No. 17/537,224 filed on Nov. 29, 2021 and entitled, "Computer System and Method for Coordinating Process of Creating and Managing a Punch Item," which is a continuation of U.S. patent application Ser. No. 16/183,703, filed on Nov. 7, 2018 and entitled "Computer System and Method for Coordinating Process of Creating and Managing a Punch Item," which claims priority to U.S. Provisional Patent App. No. 62/728,695, filed on Sep. 7, 2018 and entitled "Computer System and Method for Coordinating Process of Creating and Managing a Punch Item," each of which is incorporated by reference herein in its entirety.

BACKGROUND

A construction project typically includes various different phases, examples of which include an initiation phase, a planning phase, an execution phase, performance and monitoring phases, and a closure phase that may also be referred to as the "punch list" phase (or "defect list" phase in some geographies). During the punch list phase—which typically occurs immediately prior to completion of the construction project—a "punch list" is prepared to list any remaining tasks that must be completed before the construction project can be deemed to have been satisfactory completed and closed out (e.g., tasks not conforming to contract specifications). The individual tasks included on a punch list are typically referred to as "punch items" or "defect items." (For purposes of this disclosure, the use of the term "punch item" should be understood to cover a "defect item" and/or any other term that may be used to describe a task associated with a construction project). If these punch items are not completed in a timely manner, the individuals responsible for the construction project (e.g., contractors, project managers, etc.) may incur financial loss (e.g., by triggering liability for liquidated damages) and also risk damaging their reputation and/or business relationships.

OVERVIEW

In conventional practice, a punch list for a construction project was a handwritten document that was created and then managed in hard copy form. This approach gave rise to several efficiency issues, including difficulties and delays associated with distributing the hard copy punch list to individuals that were responsible for ensuring that the punch items were completed in a timely manner as well as difficulties associated with managing the execution of the punch items on the punch list across multiple different construction teams or individual workers.

More recently, software technology has become available that allows for a punch list to be created and managed electronically. For example, Procore Technologies, Inc., who is the assignee of the present application, offers construction management software that includes a "Punch List" tool for creating and managing punch lists for a construction project. This software technology has significantly improved the process of creating and managing punch lists over conventional hard-copy approaches.

Building on this software technology for creating and managing punch lists electronically, disclosed herein is a punch list management tool that coordinates and guides the process of taking a punch item from creation to completion, by facilitating interaction between individuals serving different roles with respect to a punch item.

For instance, in one aspect, disclosed herein is a computing system (such as a back-end platform) that is configured to interact with client stations in order to provide a punch item management tool that coordinates and guides the interactions between a creator of a punch item, a punch item manager for the punch item, and one or more assignees of the punch item. This aspect of the disclosed punch item management tool may be referred to as the "Full" workflow.

According to an example "Full" workflow, the computing system may first receive, from a first client station associated with a creator of one or more new punch items, a request that a given punch item be sent to a punch item manager (e.g., a punch item that was created based on user input by the creator at the first client station). In this respect, the request that the given punch item be sent to the punch item manager may be received either as a standalone request or as part of a bulk request to send a plurality of punch items created by the creator to the punch item manager, among other possibilities.

After receiving the request that the given punch item be sent to the punch item manager, the computing system may determine that responsibility for the given punch item has transitioned from the creator to the punch item manager, cause a second client station associated with the punch item manager to display an indication that the punch item manager has responsibility for the given punch item, and receive, from the second client station, a request that the given punch item be assigned to one or more assignees that are each expected to perform respective work on the given punch item. In this respect, the request that the given punch item be assigned to the one or more assignees may be received either as a standalone request or as part of a bulk request to assign a plurality of punch items for which the punch item manager has responsibility.

After receiving the request that the given punch item be assigned to the one or more assignees, the computing system may determine that responsibility for the given punch item has transitioned from the punch item manager to the one or more assignees, cause a respective client station associated with each of the one or more assignees to display an indication that the respective assignee has responsibility for the given punch item, and receive, from the respective client station associated with each of the one or more assignees, a respective indication that the respective work performed by the assignee is ready for review by the punch item manager.

After receiving, for each of the one or more assignees, the respective indication that the respective work performed by the assignee is ready for review by the punch item manager, the computing system may determine that responsibility for the given punch item has transitioned from the one or more assignees back to the punch item manager, cause the second client station to display an indication that the punch item manager again has responsibility for the given punch item, and receive, from the second client station, an indication that the punch item manager has accepted the respective work performed by each of the one or more assignees.

After receiving the indication that the punch item manager has accepted the respective work performed by each of the one or more assignees, the computing system may determine that responsibility for the given punch item has transitioned from the punch item manager back to the creator, cause the first client station to display an indication that the creator again has responsibility for the given punch item, and receive, from the first client station, a request to close the given punch item, after which time the computing system may determine that the given punch item is closed.

As part of the "Full" workflow, the computing system may also be configured to perform various other functions as well.

For example, the computing system may be configured such that (a) after receiving the request that the given punch item be sent to the punch item manager, the computing system determines that the given punch item has transitioned from a draft state to an initiated state and causing one or both of the first client station or the second client station to display an indication that the given punch item has transitioned from the draft state to the initiated state, (b) after receiving the request that the given punch item be assigned to the one or more assignees, the computing system determines that the given punch item has transitioned from the initiated state to a work-required state and causing one or more of the second client station or the respective client station associated with each of the one or more assignees to display an indication that the given punch item has transitioned from the initiated state to the work-required state, (c) after receiving, for each of the one or more assignees, the respective indication that the respective work performed by the assignee is ready for review by the punch item manager, the computing system determines that the given punch item has transitioned from the work-required state to a ready-for-review state and causing one or more of the respective client station associated with each of the one or more assignees or the second client station to display an indication that the given punch item has transitioned from the work-required state to the ready-for-review state, and (d) after receiving the indication that the punch item manager has accepted the respective work performed by each of the one or more assignees, the computing system determines that the given punch item has transitioned from the ready-for-review state to a ready-to-close state and causing one or more of the second client station or the first client station to display an indication that the given punch item has transitioned from the ready-for-review state to the ready-to-close state.

As another example, the computing system may be configured such that before it receives the request that the given punch item be assigned to the one or more assignees, the computing system (a) receives, from the second client station, an indication that the punch item manager has disputed the given punch item, (b) determines that responsibility for the given punch item has transitioned from the punch item manager back to the creator, causes the first client station to display an indication that the creator again has responsibility for the given punch item; and receives, from the first client station, a request to return the given punch item to the punch item manager, and (c) causes the second client station to display an indication that the punch item manager again has responsibility for the given punch item.

As yet another example, the computing system may be configured such that before it receives the indication that the punch item manager has accepted the respective work performed by each of the one or more assignees, the computing system (a) receives, from the second client station, an indication that the punch item manager has declined to accept the respective work performed by a given assignee of the one or more assignees, (b) determines that responsibility for the given punch item has transitioned from the punch item manager back to the given assignee, causes the respective client station associated with the given assignee to display an indication that the given assignee again has responsibility for the given punch item, and receives, from the respective client station associated with the given assignee, an indication that the respective work performed by the given assignee is again ready for review by the punch item manager, and (c) causes the second client station to display an indication that the punch item manager once again has responsibility for the given punch item.

As still another example, the computing system may be configured such that before it receives the request to close the given punch item, the computing system (a) receives, from the first client station, an indication that the creator has declined to close the given punch item in its current state, (b) determines that responsibility for the given punch item has transitioned from the creator back to the punch item manager, causes the second client station to display an indication that the punch item manager again has responsibility for the given punch item, and receives, from the second client station, a request that the given punch item be sent back to the one or more assignees, (c) determines that responsibility for the given punch item has transitioned from the punch item manager back to the one or more assignees, causes the respective client station associated with each of the one or more assignees to display a respective indication that the respective assignee again has responsibility for the given punch item, and receives, from the respective client station associated with each of the one or more assignees, a respective indication that the respective work performed by the assignee is again ready for review by the punch item manager, (d) determines that responsibility for the given punch item has again transitioned from the one or more assignees back to the punch item manager, causes the second client station to display an indication that the punch item manager again has responsibility for the given punch item, and receives, from the second client station, an indication that the punch item manager has again accepted the respective work performed by each of the one or more assignees, and (e) causes the first client station to display an indication that the creator again has responsibility for the given punch item.

As a further example, the computing system may be configured such that before it receives the request to close the given punch item, the computing system (a) receives, from the first client station, an indication that the creator has declined to close the given punch item in its current state, (b) determines that responsibility for the given punch item has transitioned from the creator back to the punch item manager, causes the second client station to display an indication that the punch item manager again has responsibility for the given punch item, and receives, from the second client station, a request that the given punch item be sent back to the creator, and (c) causes the first client station to display an indication that the creator again has responsibility for the given punch item.

Many other examples of functions performed by the computing system (and/or the client stations) during a "Full" workflow are possible as well.

In another aspect, disclosed herein is a computing system (such as a back-end platform) that is configured to interact with client stations in order to provide a punch item management tool that coordinates and guides the interactions between an individual serving the dual role of creator and punch item manager for a punch item (referred to herein as a Punch Manager-Creator or "PMC") and one or more assignees for the punch item. This aspect of the disclosed punch item management tool may be referred to as the "PMC" workflow.

According to an example "PMC" workflow, the computing system may first receive, from a first client station associated with a PMC for one or more new punch items, a request that a given punch item be assigned to one or more assignees that are each expected to perform respective work on the given punch item (e.g., a punch item that was created based on user input by the PMC at the first client station). In this respect, the request that the given punch item be assigned to the one or more assignees may be received either as a standalone request or as part of a bulk request to assign a plurality of punch items for which the PMC has responsibility.

After receiving the request that the given punch item be assigned to the one or more assignees, the computing system may determine that responsibility for the given punch item has transitioned from the given user to the one or more assignees, cause a respective client station associated with each of the one or more assignees to display an indication that the respective assignee has responsibility for the given punch item, and receive, from the respective client station associated with each of the one or more assignees, a respective indication that the respective work performed by the assignee is ready for review by the given user.

After receiving, for each of the one or more assignees, the respective indication that the respective work performed by the assignee is ready for review by the given user, the computing system may determine that responsibility for the given punch item has transitioned from the one or more assignees back to the given user, cause the first client station to display an indication that the given user again has responsibility for the given punch item, receive, from the first client station, an indication that the given user has accepted the respective work performed by each of the one or more assignees, and receive, from the first client station, a request to close the given punch item, after which time the computing system may determine that the given punch item is closed.

As part of the "PMC" workflow, the computing system may also be configured to perform various other functions as well.

For example, the computing system may be configured such that (a) after receiving the request that the given punch item be assigned to the one or more assignees, the computing system determines that the given punch item has transitioned from an initiated state to a work-required state and causing one or more of the first client station or the respective client station associated with each of the one or more assignees to display an indication that the given punch item has transitioned from the initiated state to the work-required state, (b) after receiving, for each of the one or more assignees, the respective indication that the respective work performed by the assignee is ready for review by the given user, the computing system determines that the given punch item has transitioned from the work-required state to a ready-for-review state and causing one or more of the respective client station associated with each of the one or more assignees or the first client station to display an indication that the given punch item has transitioned from the work-required state to the ready-for-review state, and (c) after receiving the indication that the give user has accepted the respective work performed by each of the one or more assignees, the computing system determines that the given punch item has transitioned from the ready-for-review state to a ready-to-close state and causing the first client station to display an indication that the given punch item has transitioned from the ready-for-review state to the ready-to-close state.

As another example, the computing system may be configured such that before it receives the indication that the given user has accepted the respective work performed by each of the one or more assignees, the computing system (a) receives, from the first client station, an indication that the given user has declined to accept the respective work performed by a given assignee of the one or more assignees, (b) determines that responsibility for the given punch item has transitioned from the given user back to the given assignee, causes the respective client station associated with the given assignee to display an indication that the given assignee again has responsibility for the given punch item; and receives, from the respective client station associated with the given assignee, an indication that the respective work performed by the given assignee is again ready for review by the given user, and (c) after receiving the indication that the respective work performed by the given assignee is again ready for review by the given user, causing the first client station to display an indication that the given user once again has responsibility for the given punch item.

Many other examples of functions performed by the computing system (and/or the client stations) during a "PMC" workflow are possible as well.

Further, disclosed herein are computer-implemented methods that involve the functions carried out by a computing system and/or a client station in order to provide the disclosed punch list management tool, including but not limited to the functions discussed above.

Further yet, disclosed herein are computer-readable media provisioned with software that is executable to cause a computing system and/or a client station to carry out functions for providing the disclosed punch list management tool, including but not limited to the functions discussed above.

Accordingly, the punch list management tool and associated systems and methods disclosed herein may provide various improvements to the existing approaches for managing a punch item. For example, the disclosed punch list management tool may provide for improved coordination of the work that needs to be performed and the approvals that need to be submitted in order to close punch items, which may enable the punch items to be closed more quickly and efficiently (and may in turn result in fewer monetary or reputational damages that may result from incomplete or improperly completed punch items). As another example, the disclosed punch management may provide certain individuals with the ability to quickly check the update-to-date status and/or history of punch items, which helps to avoid issues that may otherwise arise if individuals are acting based on out-of-date or incomplete information. There are various other advantages associated with the disclosed punch list management tool as well.

One of ordinary skill in the art will appreciate these as well as numerous other aspects in reading the following disclosure.

BRIEF DESCRIPTION OF THE DRAWINGS

FIG. 4B depicts another example of a view that may be presented to a creator while a punch item is in a "Draft" state.

FIG. 5C depicts another example of a view that may be presented to a punch item manager while a punch item is in an "Initiated" state.

FIG. 5E depicts another example of a view that may be presented to a punch item manager while a punch item is in an "Initiated" state.

FIG. 6B depicts another example of a view that may be presented to a creator while a punch item is in an "In Dispute" state.

FIG. 7E depicts another example of a view that may be presented to a punch item manager after a punch item has returned to an "Initiated" state.

FIG. 8D depicts another example of a view that may be presented to an assignee while a punch item is in a "Work Required" state.

FIG. 8E depicts another example of a view that may be presented to an assignee while a punch item is in a "Work Required" state.

FIG. 10D depicts another example of a view that may be presented to an assignee while a punch item is in a "Work Not Accepted" state.

FIG. 11E depicts another example of a view that may be presented to a punch item manager while a punch item is in a "Ready for Review" state.

FIG. 12D depicts another example of a view that may be presented to a creator while a punch item is in a "Ready to Close" state.

FIG. 13B depicts another example of a view that may be presented to a punch item manager while a punch item is in a "Not Accepted" state.

FIG. 13D depicts another example of a view that may be presented to a punch item manager while a punch item is in a "Not Accepted" state.

FIG. 14B depicts another example of a view that may be presented to a creator after a punch item has been returned to a "Ready to Close" state.

FIG. 16A depicts one example of a view that may be presented to a punch manager-creator (or "PMC") while a punch item is in a dual "Draft"/"Initiated" state.

FIG. 16C depicts another example of a view that may be presented to a PMC while a punch item is in a dual "Draft"/"Initiated" state.

FIG. 17B depicts another example of a view that may be presented to an assignee while a punch item is in a "Work Required" state.

FIG. 18B depicts another example of a view that may be presented to a PMC while a punch item is in a "Work Not Accepted" state from a "Ready for Review" state.

FIG. 19B depicts another example of a view that may be presented to an assignee while a punch item is in a "Work Not Accepted" state.

FIG. 19D depicts another example of a view that may be presented to an assignee while a punch item is in a "Work Not Accepted" state.

FIG. 21B depicts another example of a view that may be presented to a PMC while a punch item is in a "Ready to Close" state.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

As discussed above, the present disclosure is generally directed to software technology for managing construction projects. In practice, this software technology may include both front-end construction management software that runs on client stations of individuals responsible for construction projects (e.g., contractors, project managers, etc.) and a back-end platform that interacts with and/or drives the front-end software, which may be operated (either directly or indirectly) by the provider of the construction management software.

In general, such front-end construction management software may enable an individual responsible for a construction project to perform various tasks related to the management of the construction project, which may take various forms.

According to some implementations, these tasks may include: project schedule management, quality and safety assurance, project financial management, and field productivity management, as some non-limiting examples. Further, such front-end construction management software may take various forms, examples of which may include a native application (e.g., a mobile application) and/or a web application running on a client station, among other possibilities.

Figure 1A:
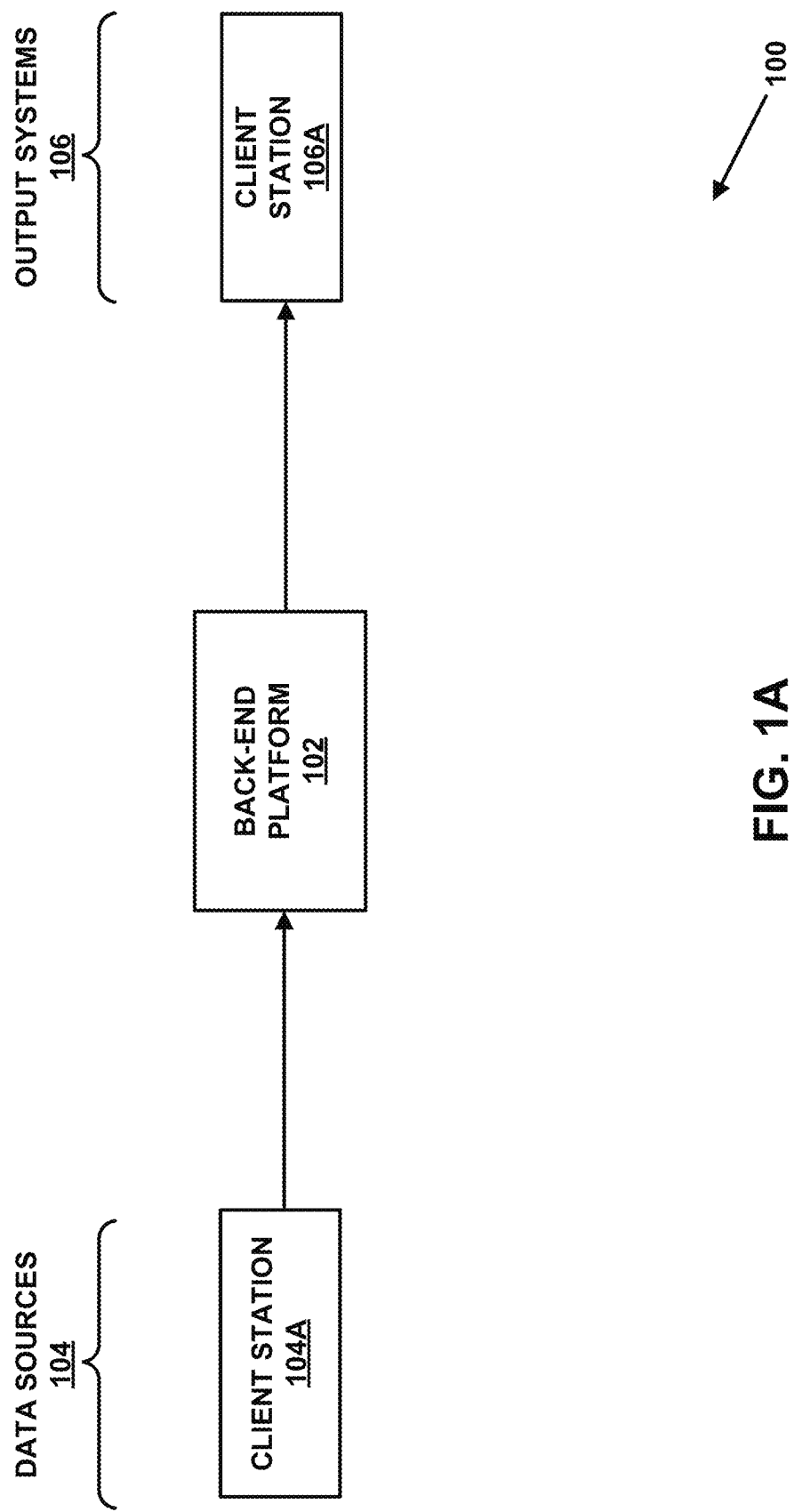
FIG. 1A depicts an example network configuration in which example embodiments may be implemented.

Turning now to the figures, FIG. 1A depicts an example network configuration 100 in which example embodiments may be implemented. As shown in FIG. 1A, network configuration 100 includes a back-end platform 102 that may be communicatively coupled to one or more data sources 104 and one or more output systems 106 via respective communication paths.

Broadly speaking, back-end platform 102 may comprise one or more computing systems that have been provisioned with software for carrying out one or more of the platform functions disclosed herein, including but not limited to receiving data related to a construction project (broadly referred to herein as "project-related data"), performing data analytics operations on the project-related data received from data sources 104, storing project-related data for future access by output systems 106, and transmitting data and/or instructions that cause one or more output systems 106 to output information related to a construction project. The one or more computing systems of back-end platform 102 may take various forms and be arranged in various manners.

For instance, as one possibility, back-end platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates back-end platform 102 may either supply its own cloud infrastructure or may obtain the cloud infrastructure from a third-party provider of "on demand" computing resources, such include Amazon Web Services (AWS) or the like. As another possibility, back-end platform 102 may comprise one or more dedicated servers that have been provisioned with software for carrying out one or more of the platform functions disclosed herein. Other implementations of back-end platform 102 are possible as well.

As described above, back-end platform 102 may be configured to receive project-related data from one or more data sources 104. These data sources—and the project-related data output by such data sources—may take various forms. For instance, as shown in FIG. 1A, one type of data source 104 may take the form of client station 104A, which may comprise any computing device that is configured to receive user input related to a construction project (e.g., information entered by a contractor, architect, delivery person, on-site construction worker, estimator or the like) and then send that user input to back-end platform 102 over the respective communication path between client station 104A and back-end platform 102. In this respect, client station 104A may take any of various forms, examples of which may include a desktop computer, a laptop, a netbook, a tablet, a smartphone, and/or a personal digital assistant (PDA), among other possibilities.

While FIG. 1A illustrates a single input client station 104A, it should be understood that back-end platform 102 may be communicatively coupled to a plurality of different client stations 104A that may provide project-related data to back-end platform 102. Further, although not shown, it should be understood that back-end platform 102 may be configured to receive project-related data from other types of data sources as well.

As shown in FIG. 1A, back-end platform 102 may also be configured to transmit data and/or instructions that cause one or more output systems 106 to output information related to a construction project. These output systems—and the data and/or instructions provided to such output systems—may take various forms. For instance, as shown in FIG. 1, one type of output system 106 may take the form of client station 106A, which may comprise any computing device that is configured to receive project-related data from back-end platform 102 over the respective communication path between client station 106A and back-end platform 102 and then present such data to a user (e.g., via front-end construction management software running on client station 106A). In this respect, client station 106A may take any of various forms, examples of which may include a desktop computer, a laptop, a netbook, a tablet, a smartphone, and/or a PDA, among other possibilities. Further, it should be understood that some client stations may serve as both an input client station 104A and an output client station 106A, while other client stations may only serve as an output client station 106A.

Along with the project-related data that is output for receipt by client station 106A, back-end platform 102 may also output associated data and/or instructions that define the visual appearance of a front-end interface (e.g., a graphical user interface (GUI)) through which the project-related data is to be presented on client station 106A. Such data and/or instructions for defining the visual appearance of a front-end application may take various forms, examples of which may include Hypertext Markup Language (HTML), Cascading Style Sheets (CSS), and/or JavaScript, among other possibilities. However, depending on the circumstance, it is also possible that back-end platform 102 may output project-related data to client station 106A without any associated data and/or instructions for defining the visual appearance of a front-end interface.

Further, client station 106A may receive project-related data from back-end platform 102 in various manners. As one possibility, client station 106A may send a request to back-end platform 102 for certain project-related data and/or a certain front-end interface, and client station 106A may then receive project-related data in response to such a request. As another possibility, back-end platform 102 may be configured to "push" certain types of project-related data to client station 106A, such as scheduled or event-based alerts, in which case client station 106A may receive project-related data from back-end platform 102 in this manner. As yet another possibility, back-end platform 102 may be configured to make certain types of project-related data available via an API, a service, or the like, in which case client station 106A may receive project-related data from back-end platform 102 by accessing such an API or subscribing to such a service. Client station 106A may receive project-related data from back-end platform 102 in other manners as well.

While FIG. 1A illustrates a single output client station 106A, it should be understood that back-end platform 102 may be communicatively coupled to a plurality of different client stations 106A that may receive data and/or instructions from back-end platform 102. Further, although not shown, it should be understood that back-end platform 102 may be configured to communicate with other output systems 106 as well.

As discussed above, back-end platform 102 may communicate with the one or more data sources 104 and one or more output systems 106 over respective communication paths. Each of these communication paths may generally comprise one or more communication networks and/or communications links, which may take any of various forms. For instance, each respective communication path with back-end platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end platform 102 may be wireless, wired, or some combination thereof, and may carry data according to any of various different communication protocols.

Although not shown, the respective communication paths with back-end platform 102 may also include one or more intermediate systems. For example, it is possible that a given data source 104 may send project-related data to one or more intermediary systems, such as an aggregation system, and back-end platform 102 may then be configured to receive the project-related data from the one or more intermediary systems. As another example, it is possible that back-end platform 102 may communicate with a given output system 106 via one or more intermediary systems, such as a host server (not shown). Many other configurations are also possible.

Figure 1B:
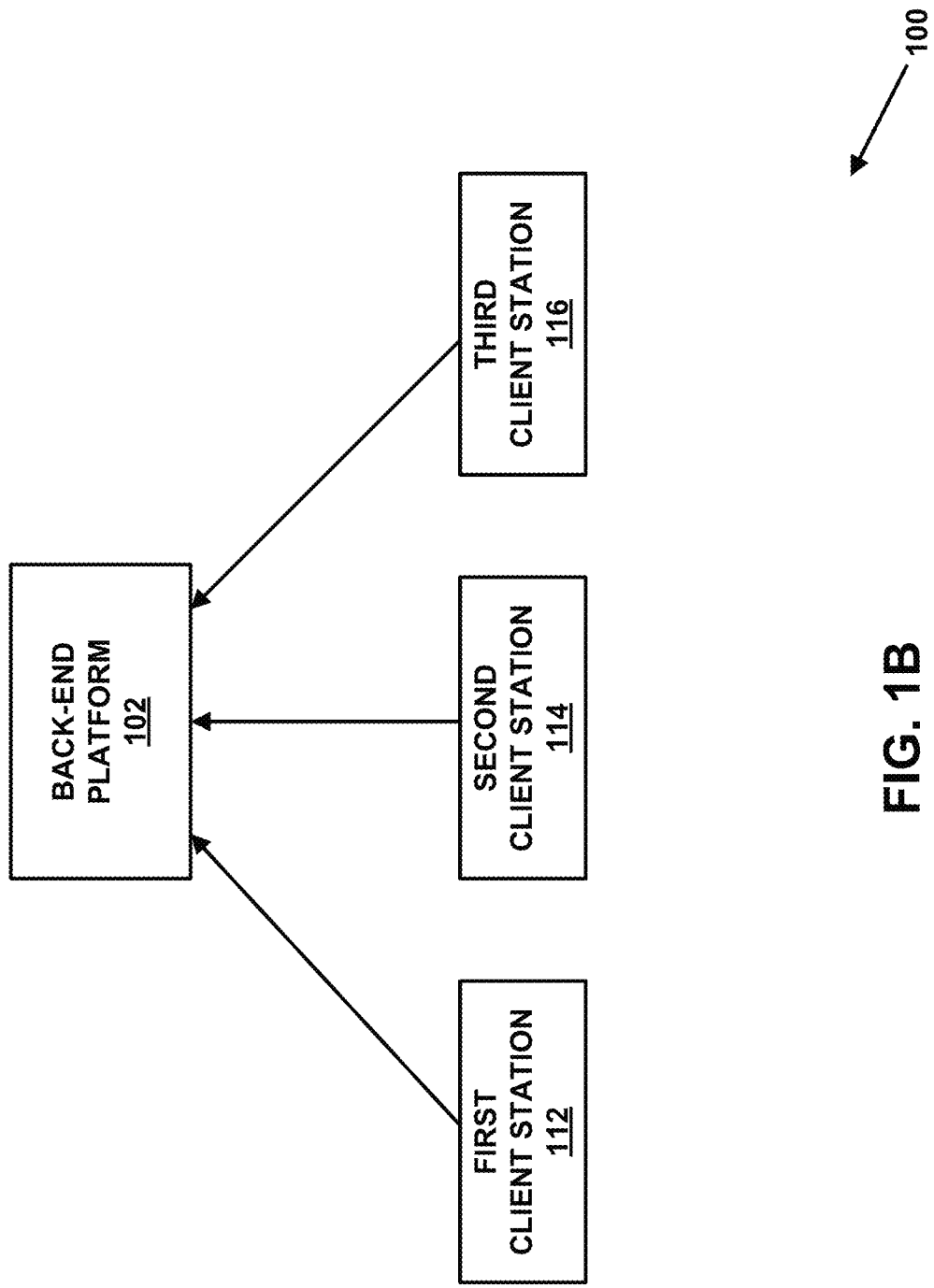
FIG. 1B depicts one possible arrangement of the example network configuration depicted in FIG. 1A.

Turning now to FIG. 1B, one possible arrangement of example network configuration 100 is illustrated. As shown in FIG. 1B, back-end platform 102 that may be communicatively coupled to three client stations 112, 114, and 116, each of which may be capable of operating as both an input client station 104A and an output client station 106A. In such a network configuration, client stations 112, 114, and 116 may each be operated by and/or otherwise associated with a different user. For example, client station 112 may be operated by an individual tasked with the responsibility for creating punch items for a construction project (referred to herein as a "creator"), client station 114 may be operated by an individual tasked with the responsibility for managing punch items (referred to herein as a "punch item manager"), and client station 116 may be operated by an individual tasked with the responsibility for performing work on punch items (referred to herein as an "assignee"). However, client stations 112, 114, and 116 may be operated by and/or otherwise associated with individuals having various other roles with respect to a construction project as well. Further, while FIG. 1B shows an arrangement in which three particular client stations are communicatively coupled to back-end platform 102, it should be understood that an arrangement may include more or less client stations.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
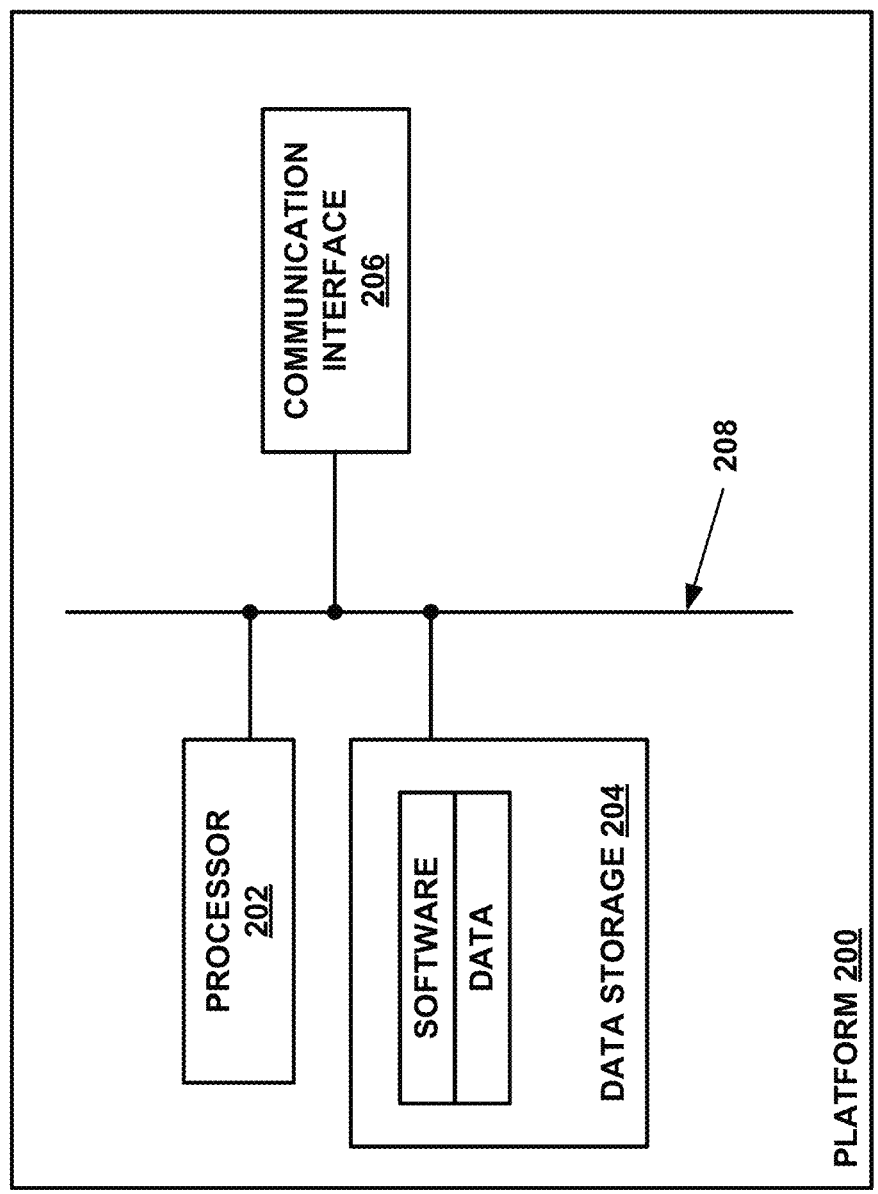
FIG. 2 depicts a simplified block diagram illustrating some structural components that may be included in an example computing platform.

FIG. 2 is a simplified block diagram illustrating some structural components that may be included in an example computing platform 200, which could serve as the back-end platform 102 in FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the platform 200 to carry out the functions disclosed herein. These software components may generally take the form of program instructions that are executable by the processor 202 to carry out the disclosed functions, which may be arranged together into software applications, virtual machines, software development kits, toolsets, or the like. Further, data storage 204 may be arranged to store project-related data in one or more databases, file systems, or the like. Data storage 204 may take other forms and/or store data in other manners as well.

Communication interface 206 may be configured to facilitate wireless and/or wired communication with data sources and output systems, such as data sources 104 and output systems 106 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or track-pad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE OPERATIONS

As discussed above, disclosed herein is software technology for managing a construction project, and more specifically to a punch list management tool that allows users, such as a construction project owner, a punch list owner, general contractor, sub-contractor, etc., to manage one or more punch lists that are created during the course of a construction project.

For purposes of illustration, the disclosed punch list management tool is described below in the context of the particular network arrangement illustrated in FIG. 1A. In this respect, the functions associated with executing the disclosed punch list management tool are described as being carried out by back-end platform 102 and client stations 112, 114, and 116, either alone or in combination. However, it should be understood that the disclosed punch list management tool may be executed in various other network arrangements as well.

At a high level, the punch list management tool disclosed herein may provide a workflow for coordinating and guiding the process of taking a punch item from creation to completion, which may involve transitioning the punch item between different states of the workflow and also transitioning responsibility for the punch item between users that serve different roles with respect to the punch item. In this respect, the different states of a punch item within the disclosed workflow may take various forms, examples of which may include a draft state, an in dispute state, an initiated state, a work required state, a ready for review state, a not accepted state, a ready to close state, and a closed state, along other possibilities. These states of a punch item are described in further detail below.

Likewise, the different user roles with respect to a punch item may take various forms. In one embodiment, the punch list management tool may allow for various roles with respect to a punch item including: (1) a creator role, (2) a punch item manager role, and (3) an assignee role. The creator of a punch item may be the user responsible for creating a punch item, which may be the owner of a construction project or an agent thereof, as examples. The punch item manager of a punch item may be the user responsible for acting as an intermediary between the creator and the assignee of the punch item, which may be the prime or general contractor of the construction project, as an example. The assignee of a punch item may be the user responsible for completing the task specified in the punch item, which may be a sub-contractor or a construction team of the prime contract, as examples. It should also be understood that there may be multiple users that serve a given role with respect to a punch item, and there may also be more or fewer roles than those described above. As one example, there may a "final approver" role for user(s) who have final authority to approve items in the punch list.

As the disclosed punch list management tool guides the process of taking a given punch item from creation to completion, the punch list management tool may enable users to perform certain actions on the given punch item, which may depend on the state of the punch item and/or the role of the user having responsibility for the punch item. These actions may take various forms. As examples, such actions may comprise creating, editing, closing, reviewing, or assigning a given punch item. The actions that may be performed on a punch item may take various other forms as well.

Each state in the disclosed workflow may be associated with a respective set of "views" of the punch item management tool, which may be displayed by a user's client station (e.g., client station 112, 114, or 116). Each view may comprise one or more GUI screens through which a user may interact to perform actions with respect to a punch item, which may be presented to a user in any of various manners. For instance, in line with the discussion above, the views may be presented to a user as part of a native application or web application running on the user's client station, among other possibilities. Further, in line with the discussion above, the application running on the user's client station through which the views are presented may be driven by a back-end platform, such as back-end platform 102, which may transmit data and/or instructions that enable the user's client station to present the views to the user. The views of the disclosed punch item management tool may be presented to a user in various other manners as well. Based on the actions that a user takes with respect to a punch item, the punch item may then be transitioned from one state in the workflow to a different state of the workflow, and the responsibility for the punch item may be transitioned to another user having a different role with respect to the punch item.

In practice, the workflow provided by the punch item management tool may take one of various forms. For purposes of explanation and illustration, two examples of the workflow provided by the punch list management tool are described below.

The first example may be referred to as the "Full" workflow and may involve actions by three different users—a first user serving the role of creator of a punch item, a second user serving the role of punch item manager of the punch item, and a third user serving the role of assignee of the punch item. The second example may be referred to as the Punch Manager-Creator (or "PMC") workflow, and may involve actions by two different users—a first user that serves the dual roles of creator and punch item manager of a punch item, and a second user serving the role of assignee of the punch item. Each of these example workflows will now be described in further detail below.

A. "Full" Workflow

Figure 3:
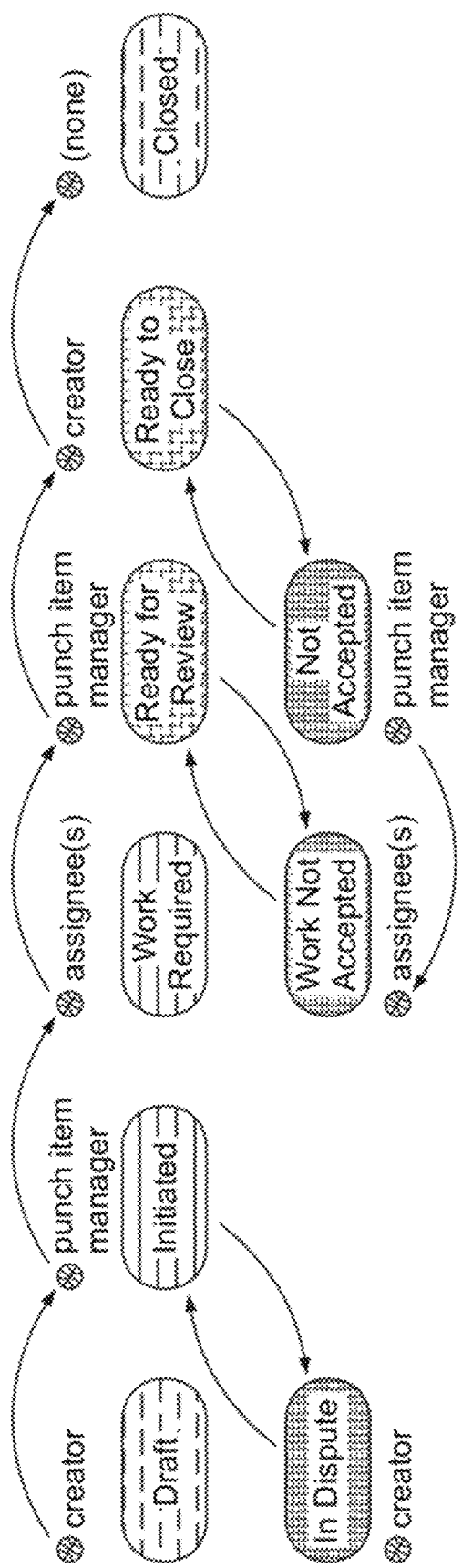
FIG. 3 illustrates a state diagram for a "Full" workflow provided by the disclosed punch list management tool.

An overview of a "Full" workflow provided by punch item management tool is shown in FIG. 3. As shown, FIG. 3 represents a state diagram for the "Full" workflow provided by the punch list management tool, where each different state is designated by a rounded rectangle that includes the name of the state. Further, FIG. 3 shows a basketball icon for each state that indicates the particular user responsible for the punch item at that state (e.g., creator, punch item manager, or assignee). Further yet, FIG. 3 shows arrows that indicate the possible transitions between the different states of the "Full" workflow.

In practice, each of the states shown in the "Full" workflow may have an associated set of "views" (e.g., GUI screens) that may be presented to the particular user responsible for a punch item while it is in a particular state. This set of views may enable the responsible user to take various actions with respect to the punch item, and at some point, the user's actions may result in the punch item transitioning to the next state of the workflow.

The different states of a punch item in the "Full" workflow (and the actions that may be performed by the responsible user with respect to the punch item during each state) will now be described in further detail with reference to FIGS. 4-14, which show examples of different views that may be presented to a user during each of the states in the "Full" workflow for coordinating and guiding the process of taking a given punch item from creation to completion.

In the screenshot of FIGS. 4-14, the given punch item that is the primary focus of the workflow is the punch item entitled "102—Drywall Patch," but it will be apparent that the views illustrated in these screenshots may enable activity to be taken with respect to various other punch items as well (e.g., one or more other punch items that are part of the same punch list as the given punch item). Further, in the screenshots of FIGS. 4-14, "Jill Owner" is the individual acting as the creator for the given punch item, "Joey Wrench" is the individual acting as the punch item manager for the given punch item, and "Andrew Delgado," "Augusta Keller," "Daniel McCarthy," and "Tony Burgess" are the individuals designated as assignees of the given punch item.

As shown in FIG. 3, the "Full" workflow may begin with a "Draft" state of the given punch item. At a high level, the "Draft" state of the given punch item may be initiated when a creator begins the activity of creating the given punch item, and the "Draft" state of the given punch item may end when the creator requests that the given punch item be sent to the punch item manager, at which point the given punch item may be transitioned to the "Initiated" state and responsibility for the given punch item may be transitioned from the creator to the punch item manager. In this respect, during the "Draft" state of the given punch item, the creator may be able to access one or more views that are associated with the action of creating the given punch item. Some examples of these views are illustrated with FIGS. 4A-4E.

Figure 4A:
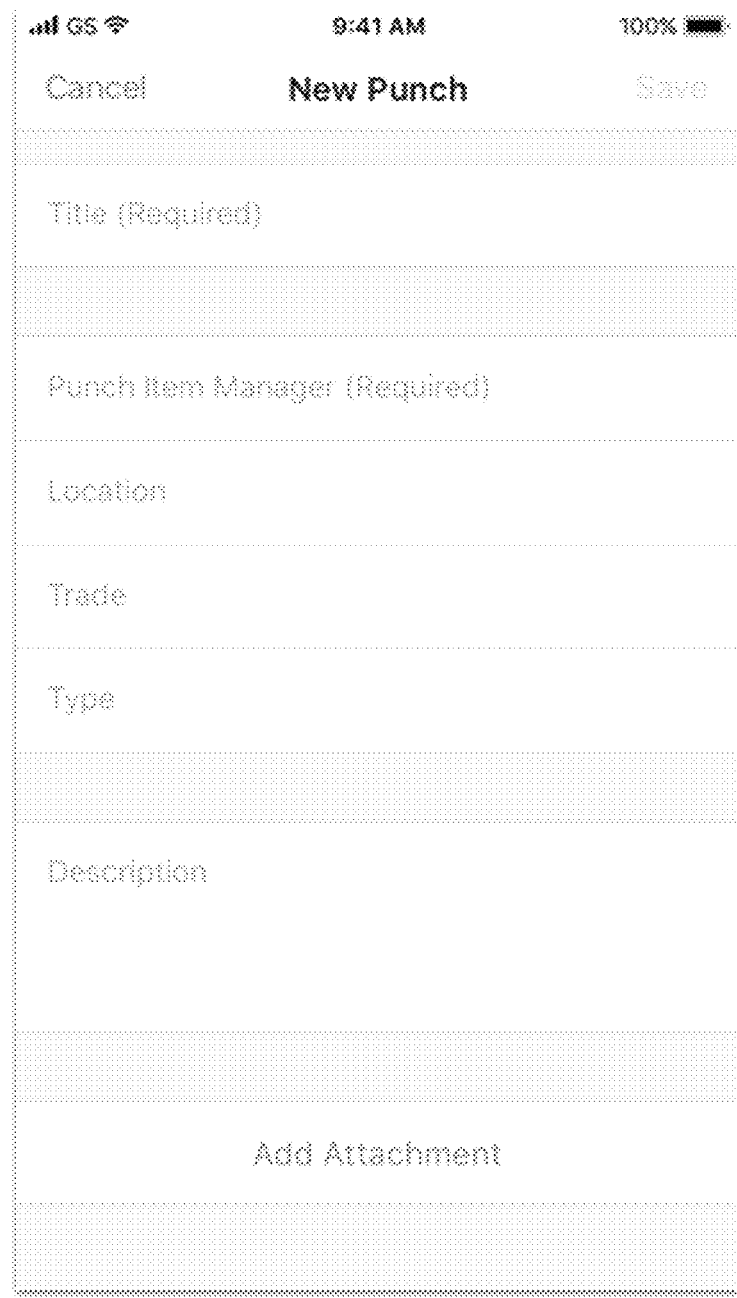
FIG. 4A depicts one example of a view that may be presented to a creator while a punch item is in a "Draft" state.

For instance, a creator may be presented with a punch-creation view that allows the creator to create a new punch item, one example of which is depicted in FIG. 4A. As shown in FIG. 4A, the example punch-creation view may include various fields that enable the creator to manually enter punch item data for the given punch item, examples of which may include title, punch item manager, location, trade, type, description, etc. However, according to another implementation, the creator may also be able to select a template that corresponds to a given type of punch item (e.g., electrical vs. structural, etc.), which may trigger the creator's client station to automatically populate one or more data fields for the given punch item data (e.g., title, location, trade, punch item manager, etc.). In this respect, the punch item data included in such a template may be obtained in various manners. According to one example, a client station and/or back-end platform 102 may obtain the punch item from a database record associated with the template. The client station may populate the punch item data from a template in various other manners as well. An example of a punch-creation view that has been populated is then illustrated in FIG. 4B While the punch-creation view allows for the entry of certain punch item data, the punch-creation view depicted in FIGS. 4A-4B may also prohibit the creator from entering certain punch item data. For instance, while utilizing the punch-creation view illustrated in FIGS. 4A-4B, the creator may be prohibited from entering assignees, as this may be deferred for the punch item manager to perform in another state of the "Full" workflow. Additionally, if the creator selects a punch item template from which to populate punch item data for a given punch item, one or more assignees may automatically be assigned to the given punch item but the creator may be unable to add, remove, edit any of the automatically-added assignees for the given punch item. The creator may be prohibited from entering or editing other punch item data during the "Draft" state as well.

Figure 4B:
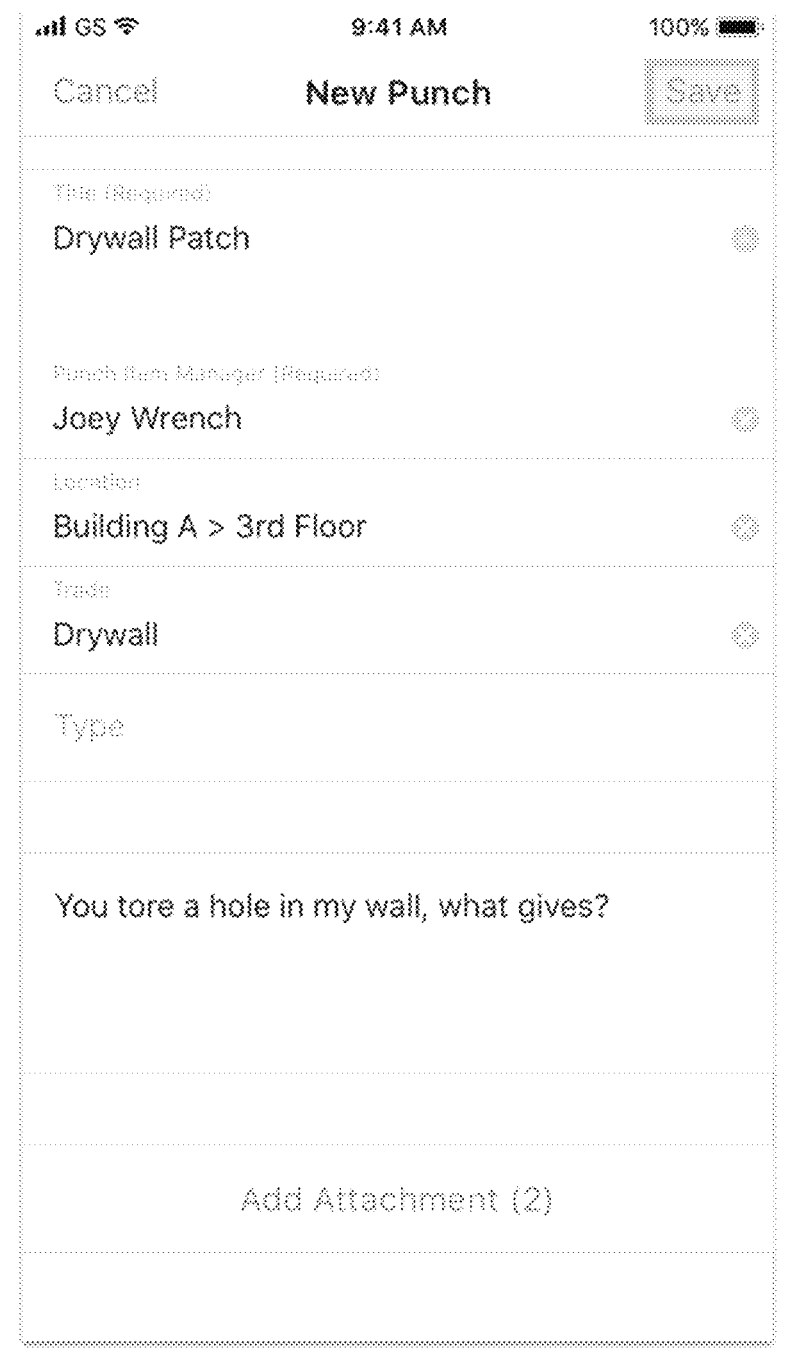

After the creator finishes entering the punch item data for a given punch item, the creator may request that the punch item be saved to a punch list by selecting a view control, such as the "Save" button control illustrated in the punch-creation view of FIG. 4B. The creator may repeat the process of creating new punch items and entering punch item data in the draft phase and saving the punch items to a punch list.

Figure 4C:
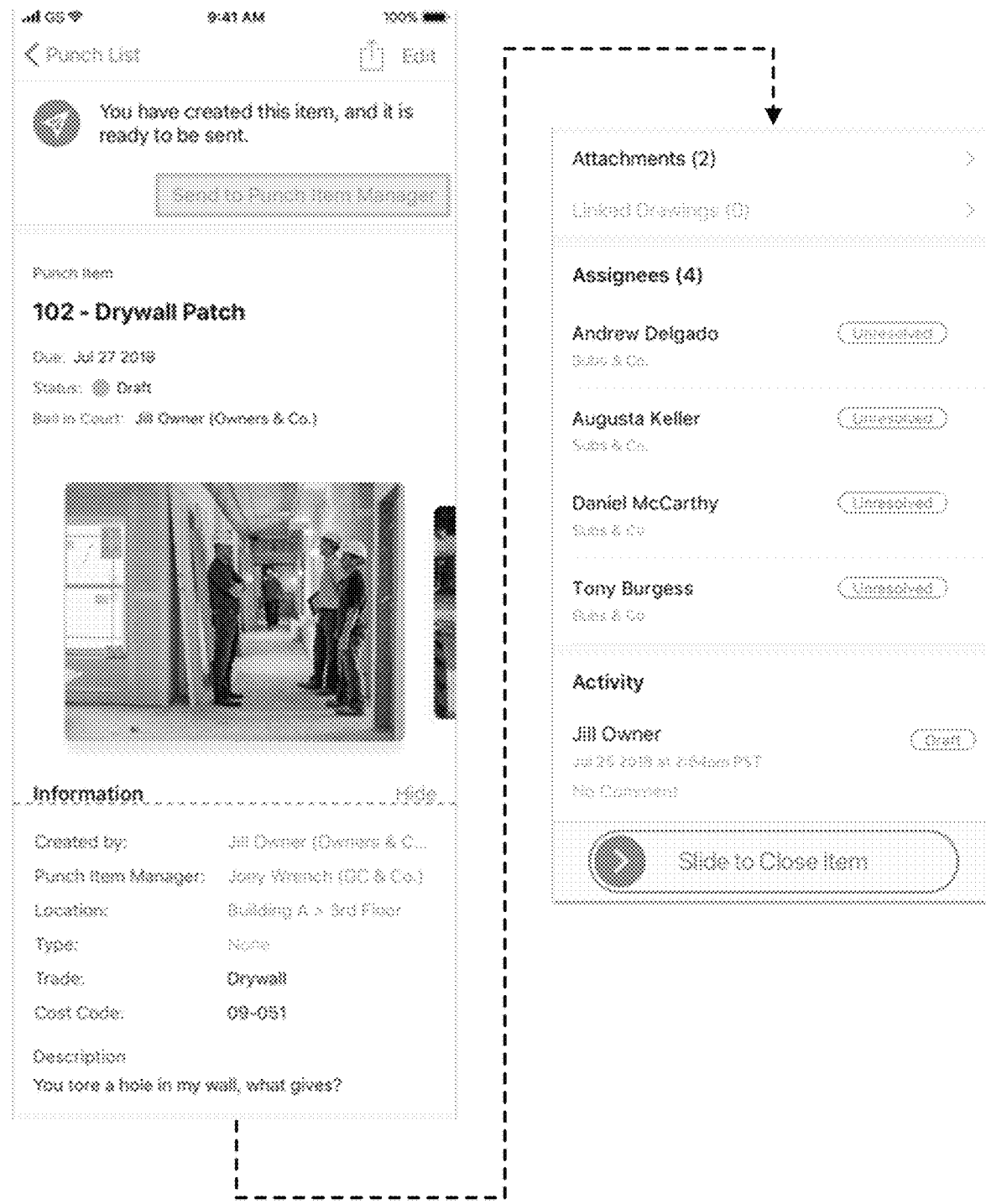
FIG. 4C depicts another example of a view that may be presented to a creator while a punch item is in a "Draft" state.

After the creator has saved the given punch item, the creator may be presented with a punch-item view for viewing and editing the given punch item, one example of which is depicted in FIG. 4C. At a high level, the punch-item view may allow the creator to edit the previously-saved given punch item, to view the assignees of the given punch item, to view any activity associated with the given punch item, to close the given punch item, and/or to send the given punch item to one or more assignees, among other possibilities.

Closing the given punch item may cause the given punch item to be removed from an associated punch list. To request that the given punch item be closed, the creator may interact with a control of the punch list management tool's interface, such as the "Slide to Close Item" control illustrated at the bottom of FIG. 4C. The creator may request that a given punch item be closed in various other manners as well.

To transition to the next stage of the workflow for the given punch item, the creator may then request that the given punch item be sent to a punch item manager, which may cause responsibility for the given punch item to be transitioned from the creator to the punch item manager. For example, as illustrated in FIG. 4C, the creator may select a user interface control from the punch-item view, such as the "Send to Punch Item Manager" control, which may trigger the creator's client station to send a communication to the back-end platform indicating that the creator has submitted a request to send the given punch item to the punch item manager. In turn, the back-end platform may determine (and update the data defining the given punch item to reflect) that the state of the given punch item has transitioned from the "Draft" state to an "Initiated" state, and that the responsibility for the given punch item has transitioned from the creator to the punch item manager.

In some examples, once a given punch item has been sent to the punch item manager, the creator may be unable to take various actions with respect to the given punch item. For example, once the given punch item is sent, the creator may no longer be able to edit or close the given punch item. The creator may be unable to take various other actions with respect to the given punch item as well.

Figure 4D:
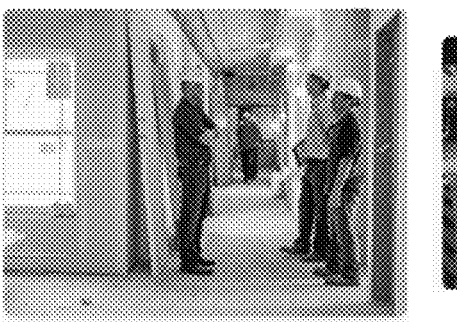
FIG. 4D depicts another example of a view that may be presented to a creator while a punch item is in a "Draft" state.

After the given punch item is sent to the punch item manager, an updated punch-item view may be presented to the creator that depicts the result of sending the given punch item to the punch item manager. One example of such an updated punch-item view is illustrated in FIG. 4D. Additionally, after the given punch item is sent to the punch item manager, the creator may no longer be able to perform certain actions with respect to the given punch item via the updated punch-item view illustrated in FIG. 4D. However, the creator may still be able to take other actions with respect to the given punch item via the updated punch-item view, such as viewing information related to the status of the given punch item.

As shown in FIGS. 4C-4D, the punch-item view for the given punch item may also include an "Activity" section that demonstrates the history of actions taken with respect to the given punch item. For example, the "Activity" section shown in FIGS. 4C-4D indicates that the given punch item was both created and sent to the punch item manager by the creator ("Jill Owner") on Jul. 25, 2018 at 2:54 PST. As shown in the subsequent screenshots, this "Activity" section may continue to be updated as further actions are taken with respect to the given punch item.

Figure 4E:
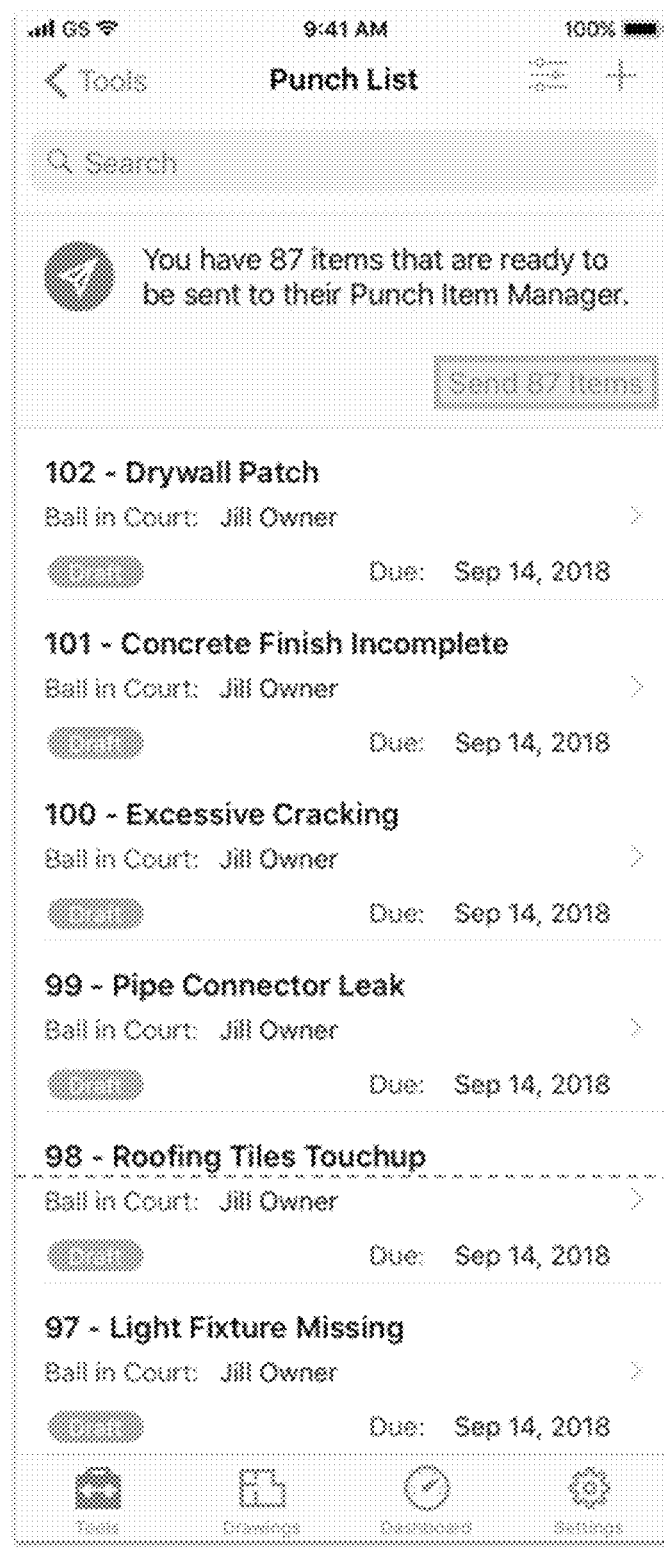
FIG. 4E depicts another example of a view that may be presented to a creator while a punch item is in a "Draft" state.

The disclosed punch item management tool may also include one or more views that enable multiple punch items to be sent to their respective punch item manager(s) in a bulk fashion. One example is such a view may be the punch-list view depicted in FIG. 4E, which may allow the creator to request that multiple punch items be sent in bulk to the respective punch item manager(s) associated with such punch items. For instance, as shown in FIG. 4E, a punch-list view may include a user interface control such as the "Send 87 Items" control, which may cause all of the creator's punch items in the "Draft" state to be sent to their respective punch item managers. While FIG. 4E depicts a view in which the punch items to be sent to the punch item manager (s) in a bulk fashion are part of a single punch list, it should be also understood that the disclosed punch item management tool may include other views that enable bulk sending of punch items that are not part of the same punch list.

As discussed above, after the creator requests that a given punch item be sent to a punch item manager, the state of the given punch item may transition from the "Draft" state to the "Initiated" state, and the responsibility for the given punch item may transition from the creator to the punch item manager. At that point, the punch item manager of the given punch item may be able to access one or more views of the punch item management tool that allow the punch item manager to review and/or take other actions with respect to the given punch item while it is in the "Initiated" state, such as assigning the given punch item to one or more assignees or disputing the given punch item. Some possible examples of these views are illustrated in FIGS. 5A-5E.

Figure 5A:
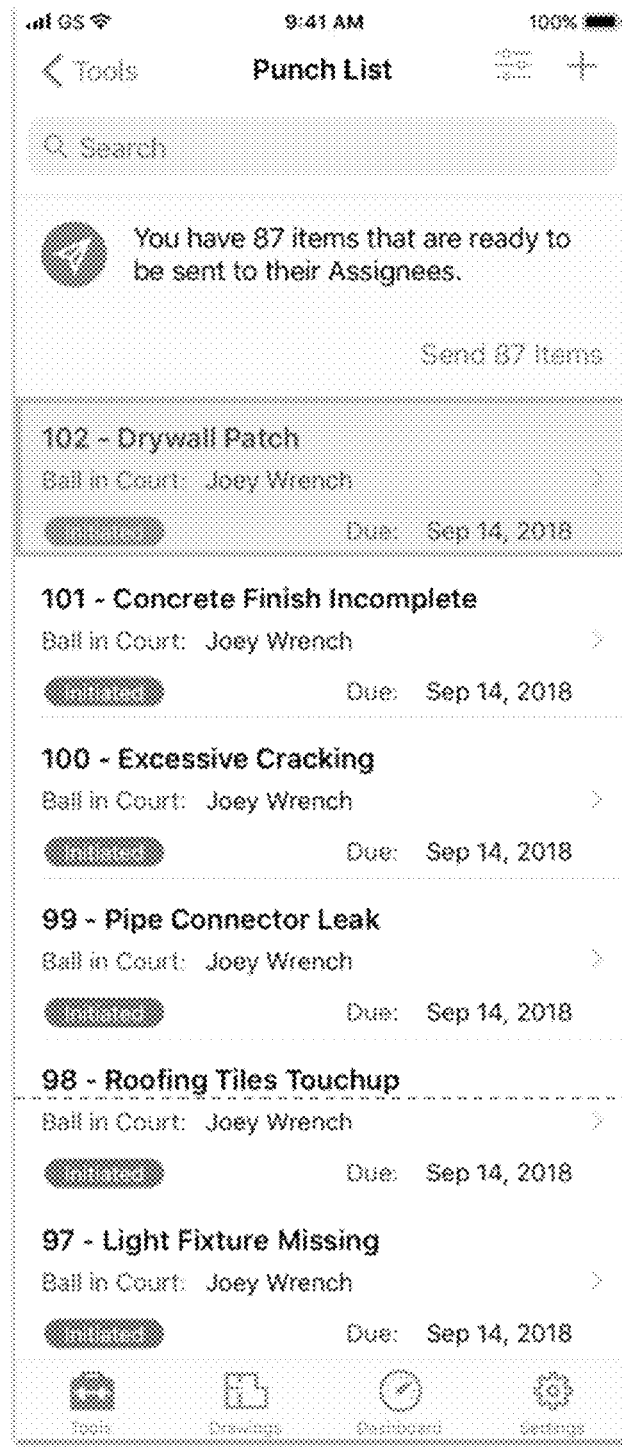
FIG. 5A depicts one example of a view that may be presented to a punch item manager while a punch item is in an "Initiated" state.

For instance, FIG. 5A depicts an example punch-list view that may be presented to a punch item manager. As shown, the example punch-list view depicted in FIG. 5A shows a plurality of punch items within an example punch list along with an indication of the state of each work item, which in this example is "Initiated" for each punch item displayed in the list. Additionally, the example punch-list view depicted in FIG. 5A shows the individual(s) having responsibility for the punch items, including the fact that the punch item manager currently has responsibility for the given punch item. The list may be ordered by due date, or by other factors (such as whether the punch item is high risk, as described in U.S. patent application Ser. No. 16/120,147, the contents of which are incorporated by reference herein). In addition, if the punch item is overdue, the due date may be displayed in a different color (in any of the figures in which a due date appears), and may include an indication of how many days the punch item is overdue. The punch-list view presented to a punch item manager of a punch item may take various other forms as well.

From this punch-list view, the punch item manager may be able to select and view further details regarding a given punch item that is displayed in the punch-list view. Further, as shown in FIG. 5A, the punch-list view may also include a user interface control that enables the punch item manager to request that all punch items in the displayed punch list be assigned to one or more assignees.

Figure 5B:
FIG. 5B depicts another example of a view that may be presented to a punch item manager while a punch item is in an "Initiated" state.

FIG. 5B depicts another example punch-list view that may be presented to a punch item manager. As shown in the example punch-list view depicted in FIG. 5B, in addition to the user interface elements depicted in FIG. 5A, the punch-list view may also include user interface elements that allow the punch item manager (or another individual having an administrator role) to view punch items associated with the punch list that are still in the "Draft" state (i.e., punch items that have not been sent to the punch item manager) and to request that those punch items in the "Draft" state be sent from the creator to the punch item manager. The punch-list view that is presented to a punch item manager may take various other forms as well.

Figure 5C:
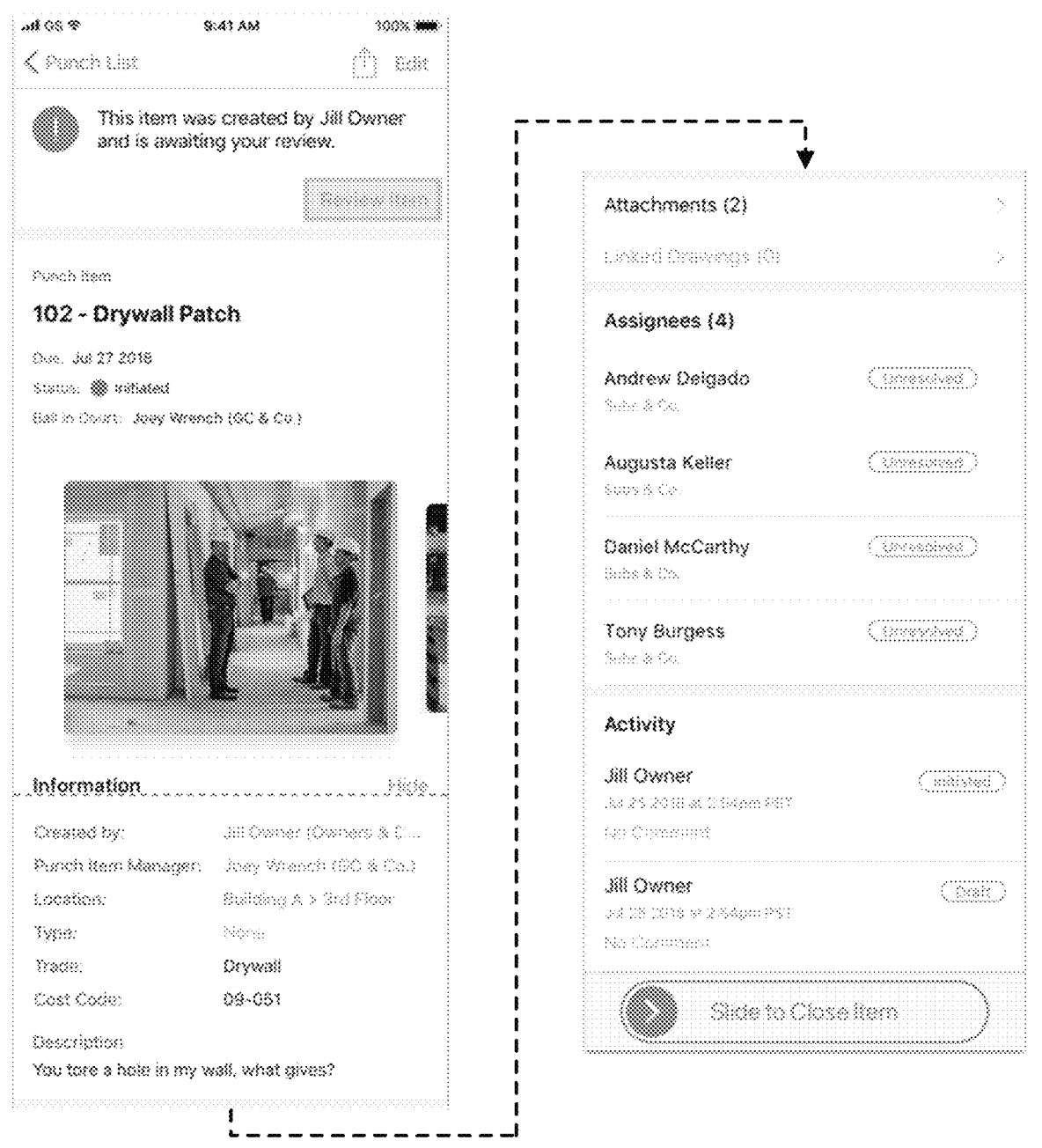

From the punch-list view of FIG. 5A or FIG. 5B, a punch item manager may select a given punch item that is in the "Initiated" state, which may cause the punch item manager's client station to display a punch-item view that provides further details regarding the given punch item. One example of such a punch-item view is depicted in FIG. 5C. As shown in FIG. 5C, such a punch-item view may then enable a punch item manager to review the given punch item, edit the punch item, close the given punch item, or take various other actions with respect to the given punch item as well.

Figure 5D:
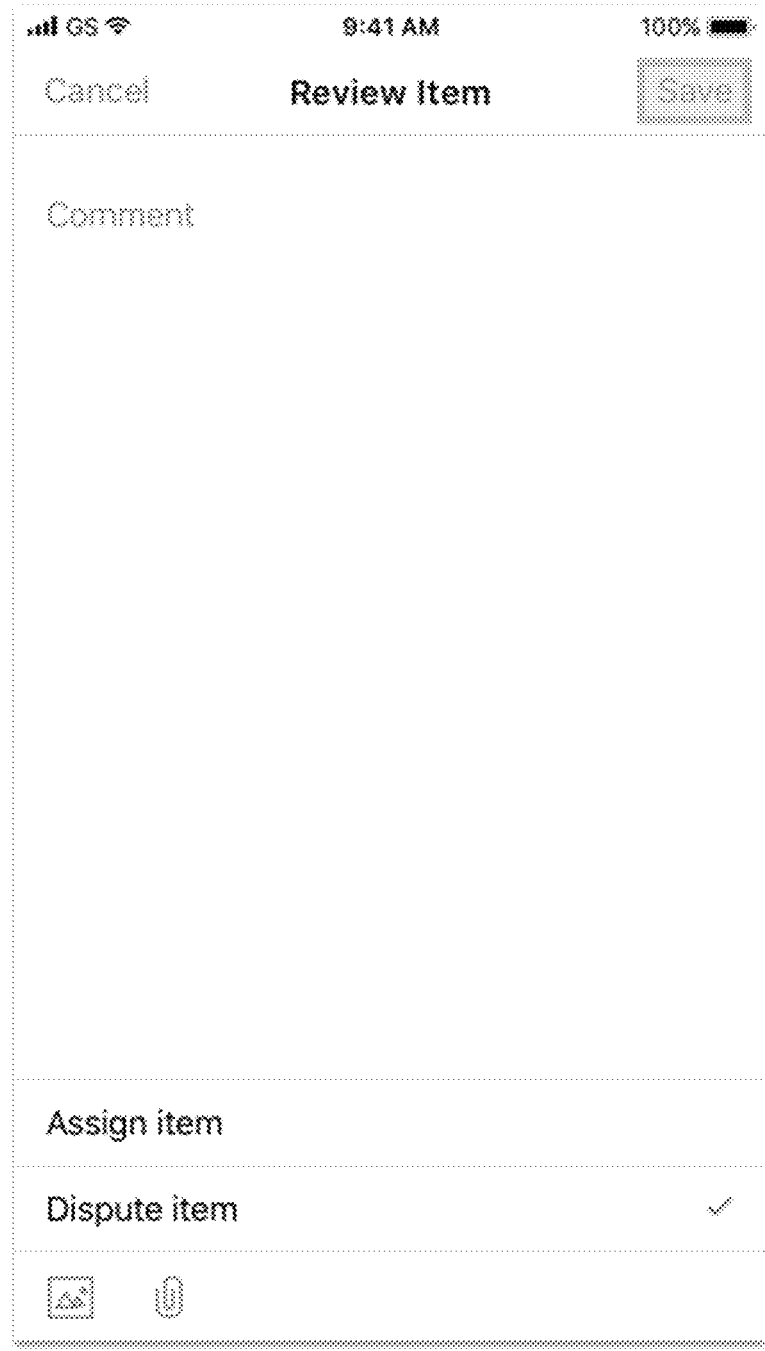
FIG. 5D depicts another example of a view that may be presented to a punch item manager while a punch item is in an "Initiated" state.

For instance, if the punch item manager wishes to review the given punch item, the punch item manager may selects a "Review Item" control from FIG. 5C, which may in turn cause the punch item manager's client station to display a review view that enables the punch item manager to either assign or dispute the given punch item. One example of such a review view is depicted in FIG. 5D. As shown in FIG. 5D, this review view for the given punch item may also allow the punch item manager to add comments and/or provide attachments for the given punch item, among other possibilities.

There are various reasons why a punch item manager may decide to dispute the given punch item, including as one example, if the punch item manager does not believe that the given punch item is in an appropriate scope of work. To the extent that the punch item manager decides to dispute the given punch item, the punch item manager may select the "Dispute item" option in the example view of FIG. 5D and may then select the "Save" control. Thereafter, the punch item manager's client station may send a communication to the back-end platform indicating that the punch item manager has disputed the given punch item. In turn, the back-end platform may determine (and update the data defining the given punch item to reflect) that the state of the given punch item has transitioned from the "Initiated" state to the "In Dispute" state, and that the responsibility for the given punch item has transitioned from the punch item manager back to the creator.

Further, after the punch item manager selects/saves the "Dispute item" option for the given punch item, the punch item manager's client station may display an updated punch-item view for the given punch item that reflects the updated state of the given punch item. One example of this punch-item view is illustrated in FIG. 5E, which shows that the status of the given punch item has been changed from "Initiated" to "In Dispute" and the responsibility for the given punch item has been transitioned back to the creator.

Figure 5E:
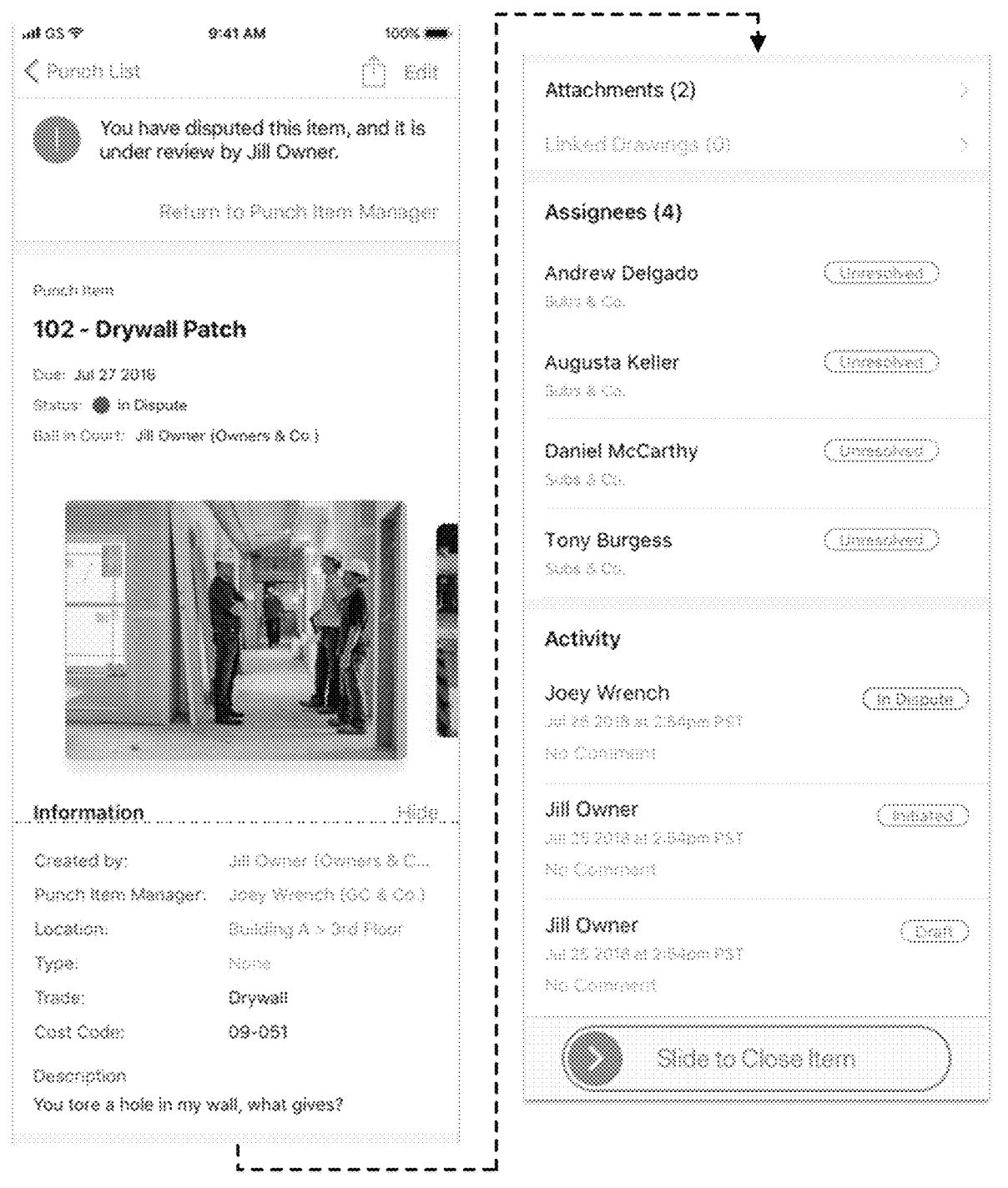

As shown in FIG. 5E, the updated punch-item view presented to the punch item manager may also include a "Return to Punch Item Manager" option, which may allow the punch item manager to request that responsibility for the given punch item be returned to the punch item manager (if, for example, the punch item manager does not believe the creator will respond, or wishes to revise the dispute, etc.). Additionally, as shown in FIG. 5E, the punch item manager may take other actions with respect to the given punch item while it is in dispute, such as closing the given punch item.

Once the state of the given punch item has been transitioned from the "Initiated" state to the "In Dispute" state, the creator of the given punch item may be able to access one or more views of the punch item management tool that allow the creator to review and/or take other actions with respect to the given punch item while it is in the "In Dispute" state, such as updating the given punch item to resolve any issues identified by the punch item manager and/or closing the given punch item. Some possible examples of these views are illustrated in FIGS. 6A-6D.

Figure 6A:
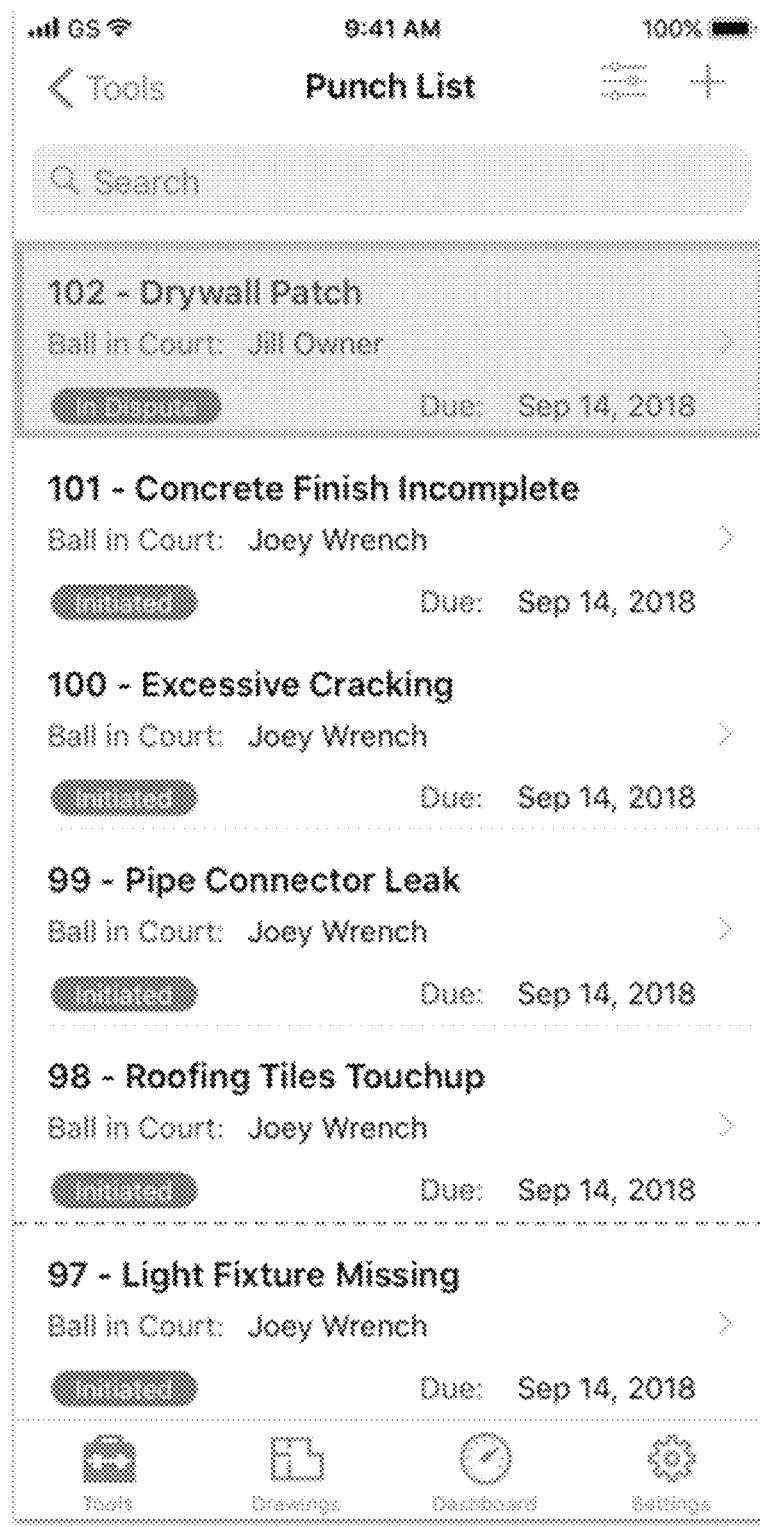
FIG. 6A depicts one example of a view that may be presented to a creator while a punch item is in an "In Dispute" state.

For instance, one such view may take the form of an updated punch-list view, an example of which is illustrated in FIG. 6A. As shown in FIG. 6A, the updated punch-list view includes the same list of example punch items that were included in the example punch list shown in FIG. 4D, but the view has been updated to reflect that all but the top punch item in the list have transitioned from a "Draft" state to an "Initiated" state (and responsibility has been transitioned to the project item manager), while the state of the top punch item in the list has been updated to show that it is "In Dispute" and the responsibility is back on the creator. While being presented with the updated punch-list view, the creator may then select the given punch item that is "In Dispute," which may trigger the creator's client station to display an updated punch-item view for the given punch item. One example of this updated punch-item view is depicted in FIG. 6B.

Figure 6B:
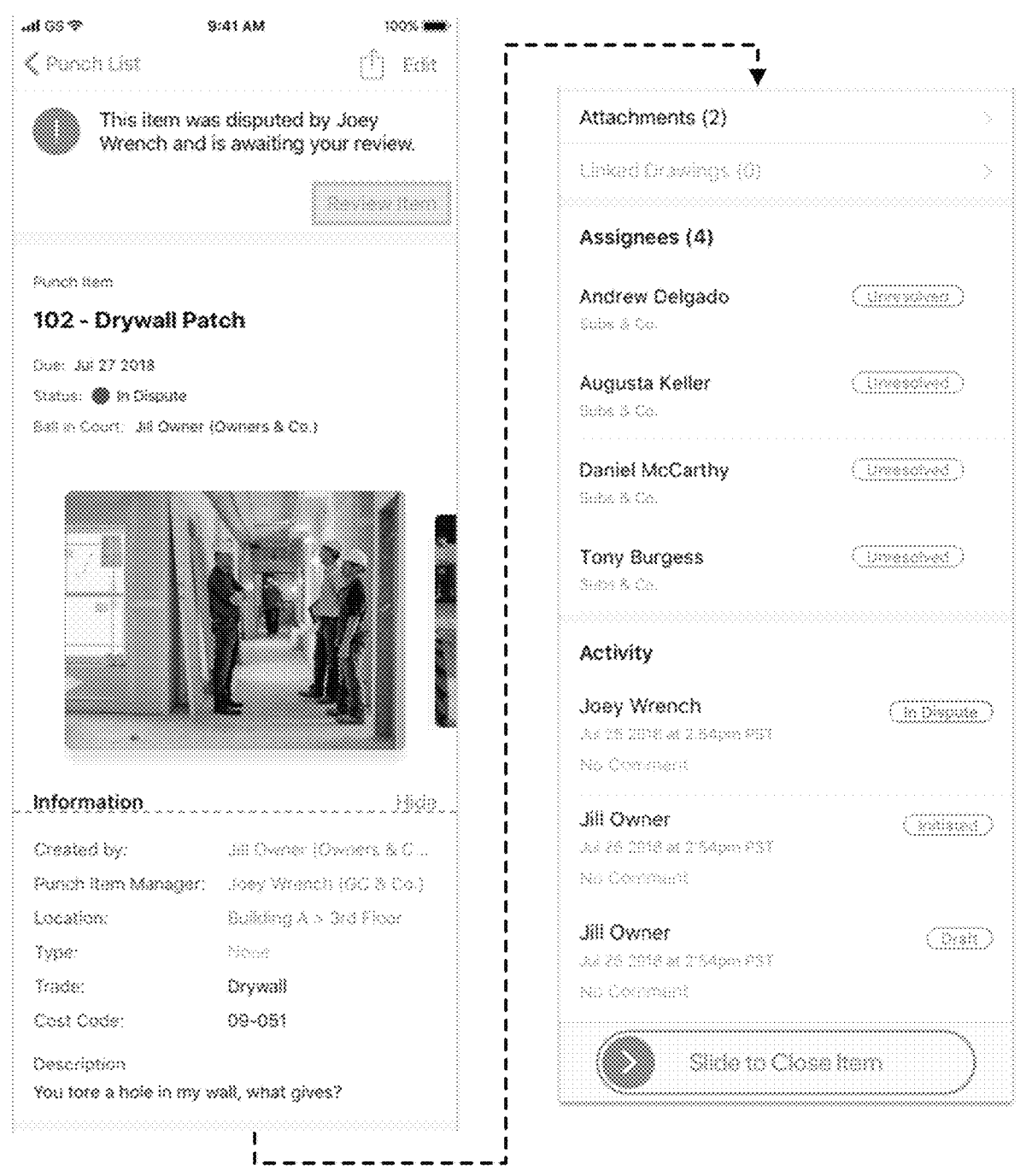
Figure 6C:
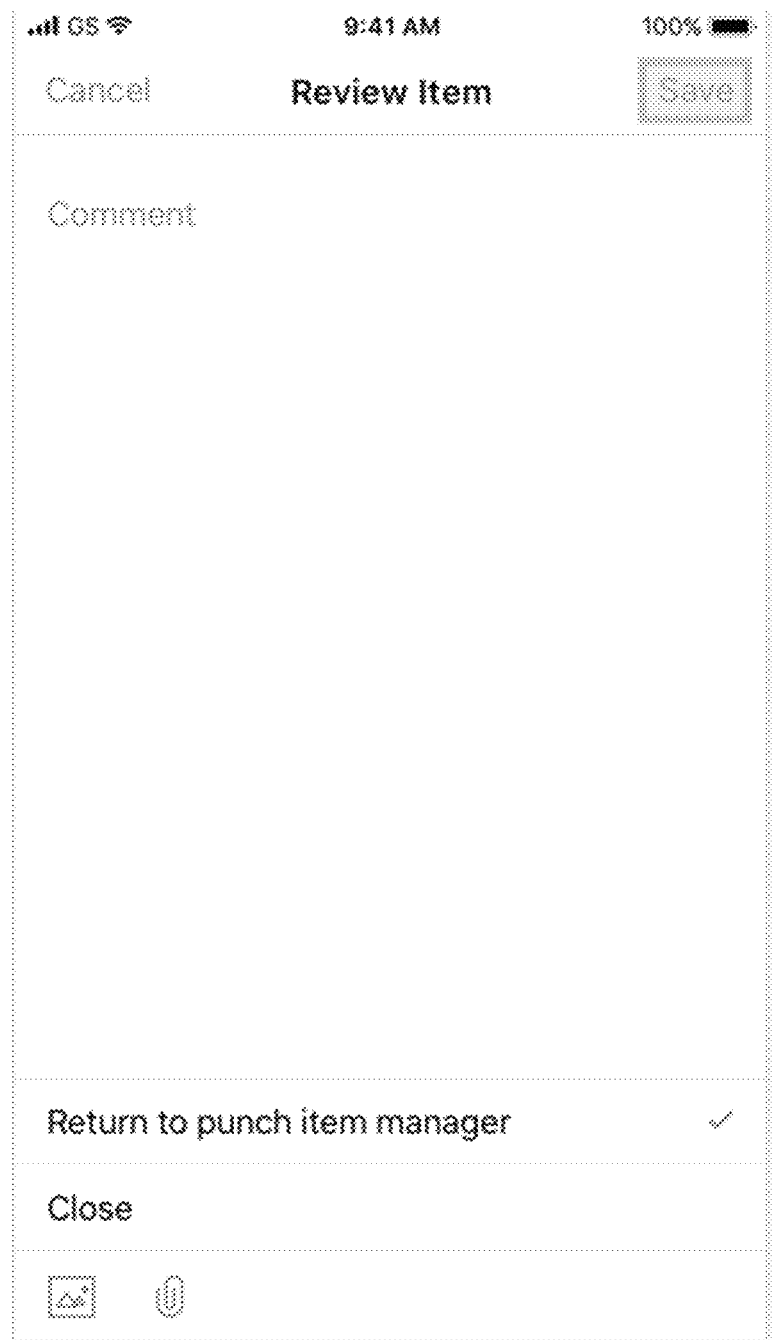
FIG. 6C depicts another example of a view that may be presented to a creator while a punch item is in an "In Dispute" state.

As shown in FIG. 6B, the updated punch-item view for the given punch item may enable the creator to edit the information associated with the given punch item (e.g., by selecting the "Edit" control at the top of the view). In turn, the updated punch-item view for the given punch item may enable the creator to select the "Review Item" control for the given punch item, which may trigger the creator's client station to display a review view that enables the creator to either return the given punch item back to the punch item manager (e.g., if the creator determines that the given punch item still needs additional work to be performed) or close the punch item (e.g., if the creator determines that the given punch item is out of scope). One example of such a review view is illustrated in FIG. 6C. As shown in FIG. 6C, this review view may also allow the create to add comments for the given punch item.

To the extent that the creator decides to return the given punch item back to the punch item manager, the punch item manager may select the "Return to punch item manager" option in the example view of FIG. 6C and may then select the "Save" control. Thereafter, the creator's client station may send a communication to the back-end platform indicating that the creator has requested that the given punch item be returned to the given punch item. In turn, the back-end platform may determine (and update the data defining the given punch item to reflect) that the state of the given punch item has transitioned from the "In Dispute" state to the "Initiated" state, and that the responsibility for the given punch item has transitioned from the creator back to the punch item manager.

Figure 6D:
FIG. 6D depicts another example of a view that may be presented to a creator while a punch item is in an "In Dispute" state.

Further, after the creator selects/saves the "Return to punch item manager" option for the given punch item, the creator's client station may display a further updated punch-item view for the given punch item that reflects the further updated state of the given punch item. One example of this punch-item view is illustrated in FIG. 6D, which shows that the status of the given punch item has been changed from "In Dispute" back to "Initiated" and the responsibility for the given punch item has been transitioned back to the punch item manager.

After the given punch item has been transitioned back to the "Initiated" state, the punch item manager of the given punch item may again access one or more views of the punch item management tool that allow the punch item manager to review and/or take other actions with respect to the given punch item while it is in the "Initiated" state, such as assigning the given punch item to one or more assignees or disputing the given punch item. Some possible examples of these views are illustrated in FIGS. 7A-7D, which share similarities with the views illustrated in FIGS. 5A-E.

Figure 7A:
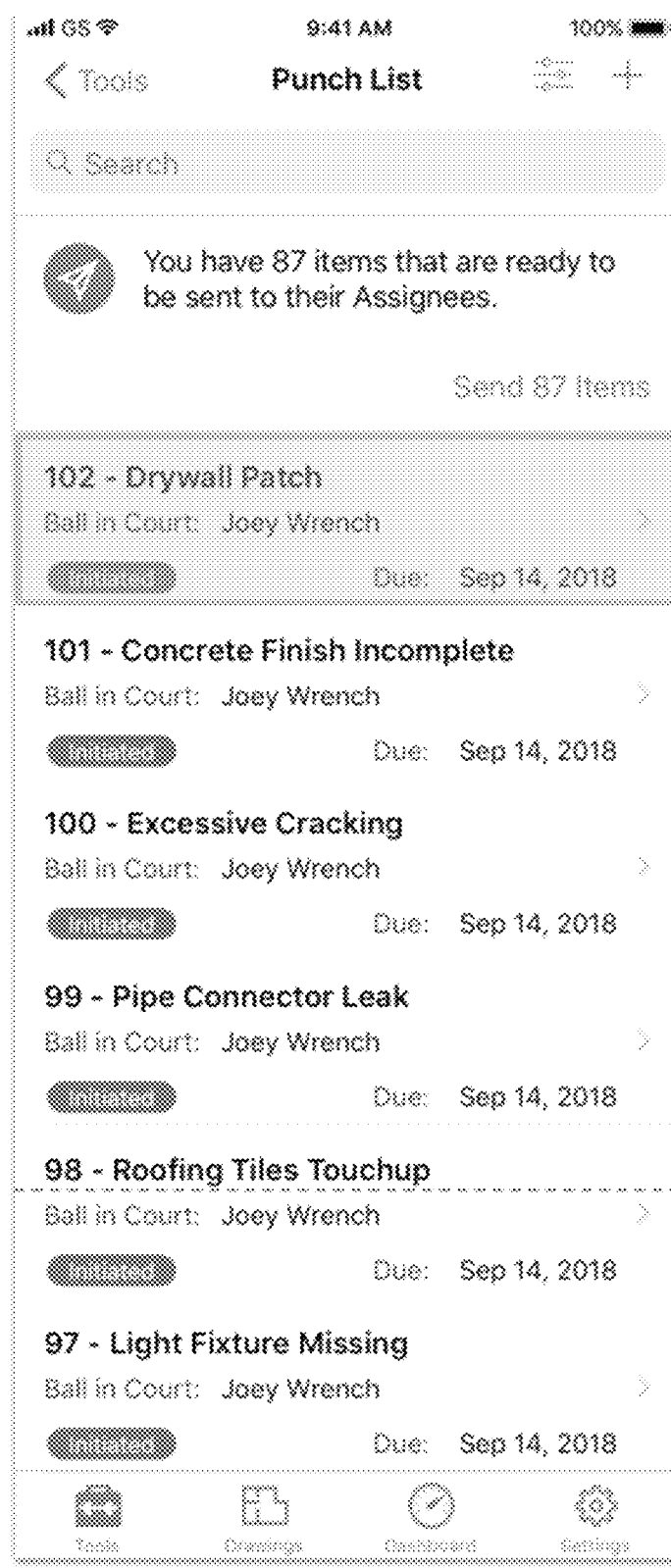
FIG. 7A depicts one example of a view that may be presented to a punch item manager after a punch item has returned to an "Initiated" state.

For instance, FIG. 7A depicts an updated punch-list view that may be presented to the punch item manager, which indicates that the state of the given punch item has been transitioned back to "Initiated" and that responsibility for the given punch item has transitioned back to the punch item manager. Similar to what was described above with respect to FIGS. 5A-5B, the punch item manager may then select the given punch item from the punch list to review the details of that given punch item, which may cause the punch item manager's client station to display an updated punch-item view for the given punch item, one example of which is depicted in FIG. 7B.

Figure 7B:
FIG. 7B depicts another example of a view that may be presented to a punch item manager after a punch item has returned to an "Initiated" state.

From the punch-item view depicted in FIG. 7B, the punch item manager may select the "Review Item" control, which may trigger the punch item manager's client station to again display a review view for the given punch item that enables the punch item manager to either assign or dispute the given punch item. One example of such a review view is depicted in FIG. 7C, which is similar to the review view illustrated in FIG. 5D.

Figure 7C:
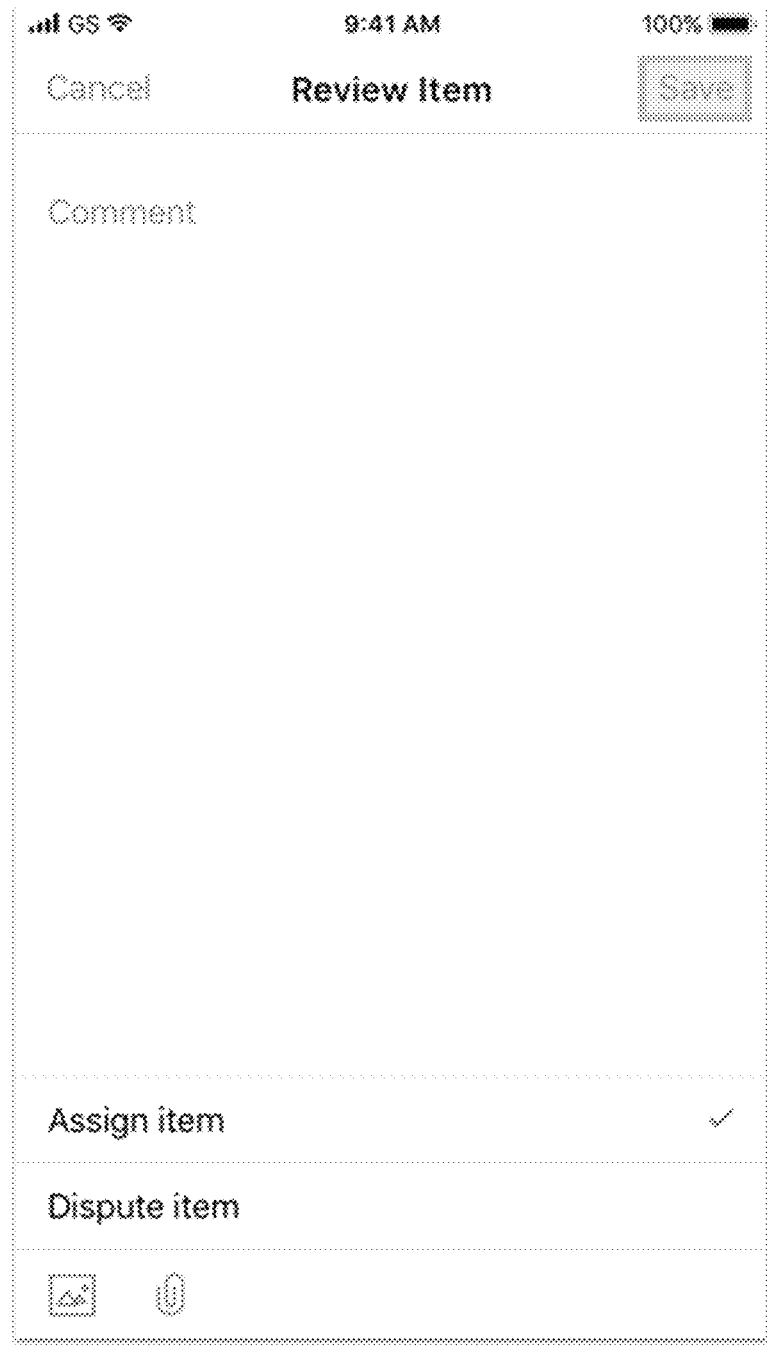
FIG. 7C depicts another example of a view that may be presented to a punch item manager after a punch item has returned to an "Initiated" state.

To the extent that the punch item manager decides to assign the given punch item (e.g., if the punch item manager has decided that the given punch item is valid and can be assigned to the one or more assignees), the punch item manager may select the "Assign item" option in the example view of FIG. 7C and may then select the "Save" control. Thereafter, the punch item manager's client station may send a communication to the back-end platform indicating that the punch item manager has requested assignment of the given punch item to one or more assignees. In turn, the back-end platform may determine (and update the data defining the given punch item to reflect) that the state of the given punch item has transitioned from the "Initiated" state to the "Work Required" state, and that the responsibility for the given punch item has transitioned from the punch item manager to the one or more assignees for the given punch item.

Figure 7D:
FIG. 7D depicts another example of a view that may be presented to a punch item manager after a punch item has returned to an "Initiated" state.

Further, after the punch item manager selects/saves the "Assign item" option for the given punch item, the punch item manager's client station may display an updated punch-item view for the given punch item that reflects the updated state of the given punch item. One example of this punch-item view is illustrated in FIG. 7D, which shows that the status of the given punch item has been changed from "Initiated" to "Work Required" and the responsibility for the given punch item has been transitioned to the one or more assignees for the given punch item.

Figure 7E:
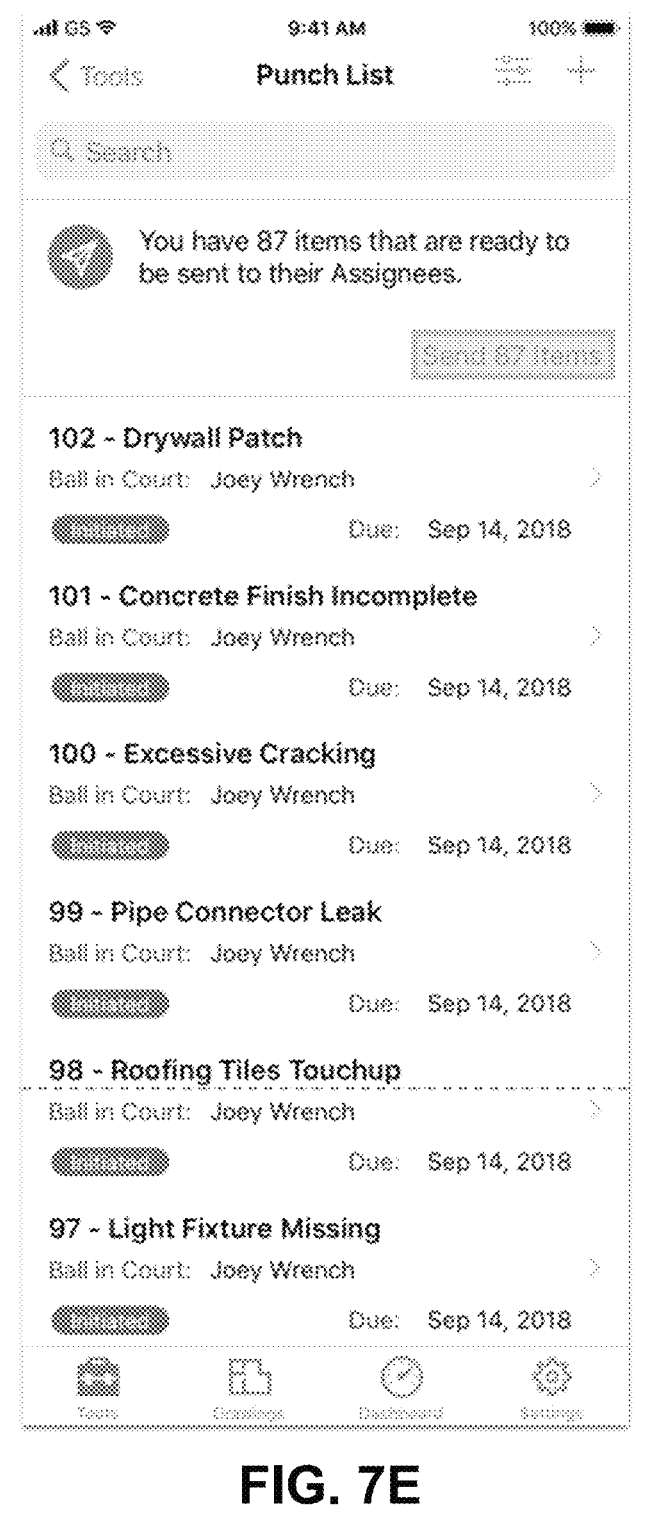

The disclosed punch item management tool may also include one or more views that enable multiple punch items to be assigned to their respective assignee(s) in a bulk fashion. One example is such a view may be the punch-list view depicted in FIG. 7E, which may allow the punch item manager to request that multiple punch items be assigned in bulk to the respective assignee(s) associated with such punch items. For instance, as shown in FIG. 7E, a punch-list view may include a user interface control, such as the "Assign 87 Items" control button, which may cause all of the punch item manager's punch items in the "Initiated" state to be assigned to their respective assignee(s) in bulk as opposed to one-by-one (and thereby cause each of those punch items to transition to a "Work Required" state). While FIG. 7E depicts a view in which the punch items to be assigned in a bulk fashion are part of a single punch list, it should be also understood that the disclosed punch item management tool may include other views that enable bulk assignment of punch items that are not part of the same punch list.

After the state of the given punch item has been transitioned from "Initiated" to "Work Required" and the responsibility for the given punch item has been transitioned from the punch item manager to the one or more assignees, each assignee of the given punch item may be able to access one or more views of the punch item management tool that allow the assignee to review and/or take other actions with respect to the given punch item while it is in the "Work Required" state, such as indicating that the assignee's respective work on the given punch item either is ready for review by the punch item manager or remains unresolved. Some possible examples of these views are illustrated in FIGS. 8A-E.

Figure 8A:
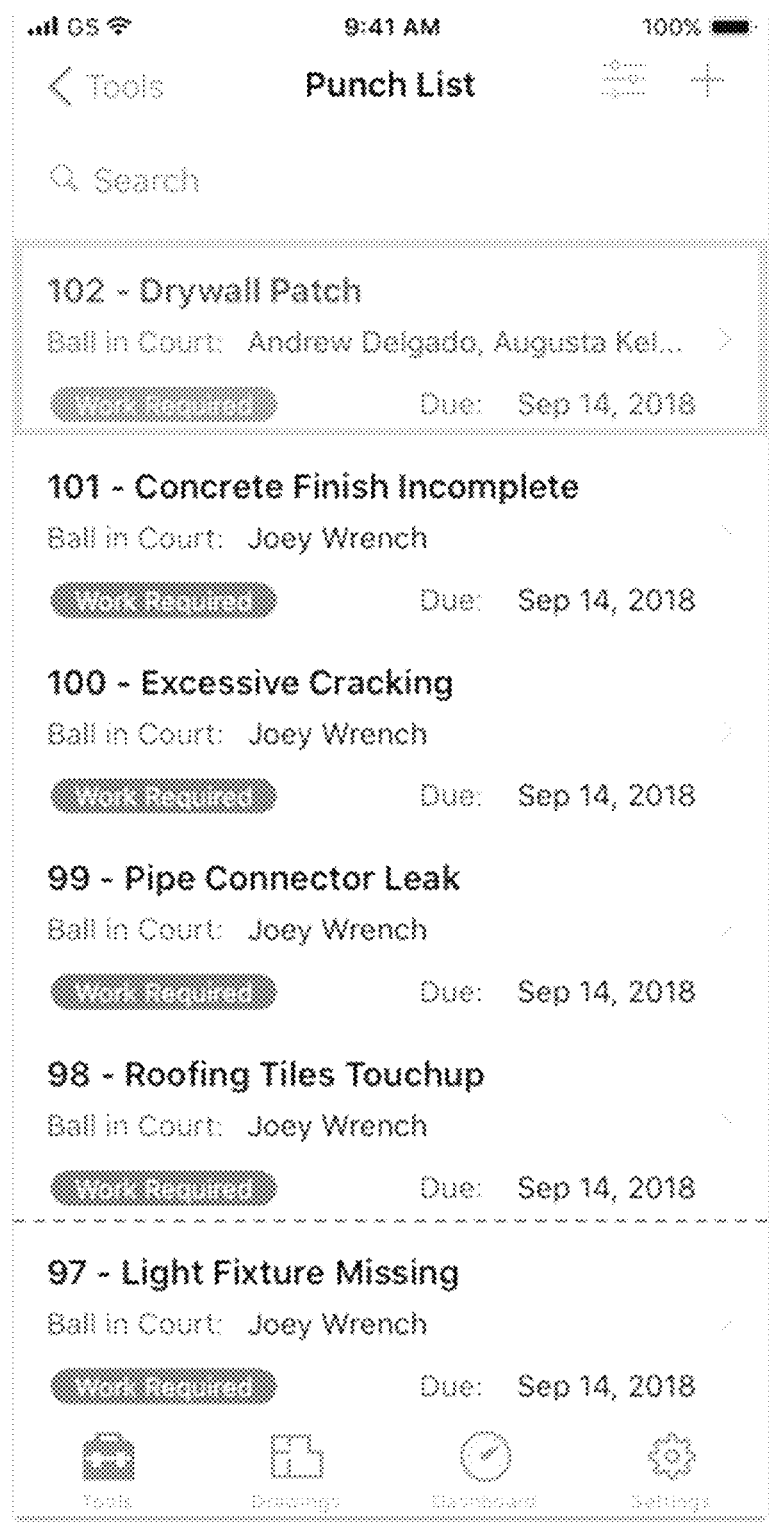
FIG. 8A depicts one example of a view that may be presented to an assignee while a punch item is in a "Work Required" state.

For instance, FIG. 8A depicts an example punch-list view that may be presented to a particular assignee of the given punch items, such as Daniel McCarthy. As shown, the example punch-list view depicted in FIG. 8A shows a plurality of punch items within an example punch list along with an indication of the state of each work item, which in this example is "Work Required" for each punch item displayed in the list. Additionally, the example punch-list view depicted in FIG. 8A shows the individual(s) having responsibility for the punch items, including the fact that the given punch item has been assigned to a group of assignees that includes Daniel McCarthy. The list may be ordered by due date, or by other factors (such as whether the punch item is high risk, as described in U.S. patent application Ser. No. 16/120,147, the contents of which are incorporated by reference herein). In addition, if the punch item is overdue, the due date may be displayed in a different color (in any of the figures in which a due date appears), and may include an indication of how many days the punch item is overdue. The punch-list view presented to an assignee of a punch item may take various other forms as well.

From the punch-list view of FIG. 8A, an assignee may select and view further details regarding punch items that have been assigned to assignee. For example, a particular assignee of the given punch item (such as Daniel McCarthy) may select the given punch item in the punch-list view, which may trigger the particular assignee's client station to display a punch-item view for the given punch item. One example of such a punch-item view is depicted in FIG. 8B.

Figure 8B:
FIG. 8B depicts another example of a view that may be presented to an assignee while a punch item is in a "Work Required" state.
Figure 8C:
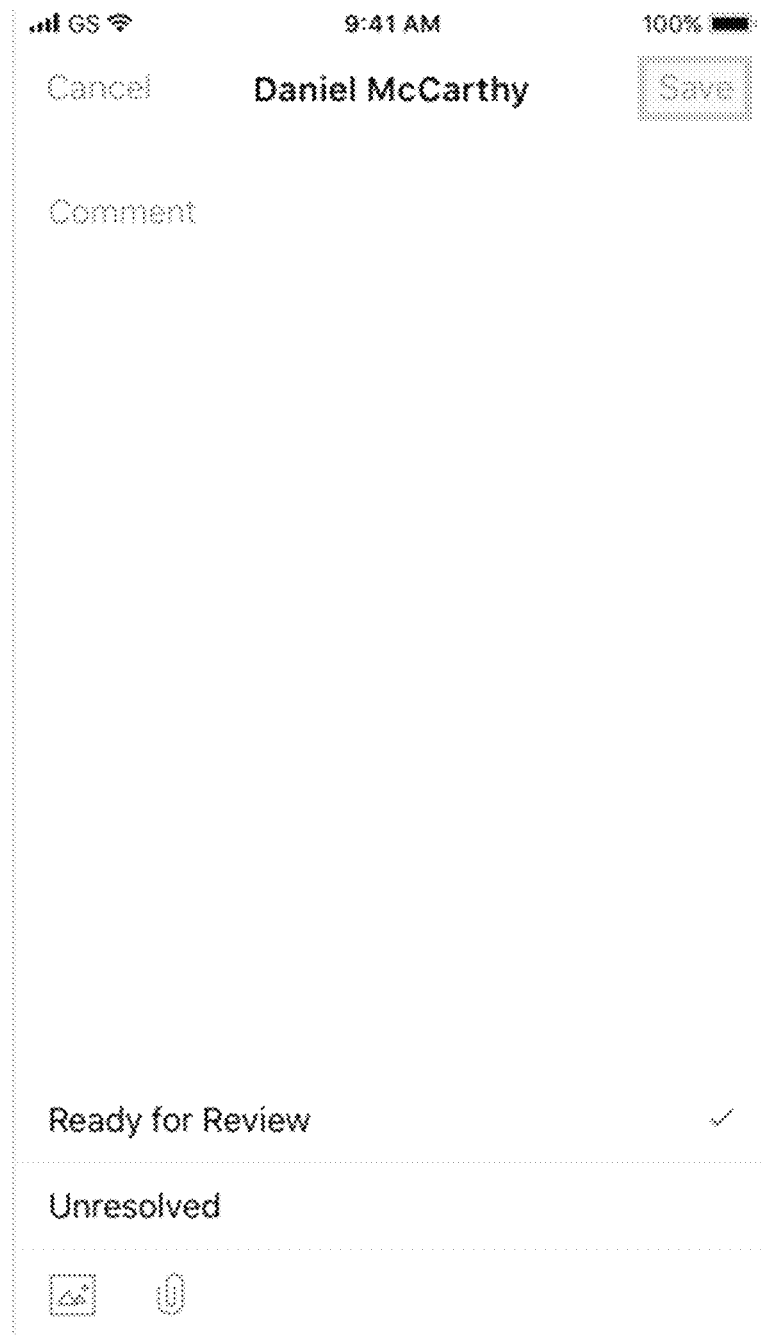
FIG. 8C depicts another example of a view that may be presented to an assignee while a punch item is in a "Work Required" state.

As shown in FIG. 8B, the punch-item view presented to the assignee may provide various details regarding the given punch item and may also enable the assignee to select his/her name from the list of assignees for the given punch item, which may in turn cause the assignee's client station to display a review view for the given punch item that enables the assignee to mark that the assignee's respective work on the given punch item either is ready for review or is unresolved. One example of such a review view is depicted in FIG. 8C. As shown in FIG. 8C, this review view for the given punch item may also allow the assignee to leave comments regarding the given punch item for the punch item manager and/or provide attachments for the given punch item, among other possibilities.

If a particular assignee of the given punch item (Daniel McCarthy in this example) decides that the assignee's respective work on the given punch item is ready for review by the punch item manager, that particular assignee may select the "Ready for Review" option in the example view of FIG. 8C and may then select the "Save" control. Thereafter, the particular assignee's client station may send a communication to the back-end platform indicating that the particular assignee has marked the given punch item as ready for review. In turn, the back-end platform may update the data defining the given punch item to reflect that the particular assignee has marked his/her respective work on the given punch item as ready for review.

Figure 8D:
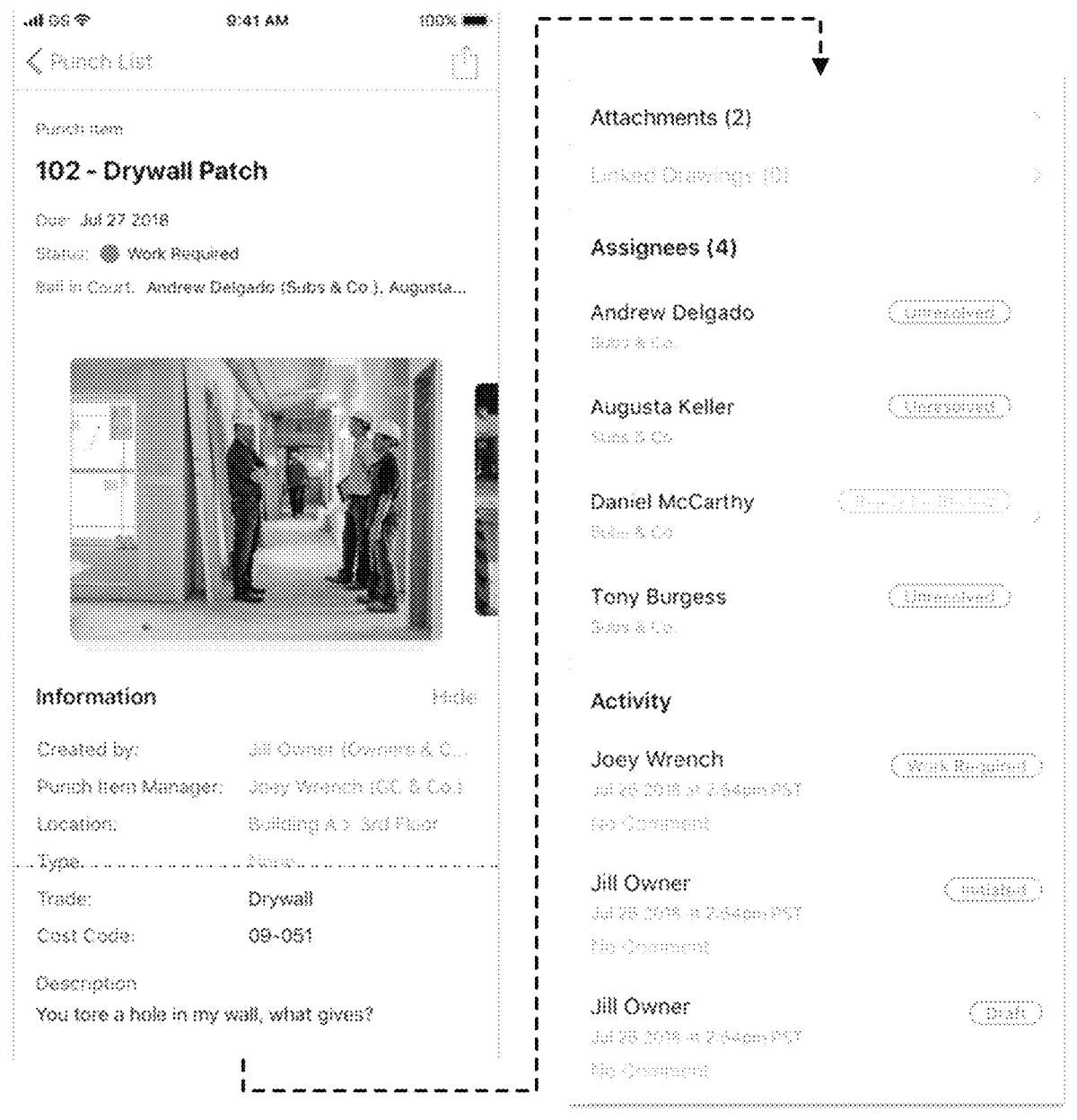

Further, after the particular assignee selects/saves the "Ready for Review" option for the given punch item, the particular assignee's client station may display an updated punch-item view for the given punch item, which reflects that the particular assignee has marked his/her respective work on the given punch item as ready for review but that the given punch item is still marked as unresolved for the other assignees. One example of this punch-item view is illustrated in FIG. 8D, which shows that (a) the given punch item's state is still "Work Required" and the responsibility for the given punch item is still with the assignees rather than the punch item manager, (b) the assignment status for Daniel McCarthy is marked as "Ready for Review," and (c) the assignment status for the other assignees is still marked as "Unresolved."

The other assignees of the given punch item may each be presented with a similar sequence of screens, which may enable each assignee to mark the given punch item as ready to review after the assignee completes his/her work on the given punch item. Each time a different assignee marks his/her respective work on the given punch item as ready for review, the assignee's client station may send a communication to the back-end platform indicating that the assignee has marked his/her respective work on the given punch item as ready for review, and the back-end platform may update the data defining the given punch item to reflect that another assignee has marked his/her respective work on the given punch item as ready for review.

Figure 8E:
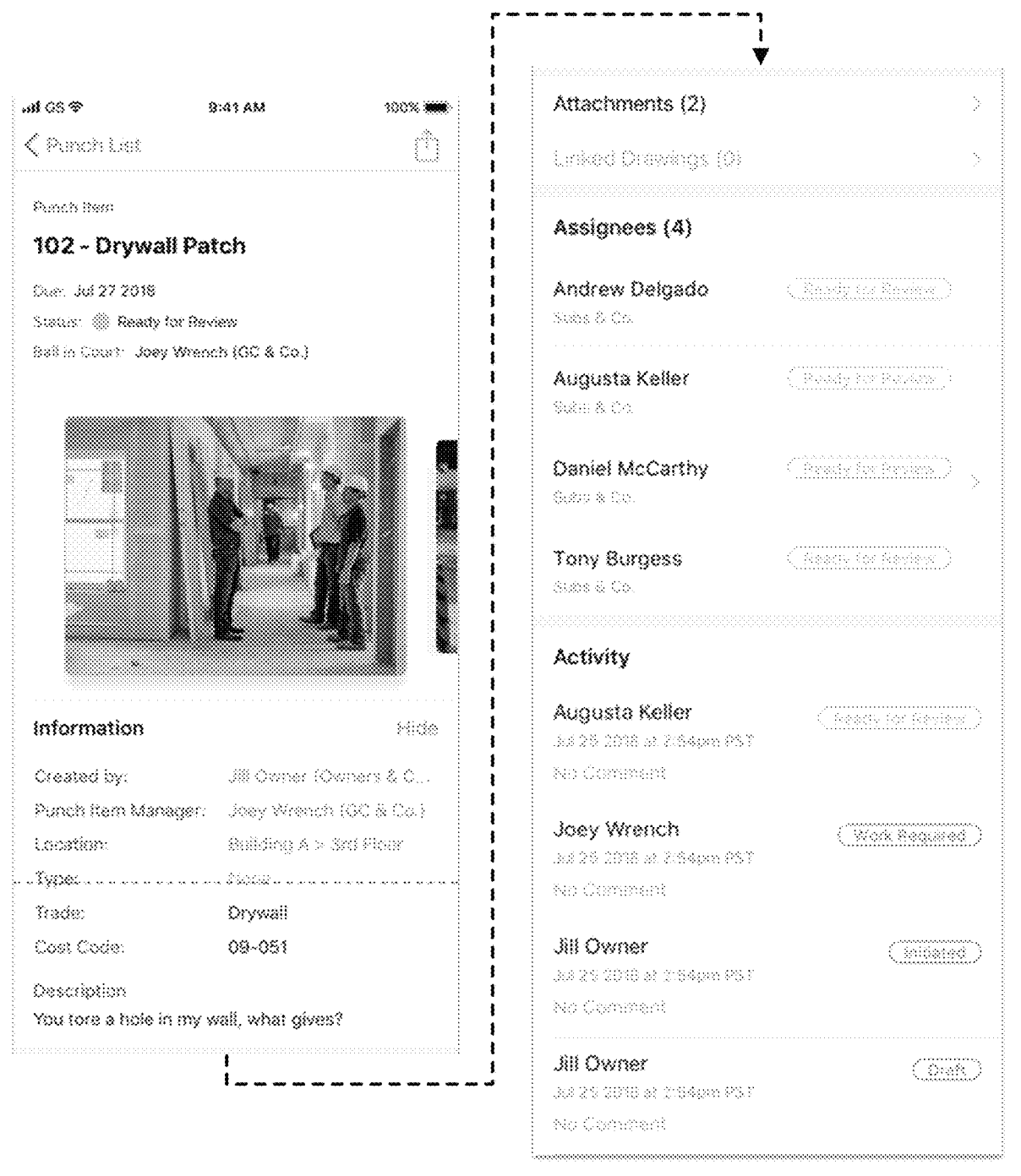

Further, once all of the assignees of the given punch item have marked their respective work on the given punch item as ready for review, the back-end platform may determine (and update the data defining the given punch item to reflect) that the state of the given punch item has transitioned from the "Work Required" state to the "Ready for Review" state, and that the responsibility for the given punch item has transitioned from the assignees back to the punch item manager for the given punch item. Thereafter, each assignee's client station may display an updated punch-item view for the given punch item that reflects the updated state of the given punch item. One example of this punch-item view is illustrated in FIG. 8E, which shows that the status of the given punch item has been changed from "Work Required" to "Ready for Review" and the responsibility for the given punch item has been transitioned back to the punch item manager for the given punch item.

Once the state of the given punch item has been transitioned from "Work Required" to "Ready for Review" and the responsibility for the given punch item has been transitioned back to the punch item manager, the punch item manager may be able to access one or more views of the punch item management tool that allow the punch item manager to review and/or take other actions with respect to the given punch item while it is in the "Ready for Review" state, such as indicating whether or not the punch item manager is going to accept the work performed by the assignees on the given punch item. Some possible examples of these views are illustrated in FIGS. 9A-D.

Figure 9A:
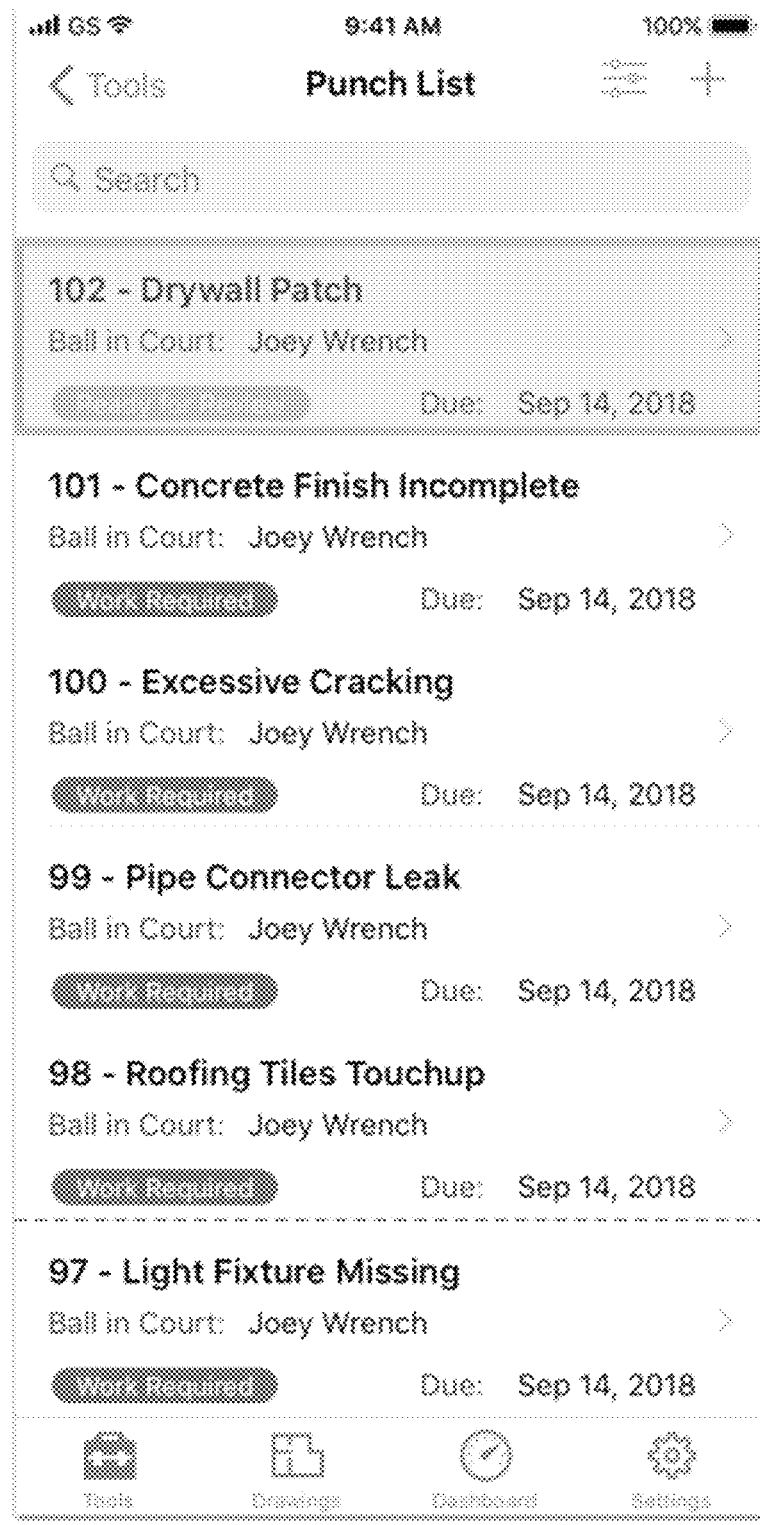
FIG. 9A depicts one example of a view that may be presented to a punch item manager while a punch item is in a "Ready for Review" state.

For instance, FIG. 9A depicts a punch-list view that may be presented to the punch item manager at this stage of the workflow, which indicates that the state of the given punch item has been transitioned to "Ready for Review" and that responsibility for the given punch item has again transitioned back to the punch item manager. Similar to what was described above with respect to FIGS. 5A-5B, the punch item manager may then select the given punch item from the punch list to review the details of that given punch item, which may cause the punch item manager's client station to display an updated punch-item view for the given punch item, one example of which is depicted in FIG. 9B.

Figure 9B:
FIG. 9B depicts another example of a view that may be presented to a punch item manager while a punch item is in a "Ready for Review" state.

From the punch-item view depicted in FIG. 9B, the punch item manager may select a particular assignee of the given punch item that has marked his/her respective work as ready to review, which may trigger the punch item manager's client station to display a review view that enables the punch item manager to indicate whether or not the work of that particular assignee is accepted. One example of such a review view is depicted in FIG. 9C.

Figure 9C:
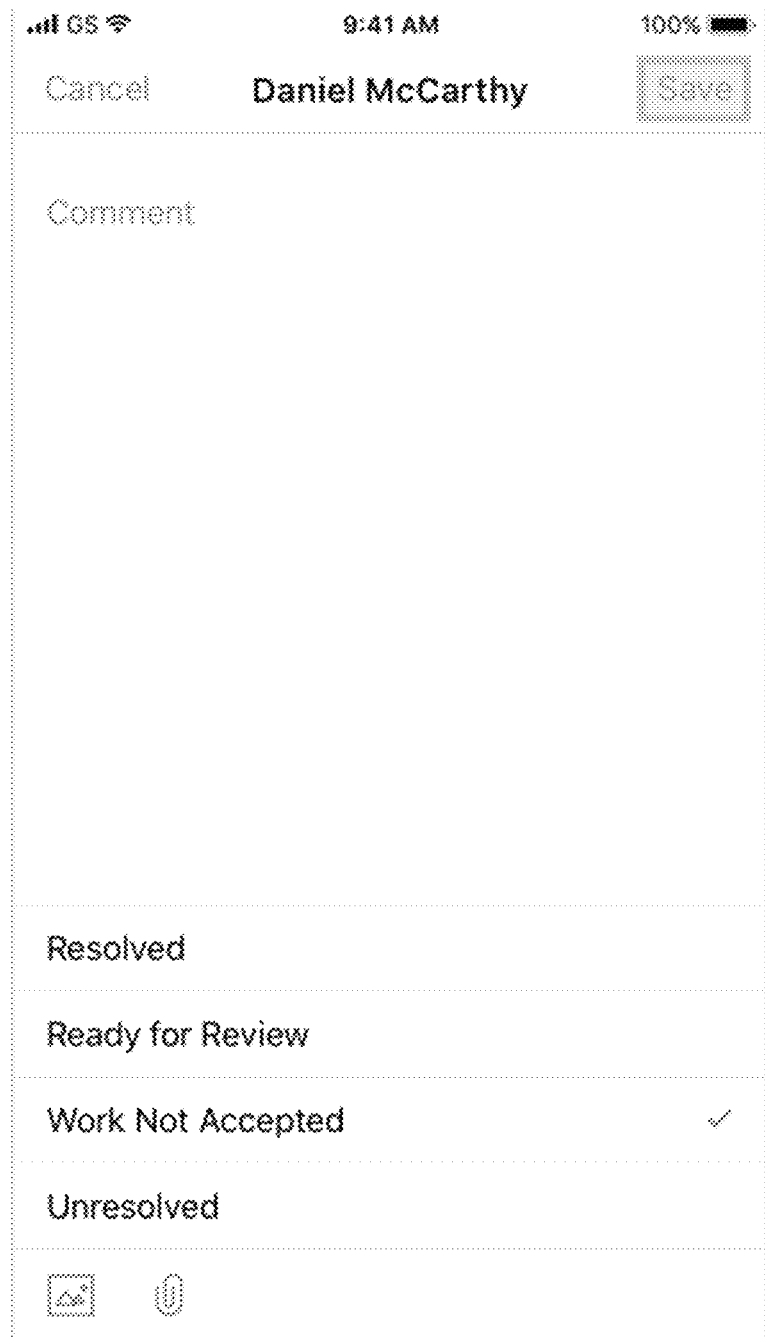
FIG. 9C depicts another example of a view that may be presented to a punch item manager while a punch item is in a "Ready for Review" state.

To the extent that the PMC decides not to accept the particular assignee's respective work on the given punch item (e.g., if the punch item manager considers the assignee's work to be unsatisfactory), the punch item manager may select the "Work Not Accepted" option in the example view of FIG. 9C and may then select the "Save" control. Thereafter, the punch item manager's client station may send a communication to the back-end platform indicating that the punch item manager has declined to accept the particular assignee's respective work on the given punch item. In turn, the back-end platform may update the data defining the given punch item to reflect that (a) the assignment status for the particular assignee (Daniel McCarthy in this example) has changed from "Ready for Review" to "Work Not Accepted," (b) the state of the given punch item has transitioned from the "Ready for Review" state to a "Work Not Accepted" state, and (c) the responsibility for the given punch item has transitioned from the punch item manager to the particular assignee for which the work was not accepted.

Figure 9D:
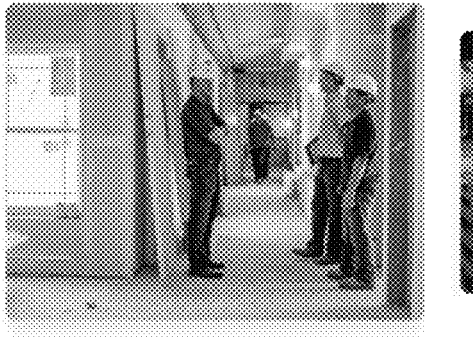
FIG. 9D depicts another example of a view that may be presented to a punch item manager while a punch item is in a "Ready for Review" state.

Further, after the punch item manager selects/saves the "Work Not Accepted" option for the particular assignee of the given punch item, the punch item manager's client station may display an updated punch-item view for the given punch item that reflects the updated state of the given punch item. One example of this punch-item view is illustrated in FIG. 9D, which shows that (a) the status of the given punch item has been changed from "Ready for Review" to "Work Not Accepted," (b) the responsibility for the given punch item has been transitioned to the particular assignee for which the work was not accepted (Daniel McCarthy in this example), and (c) the assignment status for the particular assignee has changed from "Ready for Review" to "Work Not Accepted."

After the given punch item has been transitioned to the "Work Not Accepted" state, the punch item manager or another administrator may still have the ability make changes to the given punch item. For instance, the punch item manager or another administrator may still edit the given punch item, change the assignees for the given punch item, or close the given punch item, among other possibilities. The punch item manager or another administrator may make other changes to a given punch item in the "Work Not Accepted" state as well.

Turning now to the "Work Not Accepted" state, the particular assignee(s) of the given punch item for which the work was not accepted may be able to access one or more views of the punch item management tool that allow the assignee(s) to review and/or take other actions with respect to the given punch item while it is in the "Work Not Accepted" state, such as updating the assignee's assignment status for the given punch item from not accepted back to ready for review. Some possible examples of these views are illustrated in FIGS. 10A-D.

Figure 10A:
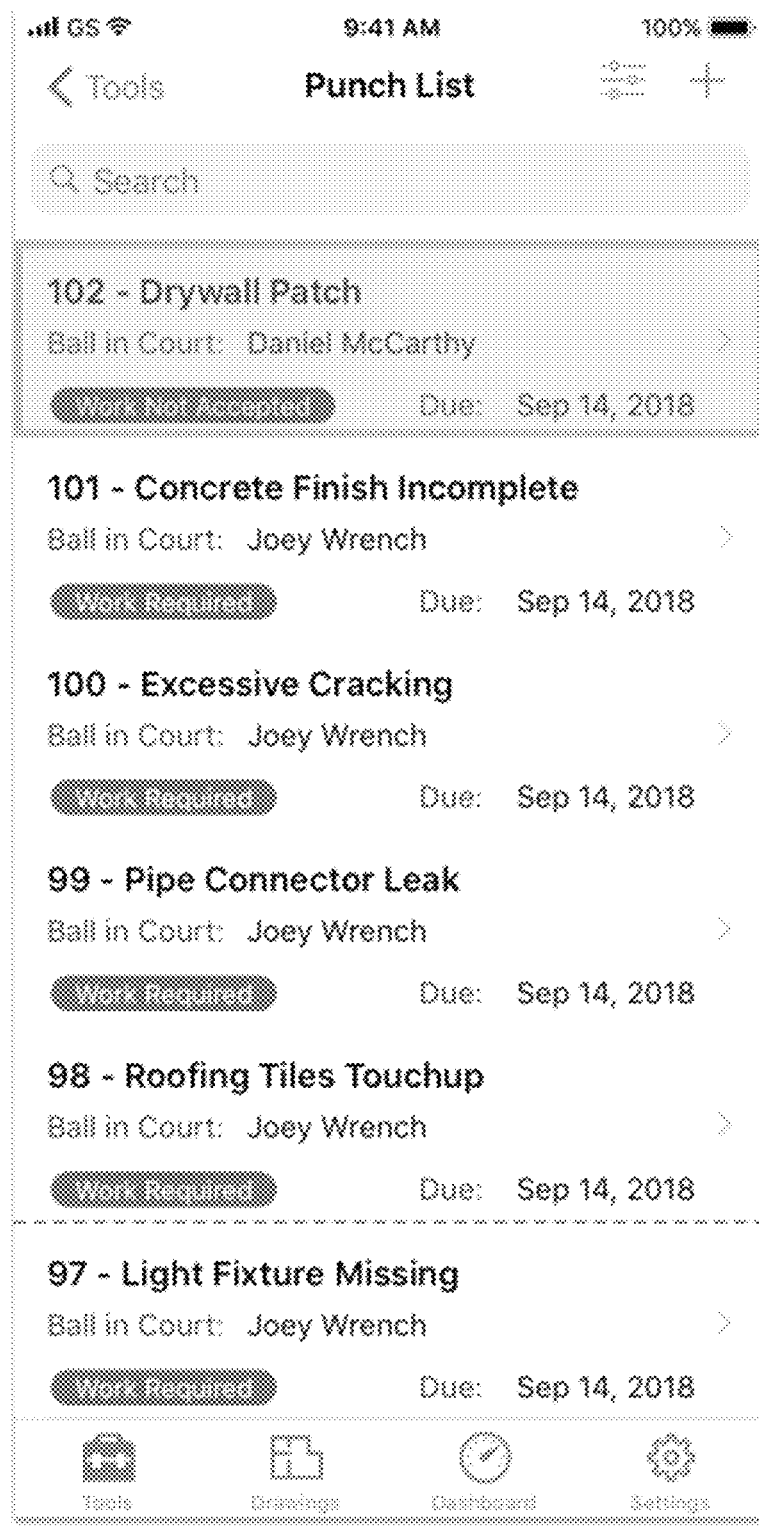
FIG. 10A depicts one example of a view that may be presented to an assignee while a punch item is in a "Work Not Accepted" state.

For instance, FIG. 10A depicts an updated punch-list view that may be presented to a particular assignee of the given punch item (such as Daniel McCarthy in this example) at this stage of the workflow, which indicates that the state of the given punch item has been transitioned to "Work Not Accepted" and that responsibility for the given punch item has transitioned back to the particular assignee. Similar to what was described above with respect to FIGS. 8A, the particular assignee may then select the given punch item from the punch list to review the details of that given punch item, which may cause the particular assignee's client station to display an updated punch-item view for the given punch item, one example of which is depicted in FIG. 10B.

Figure 10B:
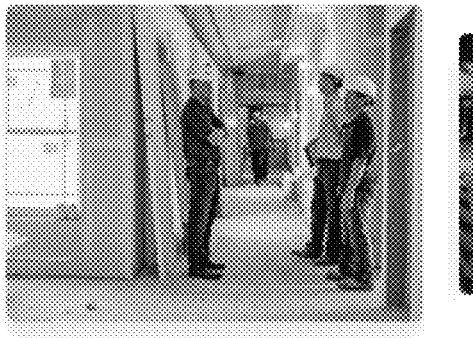
FIG. 10B depicts another example of a view that may be presented to an assignee while a punch item is in a "Work Not Accepted" state.
Figure 10C:
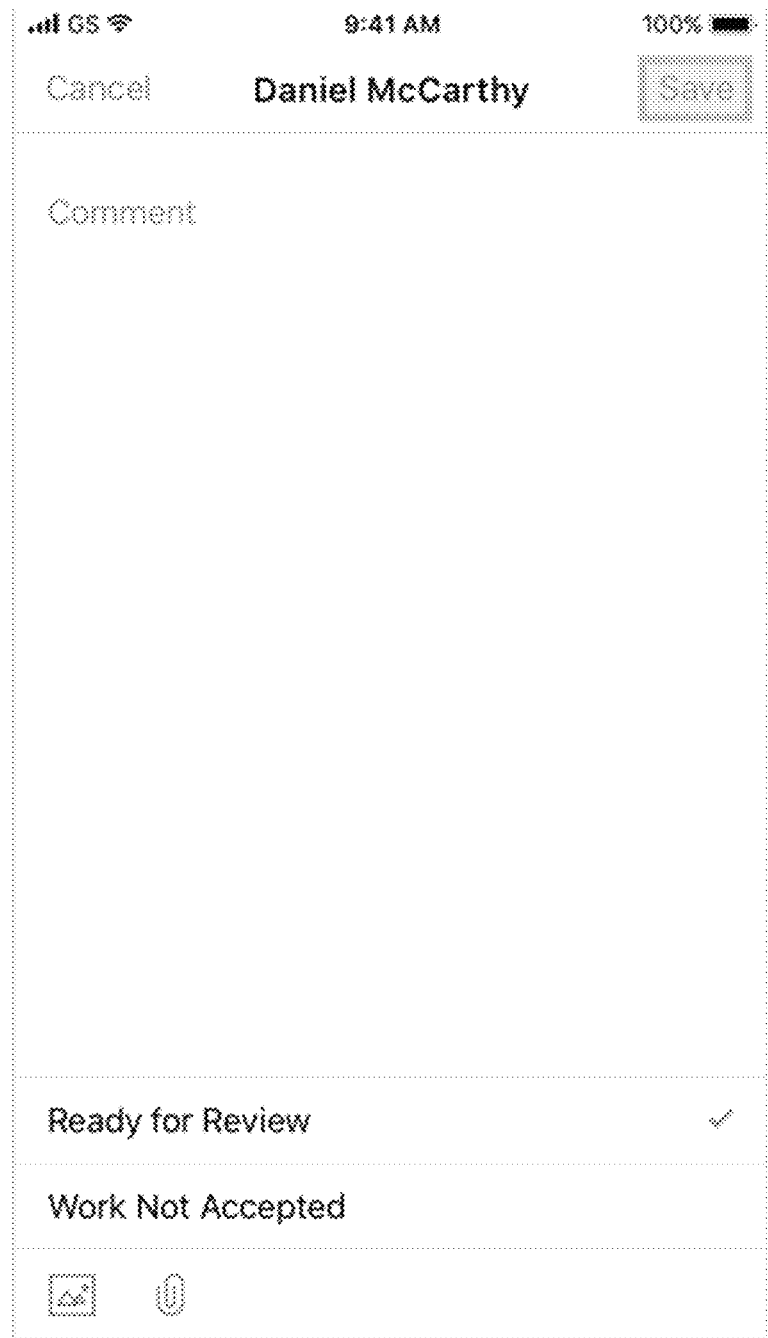
FIG. 10C depicts another example of a view that may be presented to an assignee while a punch item is in a "Work Not Accepted" state.

As shown in FIG. 10B, the updated punch-item view presented to the assignee may provide updated details regarding the given punch item (including the updated status) and may also enable the assignee to select his/her name from the list of assignees for the given punch item, which may in turn cause the assignee's client station to display a review view for the given punch item that enables the assignee to change his/her assignment status for the given punch item from not accepted back to ready for review. One example of such a review view is depicted in FIG. 10C. As shown in FIG. 10C, this review view for the given punch item may also allow the assignee to add comments or attachments to the given punch item, among other possibilities.

If the assignee believes that his/her respective work on the given punch item is acceptable, the assignee may select the "Ready for Review" option in the example view of FIG. 10C and may then select the "Save" control, which may trigger the assignee's client station to send a communication to the back-end platform indicating that the particular assignee has again marked his/her respective work on the given punch item as ready for review. In turn, the back-end platform may update the data defining the given punch item to reflect that the particular assignee has again marked his/her respective work on the given punch item as ready for review. Further, if no other assignee's assignment status is designated as "Work Not Accepted," the back-end platform may determine (and update the data defining the given punch item to reflect) that the state of the given punch item has transitioned from the "Work Not Accepted" state back to the "Ready for Review" state, and that the responsibility for the given punch item has transitioned from the particular assignee(s) for which the work was not accepted back to the punch item manager.

Figure 10D:
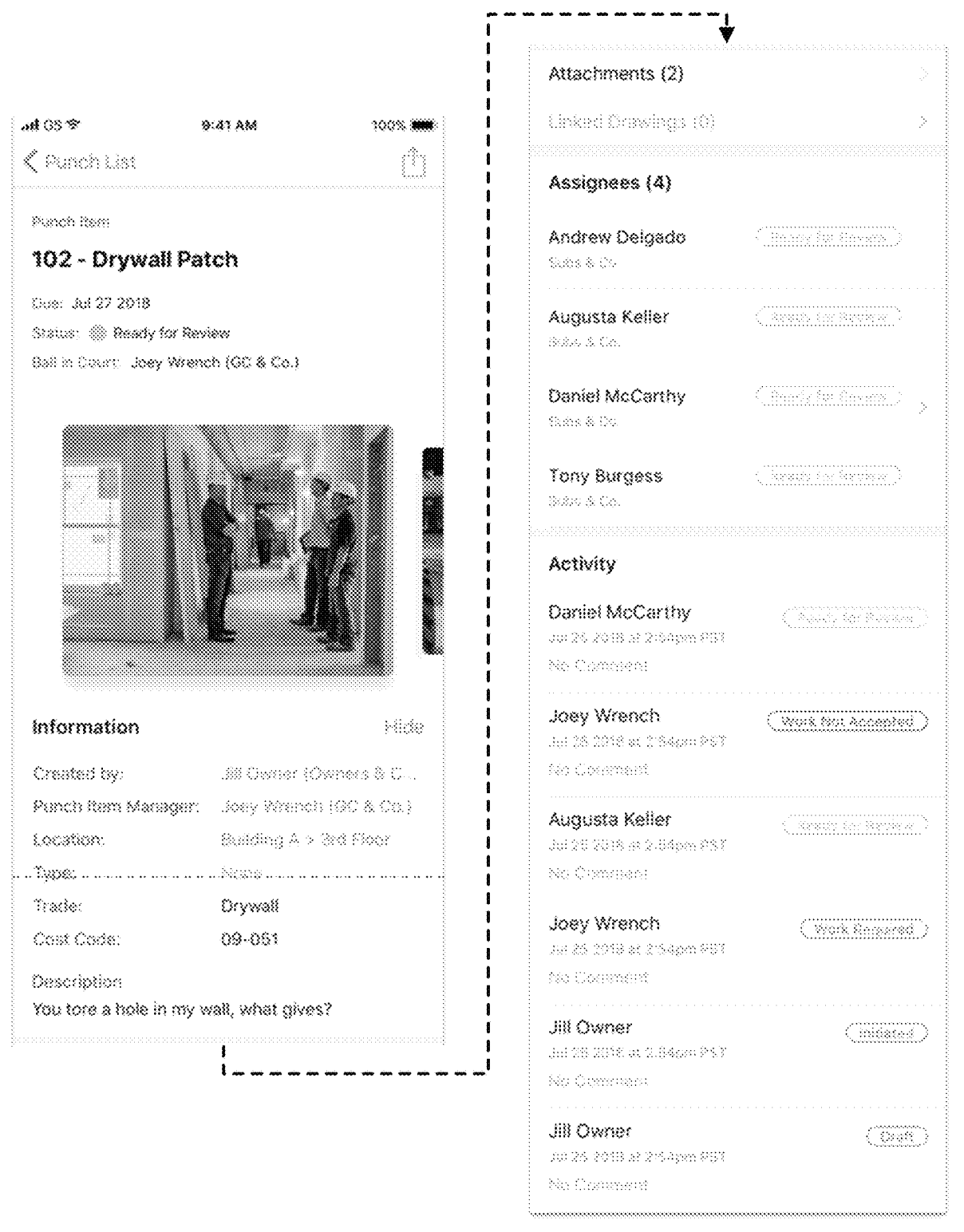

Thereafter, each assignee's client station may display a further updated punch-item view for the given punch item that reflects the further updated state of the given punch item. One example of this punch-item view is illustrated in FIG. 10D, which shows that (a) the status of the given punch item has been changed from "Work Not Accepted" back to "Ready for Review," (b) the responsibility for the given punch item has been transitioned back to the punch item manager for the given punch item, and (c) the assignment status for the particular assignee for which the work was not accepted (Daniel McCarthy in this example) has changed from "Work Not Accepted" back to "Ready for Review."

Once the given punch item has been transitioned back to the "Ready for Review" state, the punch item manager of the given punch item may again access one or more views of the punch item management tool that allow the punch item manager to review and/or take other actions with respect to the given punch item while it is in the "Ready for Review" state, such as indicating whether or not the punch item manager is going to accept the work performed by the assignees on the given punch item. Some possible examples of these views are illustrated in FIGS. 11A-E, which share similarities with the views illustrated in FIGS. 9A-C.

Figure 11A:
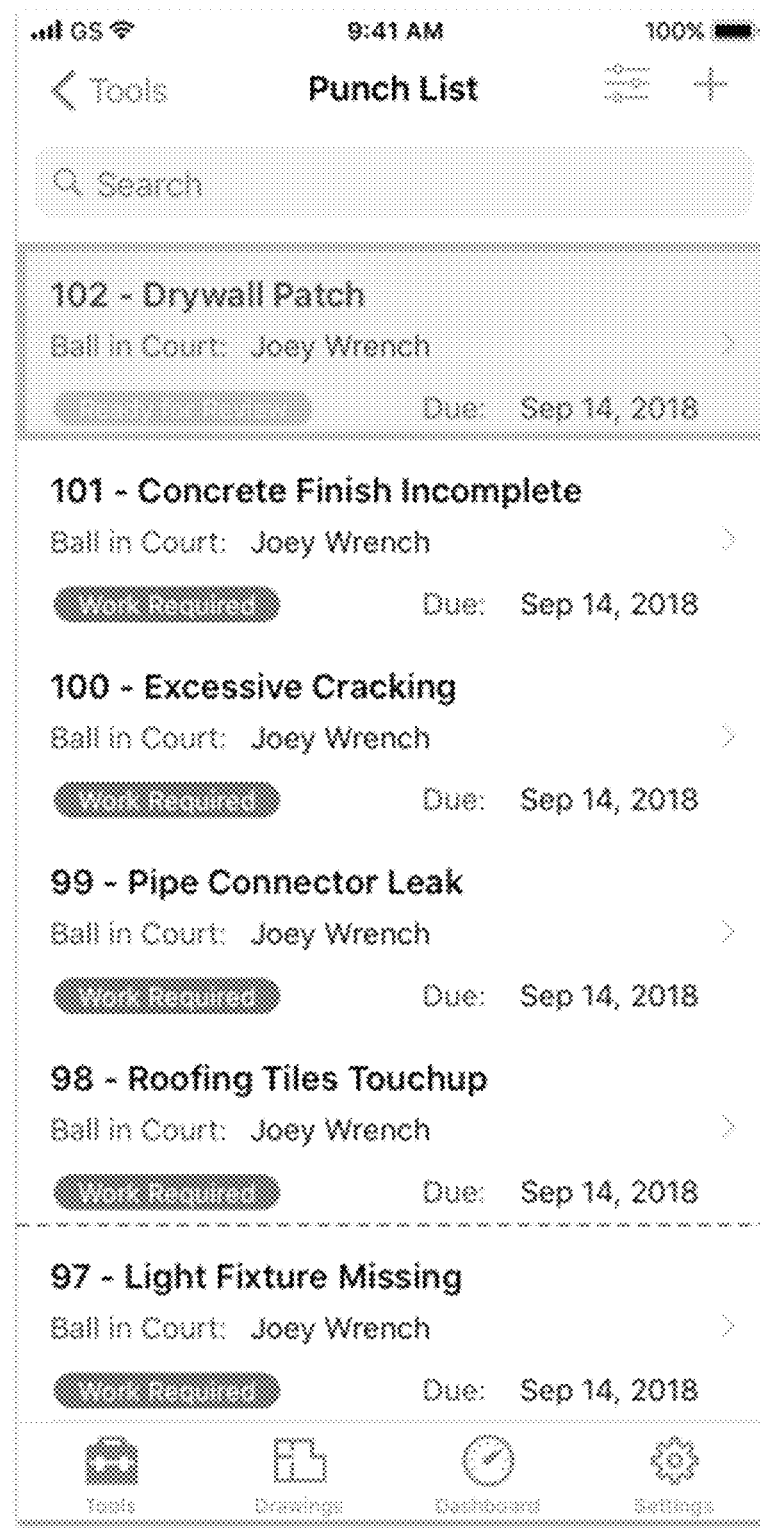
FIG. 11A depicts one example of a view that may be presented to a punch item manager while a punch item is in a "Ready for Review" state.

For instance, FIG. 11A depicts still another updated punch-list view that may be presented to the punch item manager, which indicates that the state of the given punch item has been transitioned back to "Ready for Review" and that responsibility for the given punch item has transitioned back to the punch item manager. Similar to what was described above with respect to FIG. 9A, the punch item manager may then select the given punch item from the punch list to review the details of that given punch item, which may cause the punch item manager's client station to display another updated punch-item view for the given punch item, one example of which is depicted in FIG. 11B.

Figure 11B:
FIG. 11B depicts another example of a view that may be presented to a punch item manager while a punch item is in a "Ready for Review" state.

From the punch-item view depicted in FIG. 11B, the punch item manager may select a particular assignee of the given punch item, which may trigger the punch item manager's client station to again display a review view that enables the punch item manager to indicate whether or not the work of that particular assignee is accepted. One example of such a review view is depicted in FIG. 11C, which is similar to the review view depicted in FIG. 9C.

Figure 11C:
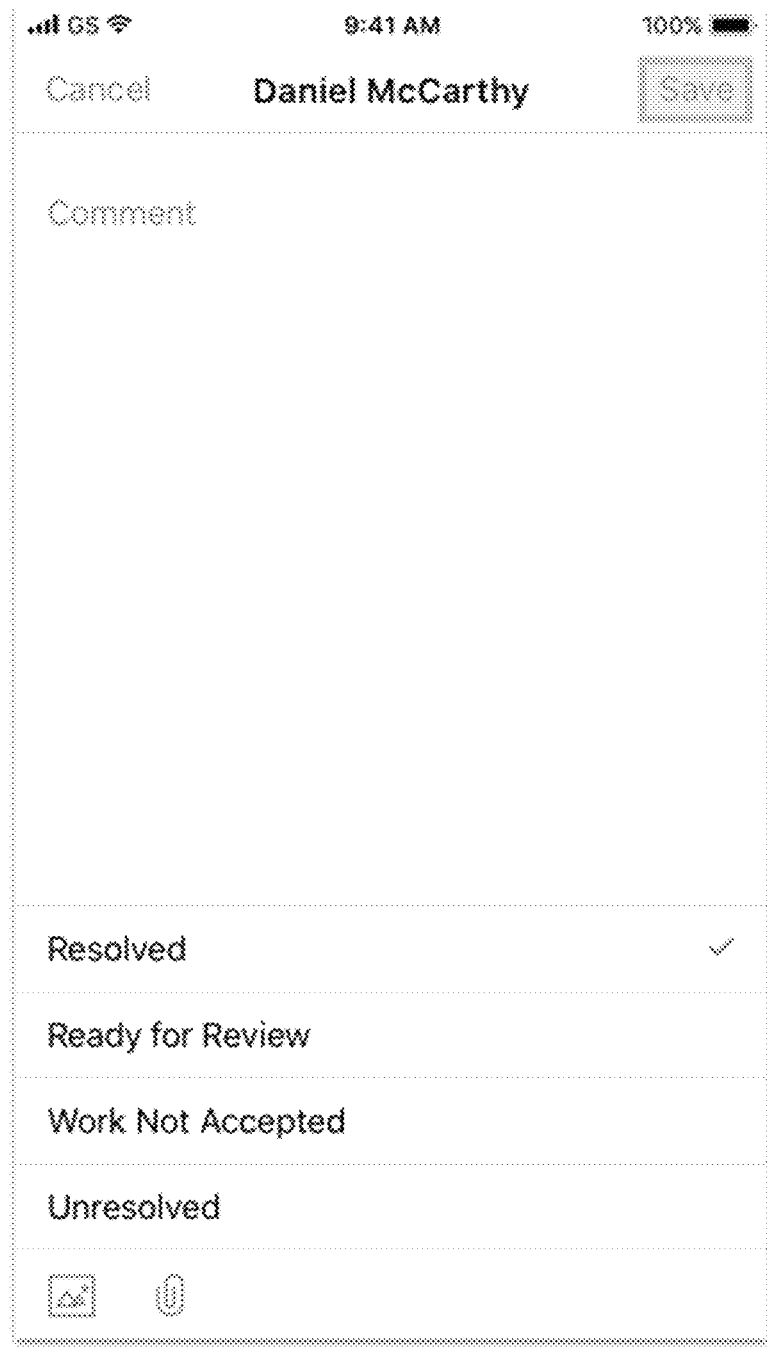
FIG. 11C depicts another example of a view that may be presented to a punch item manager while a punch item is in a "Ready for Review" state.

If the punch item manager chooses to accept the particular assignee's work (e.g., if the punch item manager considers the assignee's work to be satisfactory), the punch item manager may select the "Resolved" option in the example view of FIG. 11C and may then select the "Save" control. Thereafter, the punch item manager's client station may send a communication to the back-end platform indicating that the punch item manager has accepted the particular assignee's work. In turn, the back-end platform may update the data defining the given punch item to reflect that the punch item manager has deemed the particular assignee's work to be accepted.

Figure 11D:
FIG. 11D depicts another example of a view that may be presented to a punch item manager while a punch item is in a "Ready for Review" state.

Further, after the punch item manager selects/saves the "Resolved" option for the particular assignee of the given punch item, the punch item manager's client station may display an updated punch-item view for the given punch item, which reflects that the particular assignee's respective work on the given punch item has been accepted but that the respective work of the other assignees on the given punch item has not yet been accepted. One example of this punch-item view is illustrated in FIG. 11D, which shows that (a) the given punch item's state is still "Ready for Review" and the responsibility for the given punch item is still with the punch item manager, (b) the assignment status for Daniel McCarthy is marked as "Resolved," and (c) the assignment status for the other assignees is still marked as "Ready for Review."

The punch item manager may then carry out a similar sequence of steps for each of the other assignees, in order to indicate that the punch item manager has accepted each assignee's respective work on the given punch item. In this respect, each time the punch item manager indicates that a different assignee's respective work is accepted, the punch item manager's client station may send a communication to the back-end platform indicating that the punch item manager has accepted the assignee's respective work on the given punch item, and the back-end platform may update the data defining the given punch item to reflect that the punch item manager has accepted another assignee's respective work on the given punch item.

Or as another option, as shown in FIG. 11B, the punch-item view presented to the punch item manager may include a "Resolve All" control, which may enable the punch item manager to accept the respective work of every assignee of the given punch item in bulk fashion. In this respect, if the punch item manager selects the "Resolve All" control, the punch item manager's client station may send a communication to the back-end platform indicating that the punch item manager has accepted the respective work of every assignee of the given punch item, and the back-end platform may update the data defining the given punch item to reflect that the punch item manager has accepted every assignee's respective work on the given punch item.

Figure 11E:
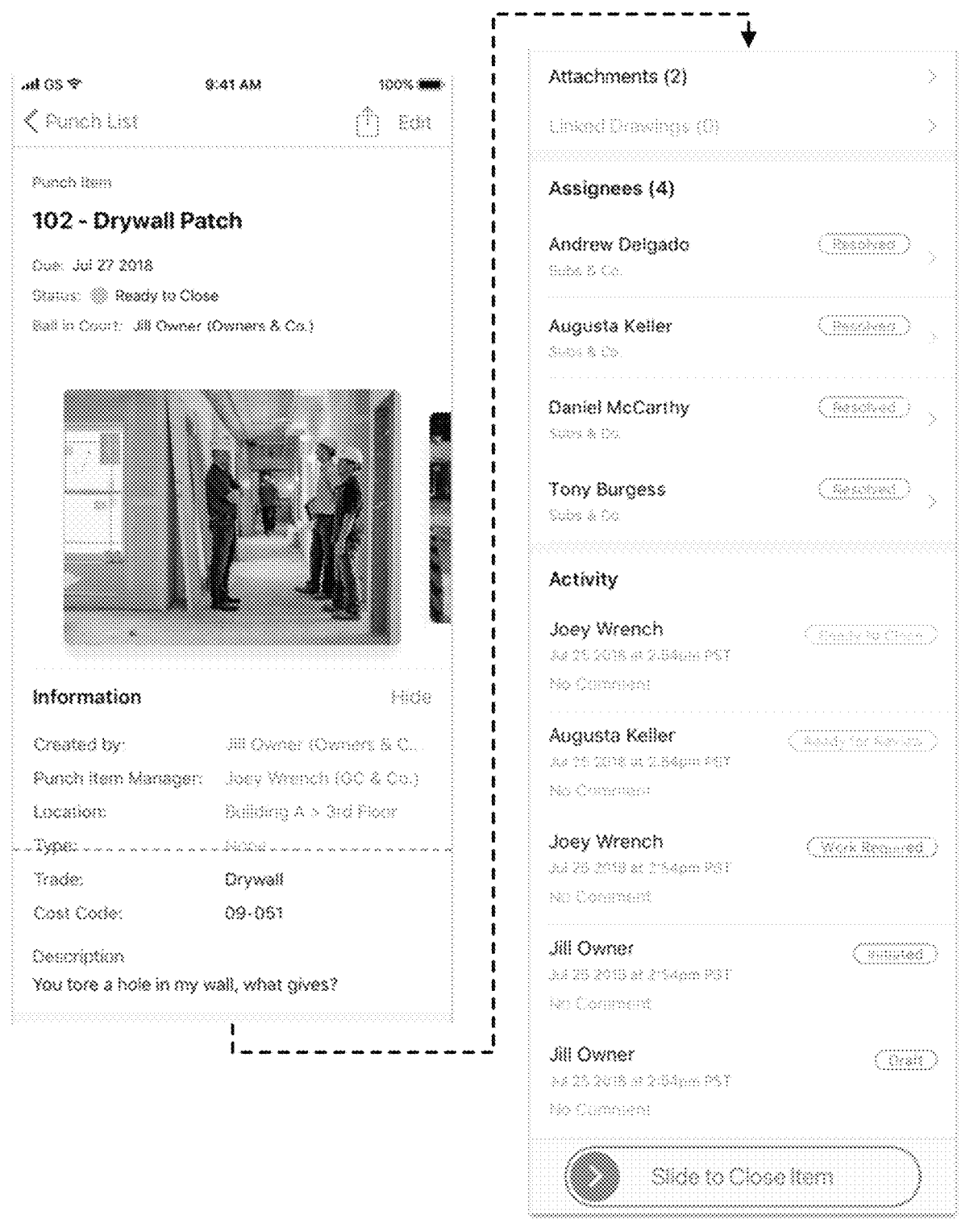

Once the punch item manager has accepted the respective work of every assignee of the given punch item (e.g., either one-by-one or in a bulk fashion), the back-end platform may then determine that the state of the given punch item has transitioned from the "Ready for Review" state to the "Ready to Close" state, and that the responsibility for the given punch item has transitioned from the punch item manager back to the creator for the given punch item. Thereafter, the punch item manager's client station may display an updated punch-item view for the given punch item that reflects the updated state of the given punch item. One example of this punch-item view is illustrated in FIG. 11E, which shows that the status of the given punch item has been changed from "Ready for Review" to "Ready to Close" and the responsibility for the given punch item has been transitioned back to the creator for the given punch item.

After the given punch item has been transitioned to the "Ready to Close" state, the creator (or another individual with a "final approver" role) may be able to access one or more views of the punch item management tool that allow the creator to review and/or take other actions with respect to the given punch item while it is in the "Ready to Close" state, such as indicating that the work performed on the given punch item is deemed acceptable such that the given punch item can be closed or indicating that the creator does not find the work performed on the given punch item to be acceptable. Some possible examples of these views are illustrated in FIGS. 12A-12D.

Figure 12A:
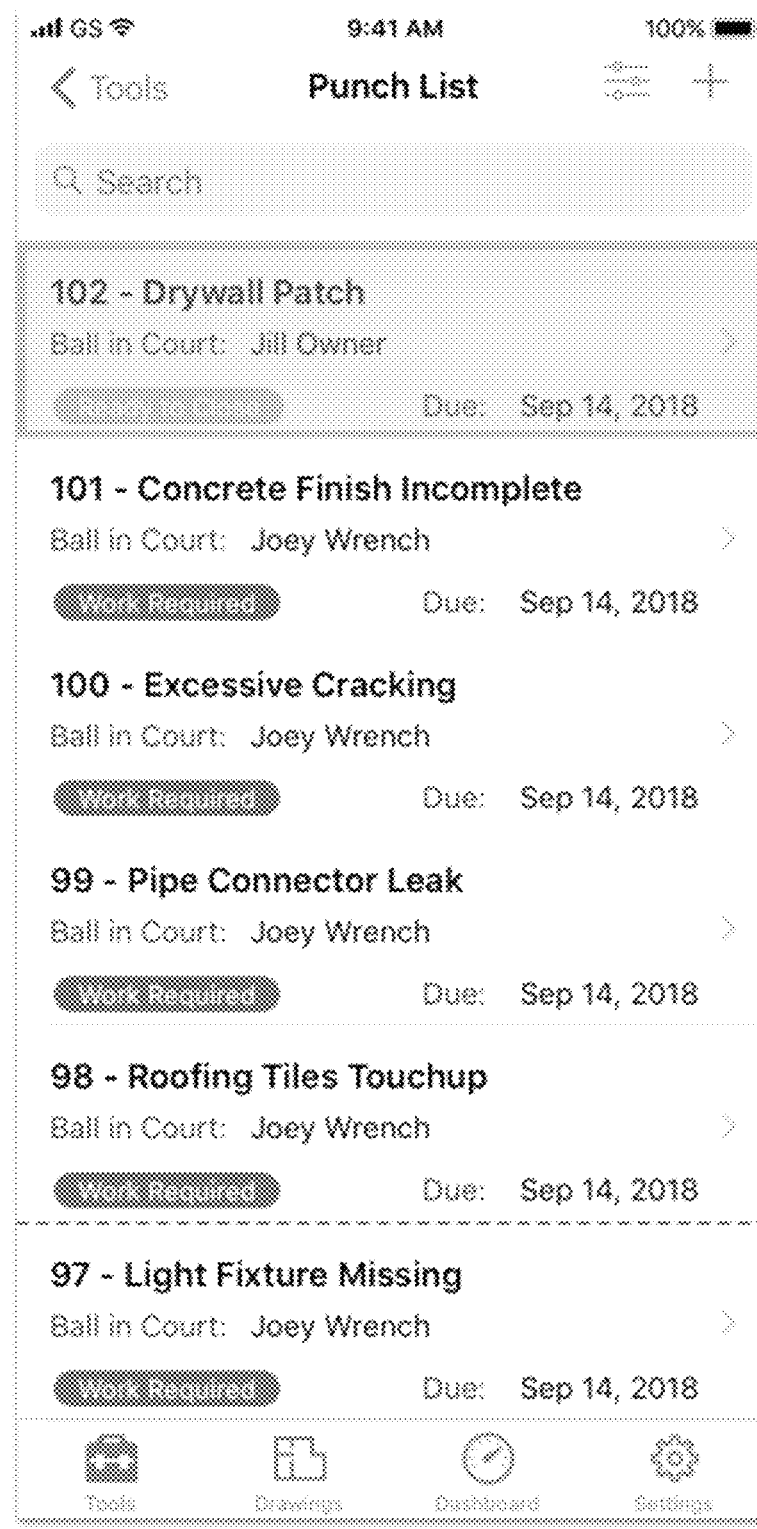
FIG. 12A depicts one example of a view that may be presented to a creator while a punch item is in a "Ready to Close" state.

For instance, FIG. 12A depicts an updated punch-list view that may be presented to the creator (or another individual with a "final approver" role) at this stage of the workflow, which indicates that the state of the given punch item has been transitioned to "Ready to Close" and that responsibility for the given punch item has transitioned back to the creator. From the punch-list view of FIG. 12A, the creator may select the given punch item to review the details of that given punch item, which may cause the creator's client station to display an updated punch-item view for the given punch item. One example of such an updated punch-item view is depicted in FIG. 12B.

Figure 12B:
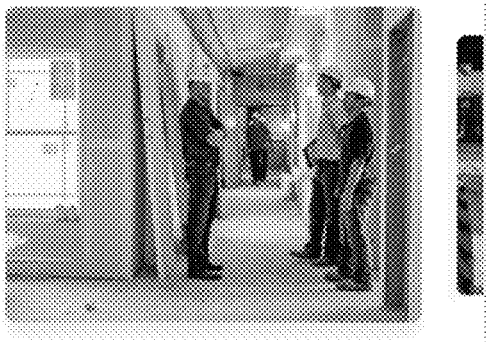
FIG. 12B depicts another example of a view that may be presented to a creator while a punch item is in a "Ready to Close" state.

As shown in FIG. 12B, the updated punch-item view may include a "Review Item" control and a "Slide to Close Item" control, either of which may be used by the creator to indicate whether the creator believes that work performed on the given punch item is acceptable enough to close the given punch item. For example, the creator may select the "Review Item" control, which may trigger the creator's client station to display a review view for the given punch item that enables the creator to indicate either that the given punch item is acceptable such that the given punch item can be closed or that the given punch item is not accepted. One example of such a review view is depicted in FIG. 12C.

Figure 12C:
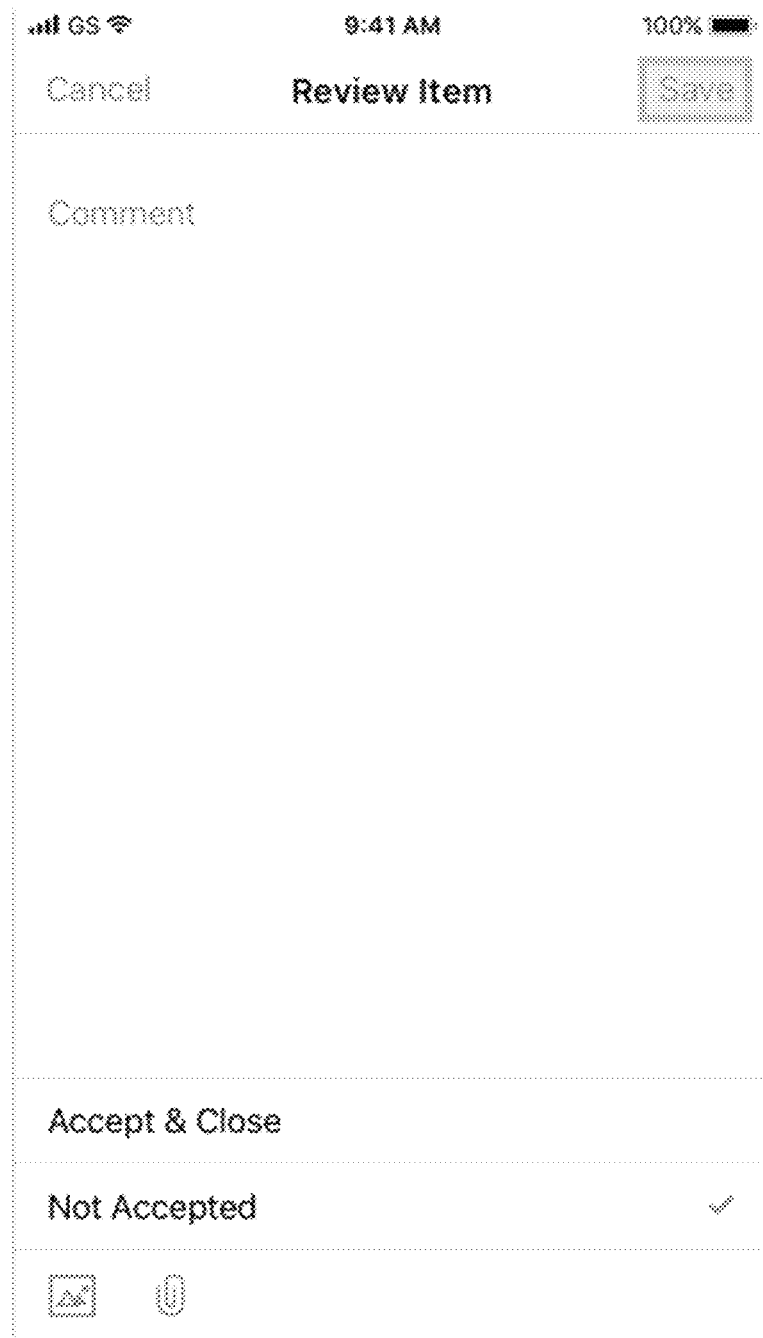
FIG. 12C depicts another example of a view that may be presented to a creator while a punch item is in a "Ready to Close" state.

To the extent that the creator chooses not to accept the work performed on the given punch item, the creator (or another individual with a "final approver" role) may select the "Not Accepted" option in the example view of FIG. 12C and may then select the "Save" control. Thereafter, the creator's client station may send a communication to the back-end platform indicating that the creator has declined to accept the work performed on the given punch item. In turn, the back-end platform may determine (and update the data defining the given punch item to reflect) that the state of the given punch item has transitioned from the "Ready to Close" state to the "Not Accepted" state, and that the responsibility for the given punch item has transitioned from the creator back to the punch item manager for the given punch item.

Figure 12D:
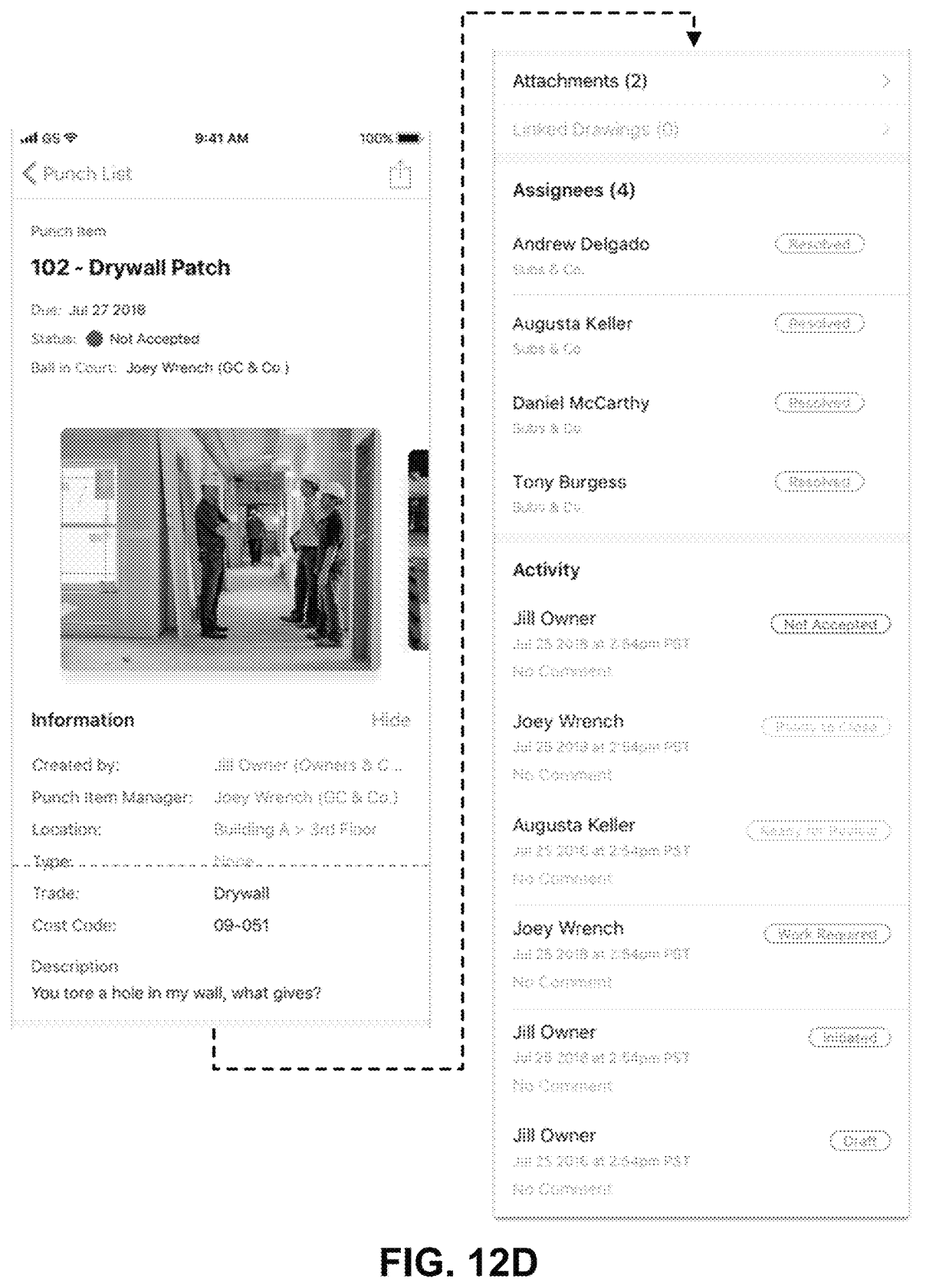

Further, after the creator selects/saves the "Not Accepted" option for the given punch item, the creator's client station may display a further updated punch-item view for the given punch item that reflects the further updated state of the given punch item. One example of this punch-item view is illustrated in FIG. 12D, which shows that the status of the given punch item has been changed from "Ready to Close" to "Not Accepted" and the responsibility for the given punch item has been transitioned back to the punch item manager for the given punch item.

After the given punch item has been transitioned to the "Not Accepted" state, the punch item manager may access one or more views of the punch item management tool that allow the punch item manager to review and/or take other actions with respect to the given punch item while it is in the "Not Accepted" state, such as requesting that the given punch item be sent back to its assignee(s) or requesting that the given punch item be sent back to the creator. Some possible examples of these views are illustrated in FIGS. 13A-13F.

Figure 13A:
FIG. 13A depicts one example of a view that may be presented to a punch item manager while a punch item is in a "Not Accepted" state.

For instance, FIG. 13A depicts an updated punch-list view that may be presented to the punch item manager at this stage of the workflow, which indicates that the state of the given punch item has been transitioned to "Not Accepted" and that responsibility for the given punch item has again transitioned back to the punch item manager. Similar to what was described above with respect to the other example punch-list views, the punch item manager may then select the given punch item from the punch list to review the details of that given punch item, which may cause the punch item manager's client station to display another updated punch-item view for the given punch item, one example of which is depicted in FIG. 13B.

Figure 13B:
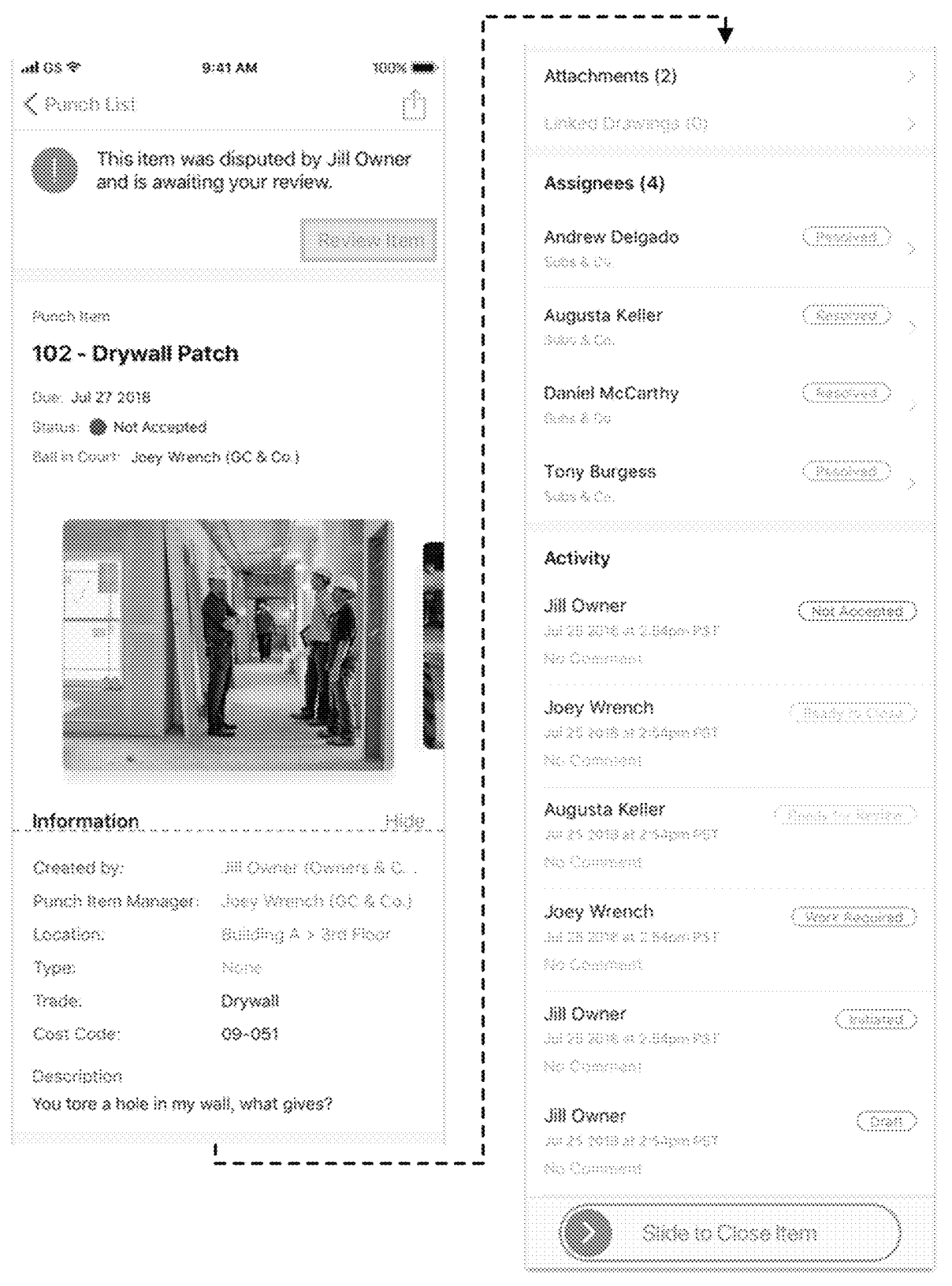
Figure 13C:
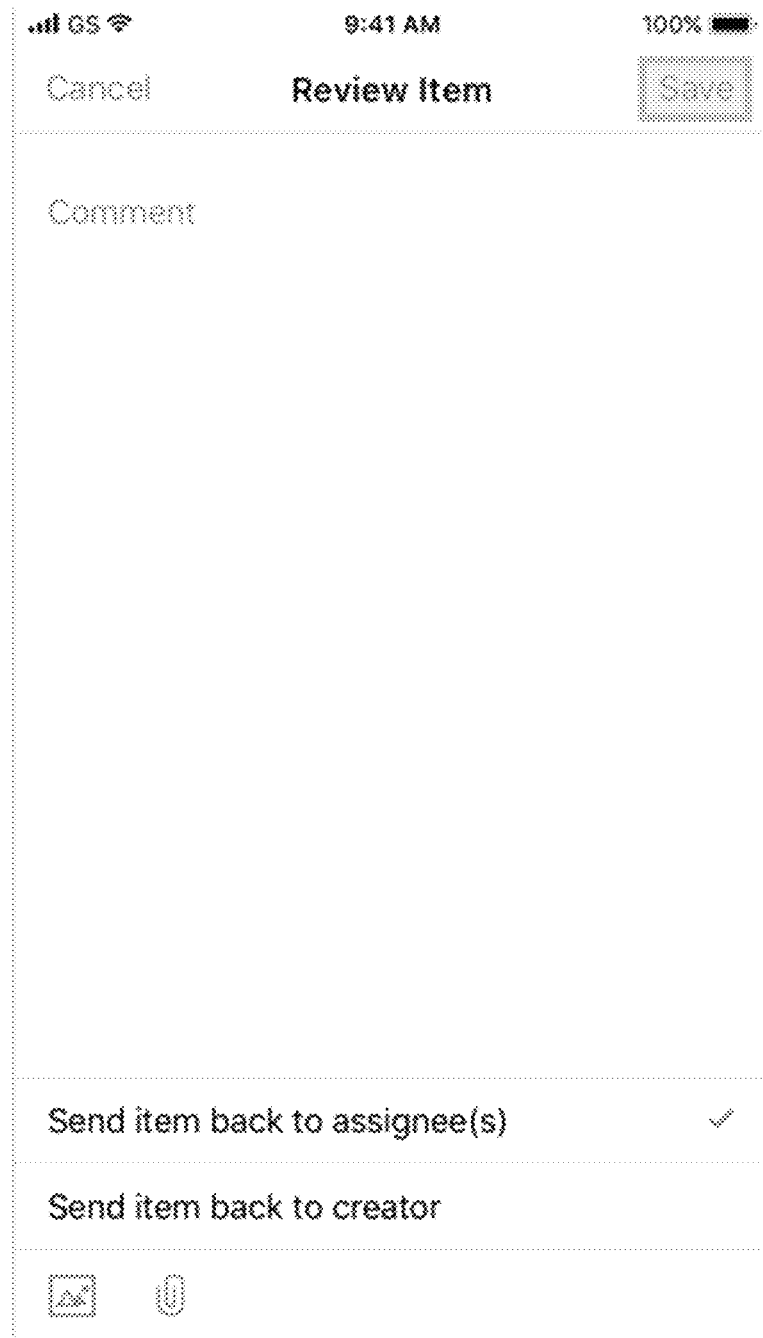
FIG. 13C depicts another example of a view that may be presented to a punch item manager while a punch item is in a "Not Accepted" state.

From the updated punch-item view depicted in FIG. 13B, the punch item manager may select the "Review Item" control, which may trigger the punch item manager's client station to display a review view for the given punch item that enables the punch item manager to either request that the given punch item be sent back to its assignee(s) or request that the given punch item be sent back to the creator. One example of such a review view is depicted in FIG. 13C, which presents the punch item manager with one of two options: (1) "Send item back to assignee(s)," which causes the given punch item to be sent back to the assignee(s) of the given punch item, or (2) "Send item back to creator," which causes the given punch item to be sent back to the creator. As shown in FIG. 13C, this review view for the given punch item may also allow the assignee to add comments or attachments, among other possibilities.

To the extent that the punch item manager decides to have the given punch item sent back to the assignee(s) of the given punch item, the punch item manager may select the "Send item back to assignee(s)" option as shown in the example view of FIG. 13C, and may then select the "Save" control. Thereafter, the punch item manager's client station may send a communication to the back-end platform indicating that the punch item manager has requested the given punch item to be sent back to the assignee(s) of the given punch item. In turn, the back-end platform may update the data defining the given punch item to reflect that (a) the assignment status for the assignee(s) of the given punch item have been changed from "Resolved" to "Work Not Accepted," (b) the state of the given punch item has transitioned from the "Not Accepted" state to a "Work Not Accepted" state, and (c) the responsibility for the given punch item has transitioned from the punch item manager to the assignee(s) of the given punch item.

Figure 13D:
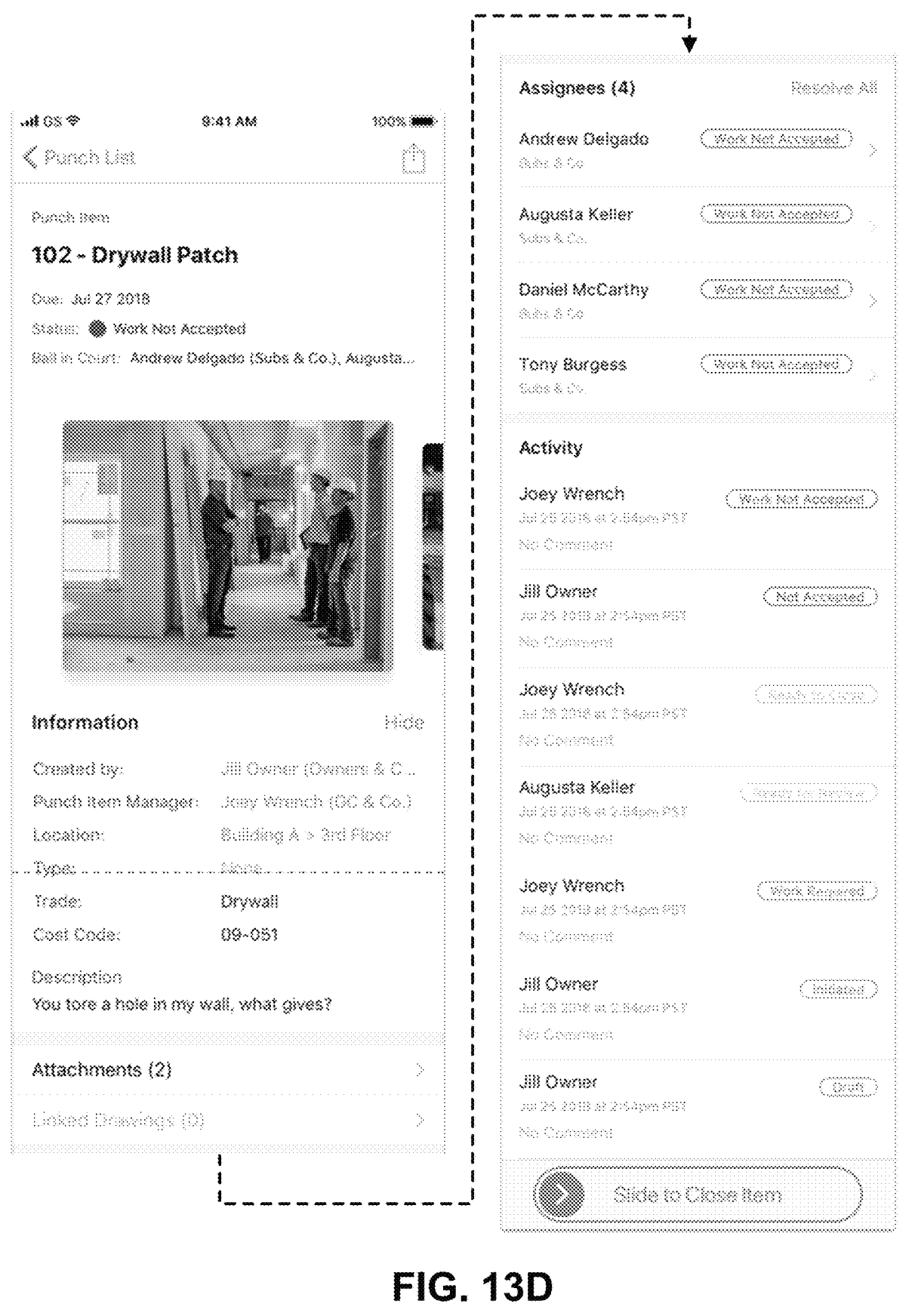

Further, after the punch item manager selects/saves the "Send item back to assignee(s)" option for the given punch item, the punch item manager's client station may display an updated punch-item view for the given punch item that reflects the updated state of the given punch item. One example of this punch-item view is illustrated in FIG. 13D, which shows that (a) the status of the given punch item has been changed from "Not Accepted" to "Work Not Accepted," (b) the responsibility for the given punch item has been transitioned to the assignee(s) of the given punch item, and (c) the assignment status for each assignee of the given punch item has changed from "Resolved" to "Work Not Accepted."

As shown in FIG. 3, the punch item manager's decision to send the given punch item back to the assignee(s) may then return the given punch item to the same "Work Not Accepted" state that was described above with reference to FIGS. 10A-D. In this respect, each assignee of the given punch item may undertake further work on the given punch item (as appropriate) and then use views similar to those illustrated in FIGS. 10A-D to update the assignee's assignment status for the given punch item from not accepted back to ready for review, which may in turn cause the state of the given punch item to be transitioned from the "Work Not Accepted" state to the "Ready for Review" state discussed above with reference to FIGS. 11A-E. Thereafter, the punch item manager may use views similar to those illustrated in FIGS. 11A-E to indicate that the additional work performed by the assignees on the given punch item has been deemed acceptable, which may in turn cause the state of the given punch item to return to the "Ready to Close" state.

Figure 13E:
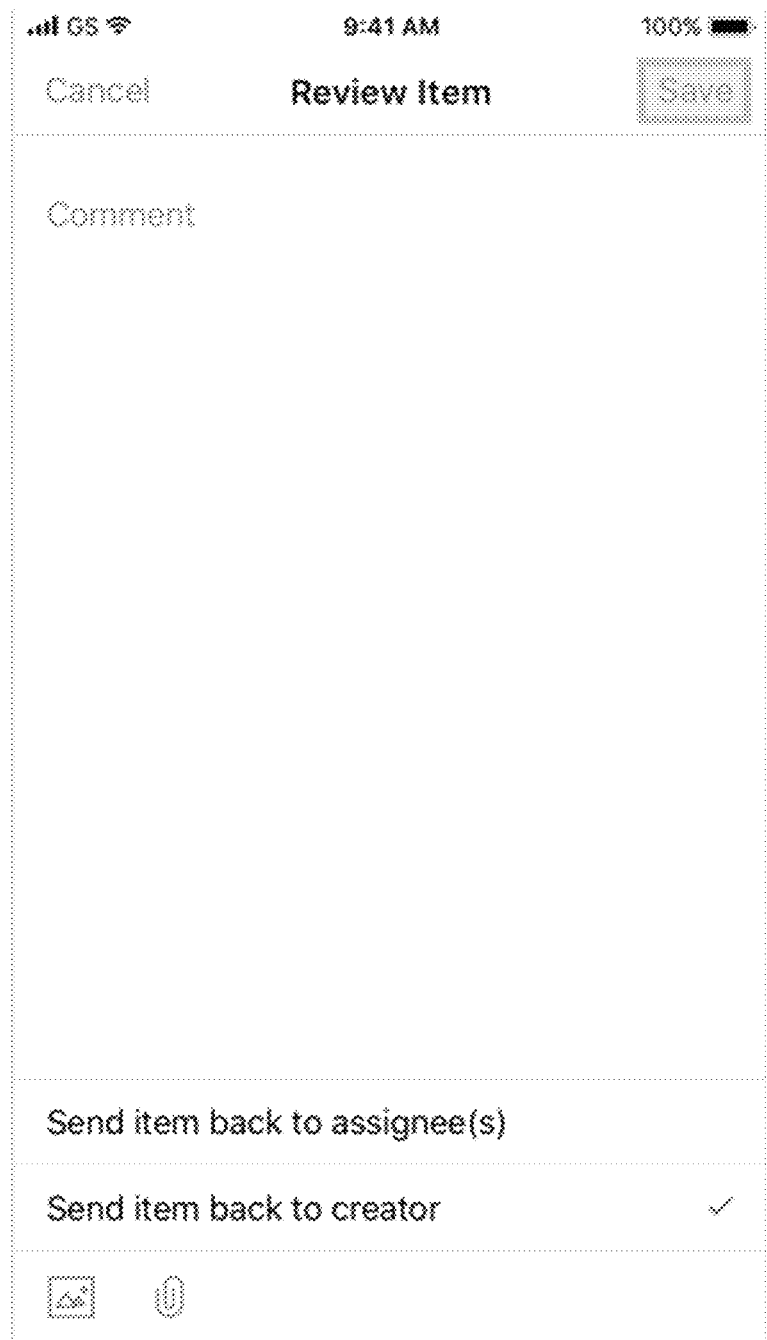
FIG. 13E depicts another example of a view that may be presented to a punch item manager while a punch item is in a "Not Accepted" state.

After the punch item manager selects the "Review Item" control of the updated punch-item view of FIG. 13B and the punch item manager's client station displays the review view for the given punch item, instead of requesting that the given punch item be sent back the assignee(s) as depicted in FIG. 13C, the punch item manager may request that the given punch item be sent back to the creator (or another individual with a "final approver" role). FIG. 13E depicts another snapshot of the example review window that is in line with this example.

To the extent that the punch item manager decides to have the given punch item sent back to the creator of the given punch item, the punch item manager may select the "Send item back to creator" option as shown in the example view of FIG. 13E, and may then select the "Save" control. Thereafter, the punch item manager's client station may send a communication to the back-end platform indicating that the punch item manager has requested the given punch item to be sent back to the creator of the given punch item. In turn, the back-end platform may update the data defining the given punch item to reflect that the state of the given punch item has transitioned from the "Not Accepted" state back to the "Ready to Close" state and that the responsibility for the given punch item has transitioned from the punch item manager back to the creator of the given punch item.

Figure 13F:
FIG. 13F depicts another example of a view that may be presented to a punch item manager while a punch item is in a "Not Accepted" state.

Further, after the punch item manager selects/saves the "Send item back to creator" option for the given punch item, the punch item manager's client station may display an updated punch-item view for the given punch item that reflects the updated state of the given punch item. One example of this punch-item view is illustrated in FIG. 13F, which shows that the status of the given punch item has been changed from "Not Accepted" to "Ready to Close" and that the responsibility for the given punch item has been transitioned to the creator of the given punch item.

Thus, as shown above, either of the options selected by the punch item manager may ultimately result in the given punch item being returned to the "Ready to Close" state, at which point the creator (or another individual with a "final approver" role) may again be able to access one or more views of the punch item management tool that allow the creator to review and/or take other actions with respect to the given punch item while it is in the "Ready to Close" state, such as indicating that the given punch item can be closed or indicating that the creator does not find the work performed on the given punch item to be acceptable. Some possible examples of these views are illustrated in FIGS. 14A-14D, which share similarities with the views illustrated in FIGS. 12A-12D.

Figure 14A:
FIG. 14A depicts one example of a view that may be presented to a creator after a punch item has been returned to a "Ready to Close" state.

For instance, FIG. 14A depicts an updated punch-list view that may be presented to the creator (or another individual with a "final approver" role) at this stage of the workflow, which indicates that the state of the given punch item has again been transitioned to "Ready to Close" and that responsibility for the given punch item has again been transitioned to the creator. From the punch-list view of FIG. 14A, the creator may select the given punch item to review the details of that given punch item, which may cause the creator's client station to display an updated punch-item view for the given punch item. One example of such an updated punch-item view is depicted in FIG. 14B, which is similar to the punch-item view of FIG. 12B.

Figure 14B:
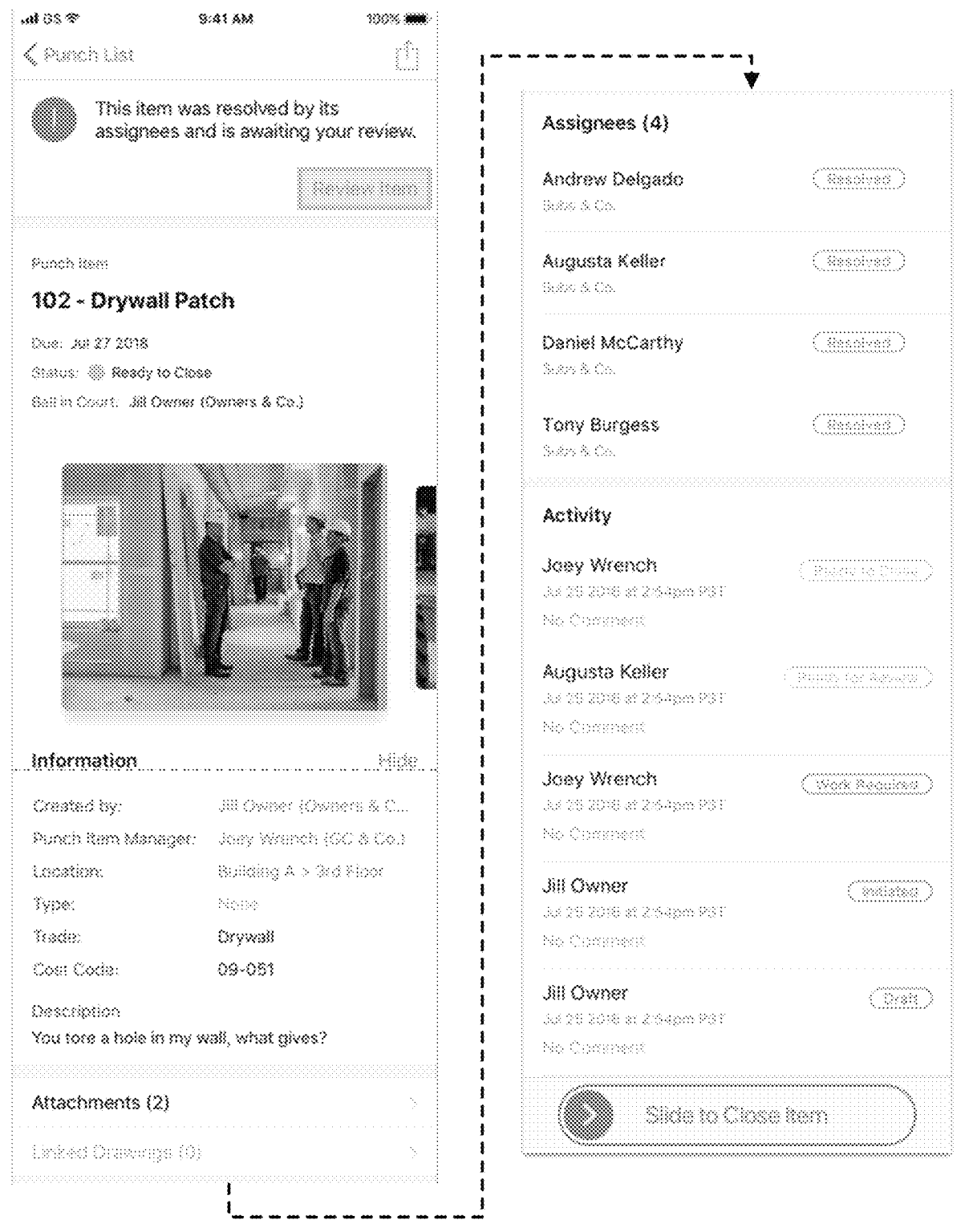

Indeed, as with the punch-item view of FIG. 12B, the punch-item view of FIG. 14B may include a "Review Item" control and a "Slide to Close Item" control, either of which may be used by the creator (or another individual with a "final approver" role) to indicate whether the creator believes that work performed on the given punch item is acceptable enough to close the given punch item. For example, if the creator believes that the work performed on the given punch item is acceptable such that the given punch item can be closed, the creator can either slide the "Slide to Close Item" control on the updated punch-item view of FIG. 14B or select the "Review Item" control, which may trigger the creator's client station to display a review view for the given punch item that enables the creator to indicate that the given punch item has been accepted and can be closed. One example of such a review view is depicted in FIG. 14C, which is similar to the review view depicted in FIG. 12C.

Figure 14C:
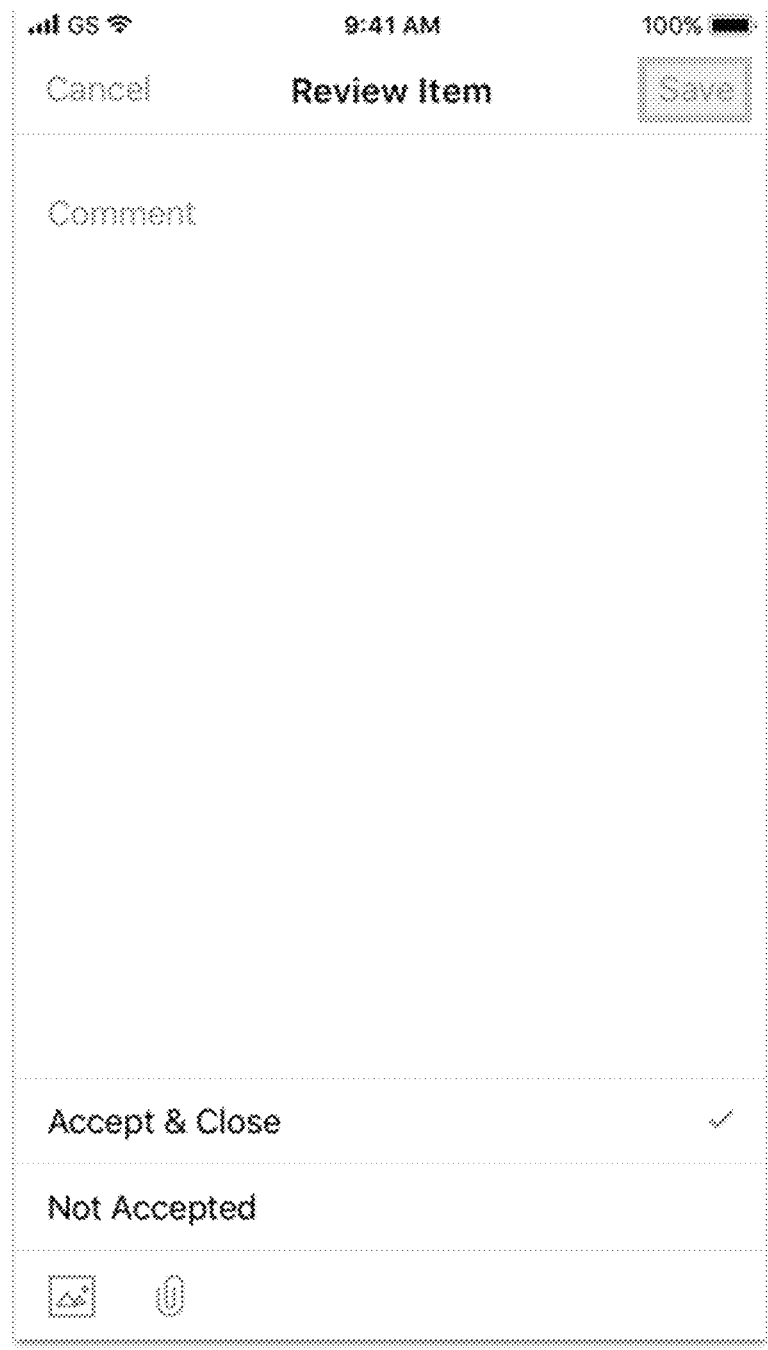
FIG. 14C depicts another example of a view that may be presented to a creator after a punch item has been returned to a "Ready to Close" state.

To the extent that the creator (or another individual with a "final approver" role) chooses to accept the work performed on the given punch item, the creator may request that the given punch item be closed via either the "Slide to Close Item" control or the review window (e.g., by selecting/saving the Accept & Close" option in the example view of FIG. 14C). Thereafter, the creator's client station may send a communication to the back-end platform indicating that the creator has requested that the given punch item be closed. In turn, the back-end platform may determine (and update the data defining the given punch item to reflect) that the state of the given punch item has transitioned from the "Ready to Close" state to the "Closed" state, and that the responsibility for the given punch item has transitioned from the creator to "none" (i.e., no individual has responsibility for the given punch item).

Figure 14D:
FIG. 14D depicts another example of a view that may be presented to a creator after a punch item has been returned to a "Ready to Close" state.

Further, after the creator requests that the given punch item be closed, the creator's client station may display a further updated punch-item view for the given punch item that reflects the further updated state of the given punch item. One example of this punch-item view is illustrated in FIG. 14D, which shows that the status of the given punch item has been changed from "Ready to Close" to "Closed" and the responsibility for the given punch item is listed as "none."

Once the given punch item has transitioned to the "Closed" state, the "Full" workflow for the given punch item is considered to be complete.

While the "Full" workflow is described as being performed in a given order, it should be understood that the "Full" workflow may be performed in various other orders as well. Further, the "Full" workflow may include other states and/or take other forms.

B. "PMC" Workflow

Figure 15:
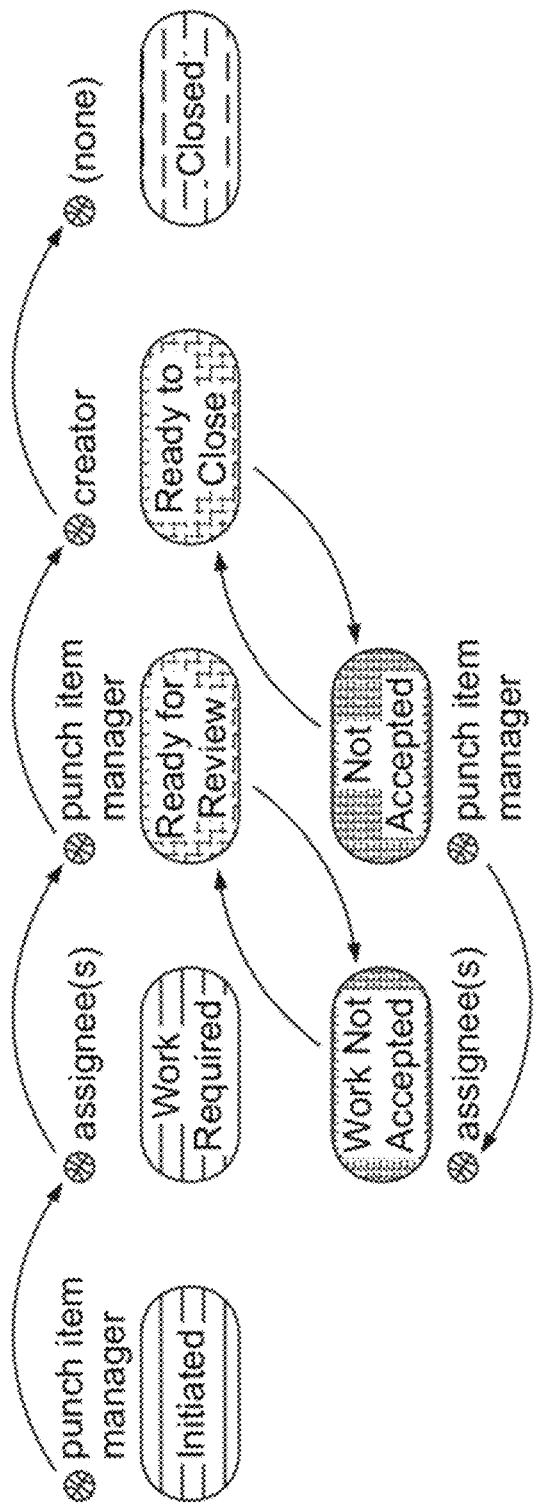
FIG. 15 illustrates a state diagram for a "PMC" workflow provided by the disclosed punch list management tool.

An overview of a "PMC" workflow provided by punch item management tool is shown in FIG. 15. As shown, FIG. 15 represents a state diagram for the "PMC" workflow provided by the punch list management tool, where each different state is designated by a rounded rectangle that includes the name of the state. Further, FIG. 15 shows a basketball icon for each state that indicates the particular user responsible for the punch item at that state. Further yet, FIG. 15 shows arrows that indicate the possible transitions between the different states of the "PMC" workflow.

At a high level, the "PMC" workflow includes fewer states and involves fewer roles in the workflow relative to the "Full" workflow. More particularly, the "PMC" Workflow includes the "Initiated," "Work Required," "Ready for Review," "Work Not Accepted," "Ready to Close," and "Closed" states that are also included in the "Full" workflow but omits other states from the "Full Workflow." In terms of roles, as discussed above, the "PMC" Workflow combines the creator and punch item manager roles into a dual PMC role served by one given user and then has one or more assignee roles served by one or more other users.

As with the "Full" workflow, each of the states shown in the "PMC" workflow may have an associated set of "views" (e.g., GUI screens) that may be presented to the particular user responsible for a punch item while it is in a particular state. This set of views may enable the responsible user to take various actions with respect to the punch item, and at some point, the user's actions may result in the punch item transitioning to the next state of the workflow.

The different states of a punch item in the "PMC" workflow (and the actions that may be performed by the responsible user with respect to the punch item during each state) will now be described in further detail with reference to FIGS. 16-21, which show examples of different views that may be presented to a user during each of the states in the "PMC" workflow for coordinating and guiding the process of taking a given punch item from creation to completion.

In the screenshot of FIGS. 16-21, the given punch item that is the primary focus of the workflow is again the punch item entitled "102—Drywall Patch," but it will be apparent that the views illustrated in these screenshots may enable activity to be taken with respect to various other punch items as well (e.g., one or more other punch items that are part of the same punch list as the given punch item). Further, in the screenshots of FIGS. 16-21, "Joey Wrench" is the individual serving the dual PMC role for the given punch item, while "Andrew Delgado," "Augusta Keller," "Daniel McCarthy," and "Tony Burgess" are the individuals serving assignee roles for the given punch item.

As shown in FIG. 15, the "PMC" workflow may begin with a dual "Draft"/"Initiated" state of the given punch item. At a high level, the dual "Draft/"Initiated" state of the given punch item may be initiated when the PMC begins the activity of creating the given punch item, and may conclude when the PMC request that the given punch item be sent to the one or more assignees, at which point the given punch item may be transitioned to the "Work Required" state during and responsibility for the given punch item is transferred item from the PMC to the one or more assignees. In this respect, during the dual "Draft"/"Initiated" state of the given punch item, the PMC may be able to access one or more views of the punch item management tool that allow the PMC to create, review, and assign the given punch item. Some possible examples of these views are illustrated in FIGS. 16A-D, which may share similarities with the views presented to the users serving separate creator and punch item manager roles in the "Full" workflow.

Figure 16A:
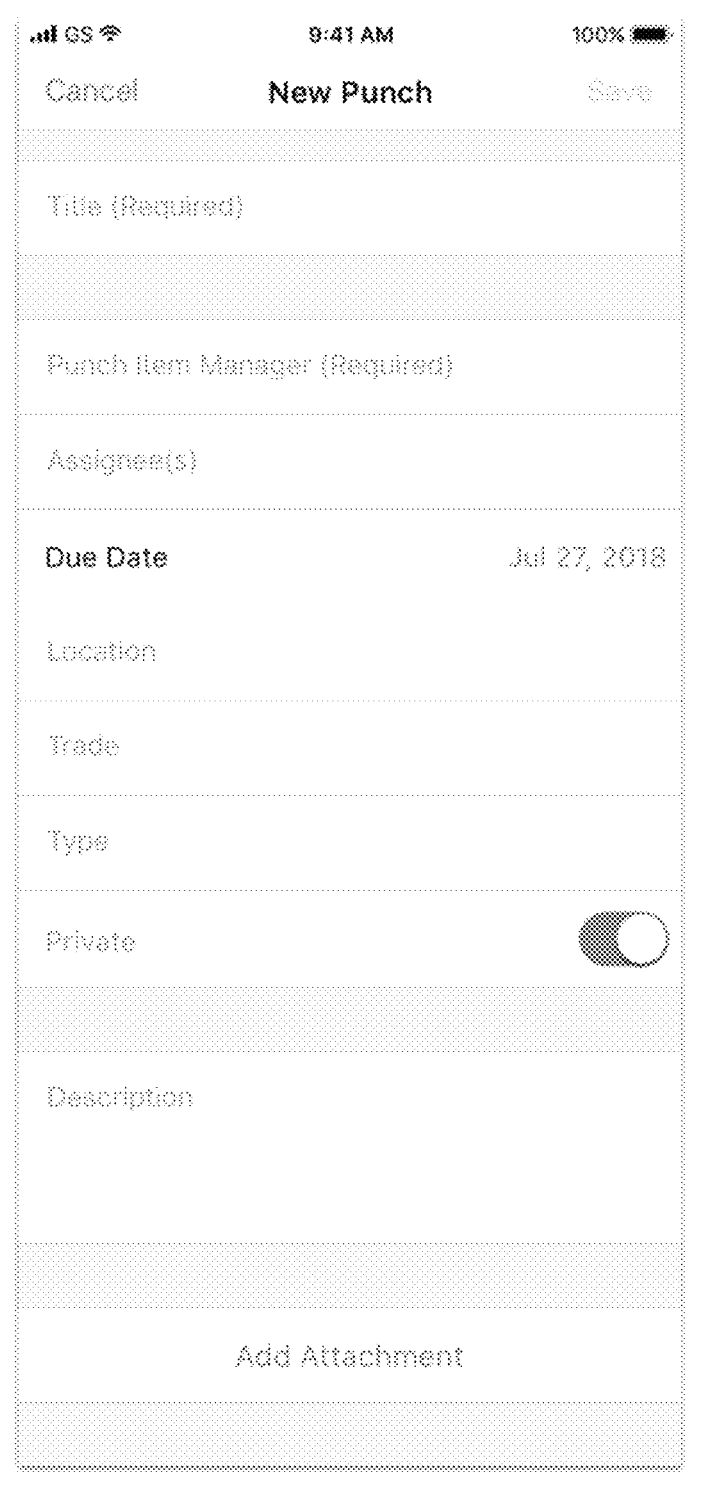
Figure 16B:
FIG. 16B depicts another example of a view that may be presented to a PMC while a punch item is in a dual "Draft"/"Initiated" state.

For instance, similar to the manner in which a given punch item is created in the "Full" workflow, the PMC may be presented with a punch-creation view that allows the PMC to create a new punch item, one example of which is depicted in FIG. 16A. In line with the discussion above, the PMC may populate the fields shown in the punch-creation view by manually entering punch item data for the given punch item and/or by selecting a template. An example of a punch-creation view that has been populated is then illustrated in FIG. 16B.

As shown in the punch-item views of FIGS. 16A-B, in addition to the fields that are presented to a standard creator, the punch-creation view presented to the PMC may also have additional fields not available to a standard creator that enable the PMC to input additional data for the given punch item, such as fields that enable the PMC to add or remove assignees and/or give the given punch item a due date. Further, unlike a standard creator, a PMC is presented with the ability to select himself/herself as the punch item manager for the given punch item.

After the PMC finishes entering the punch item data for a given punch item, the PMC may request that the given punch item be saved to a punch list by selecting a user interface control, such as the "Save" button control illustrated in the punch-creation view of FIGS. 16A-B.

Figure 16C:
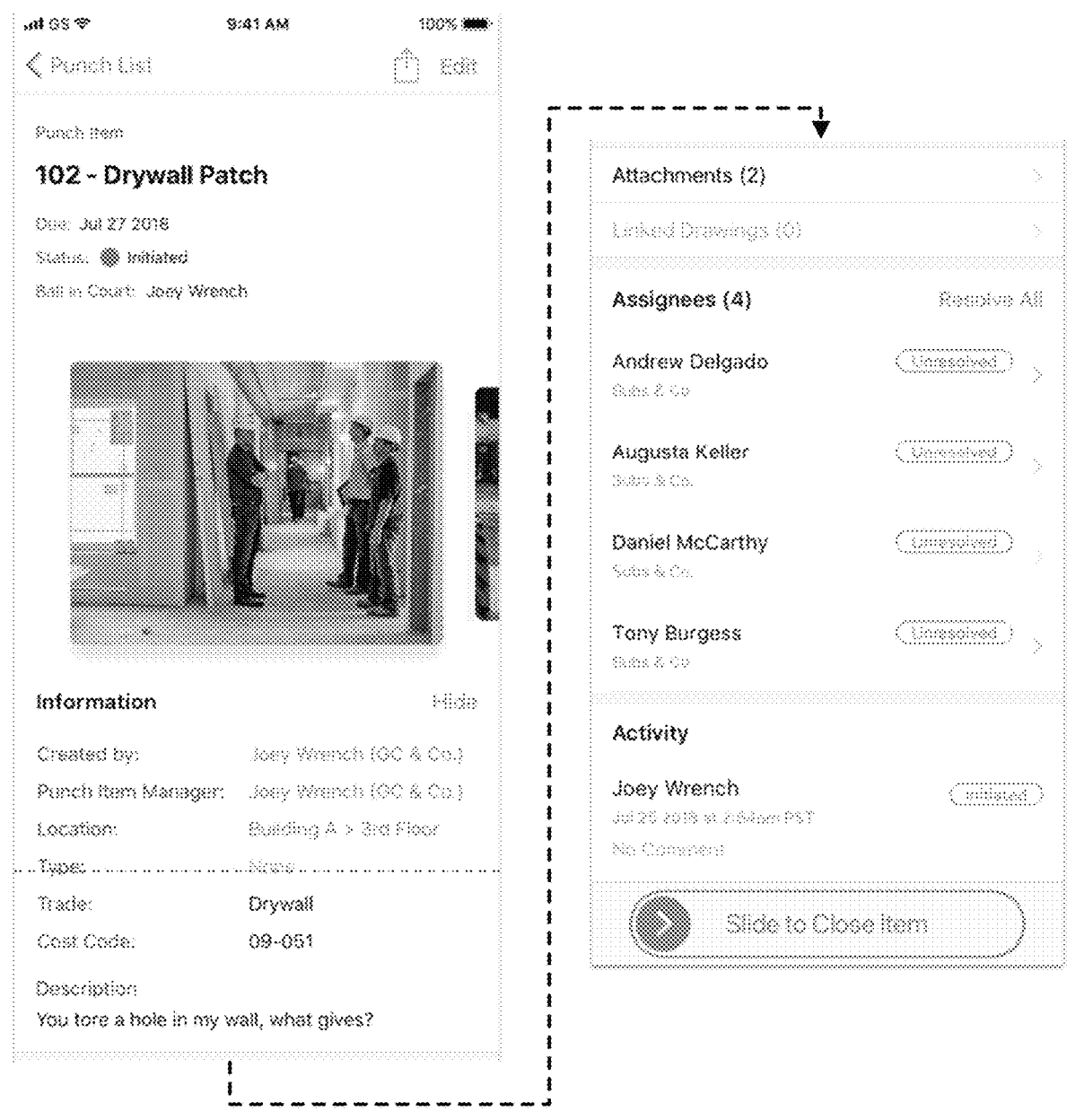

After the PMC has saved the given punch item, the PMC may be presented with a punch-item view for viewing and editing the given punch item, one example of which is depicted in FIG. 16C. As shown, the punch-item view may indicate that the given punch is in the "Initiated" state at this stage of the workflow, due to the fact that the given punch item was created by the user serving the dual roles of creator and punch item manager. At a high level, the punch-item view may allow the PMC to edit the previously-saved given punch item, view the assignees of the given punch item, view any activity associated with the given punch item, close the given punch item, and/or send the given punch item to one or more assignees, among other possibilities.

Figure 16D:
FIG. 16D depicts another example of a view that may be presented to a PMC while a punch item is in a dual "Draft"/"Initiated" state.

At this stage of the workflow, the PMC may also be able to access a list of punch items under the responsibility of the PMC that are in the "Initiated" state (and are thus ready to be assigned). One example of such a list is depicted in FIG. 16D, which shows an example punch-list view that is similar to the punch-list view of FIG. 7E. As shown in FIG. 16D, the punch-list view presented to the PMC may include a user interface control such as the "Send 87 Items" control, which may cause all of the PMC's punch items in the "Initiated" phase to be assigned to their respective assignee(s) in a bulk fashion. The punch item management tool may include other views that enable assignment of punch items in the "Initiated" phase as well.

After the state of the given punch item has been transitioned from "Initiated" to "Work Required" and the responsibility for the given punch item has been transitioned from the PMC to the one or more assignees, each assignee of the given punch item may be able to access one or more views of the punch item management tool that allow the assignee to review and/or take other actions with respect to the given punch item while it is in the "Work Required" state, such as indicating that the assignee's respective work on the given punch item either is ready for review by the PMC or remains unresolved. Some possible examples of these views are illustrated in FIGS. 17A-E, which may share similarities with the views illustrated in FIGS. 8A-E.

Figure 17A:
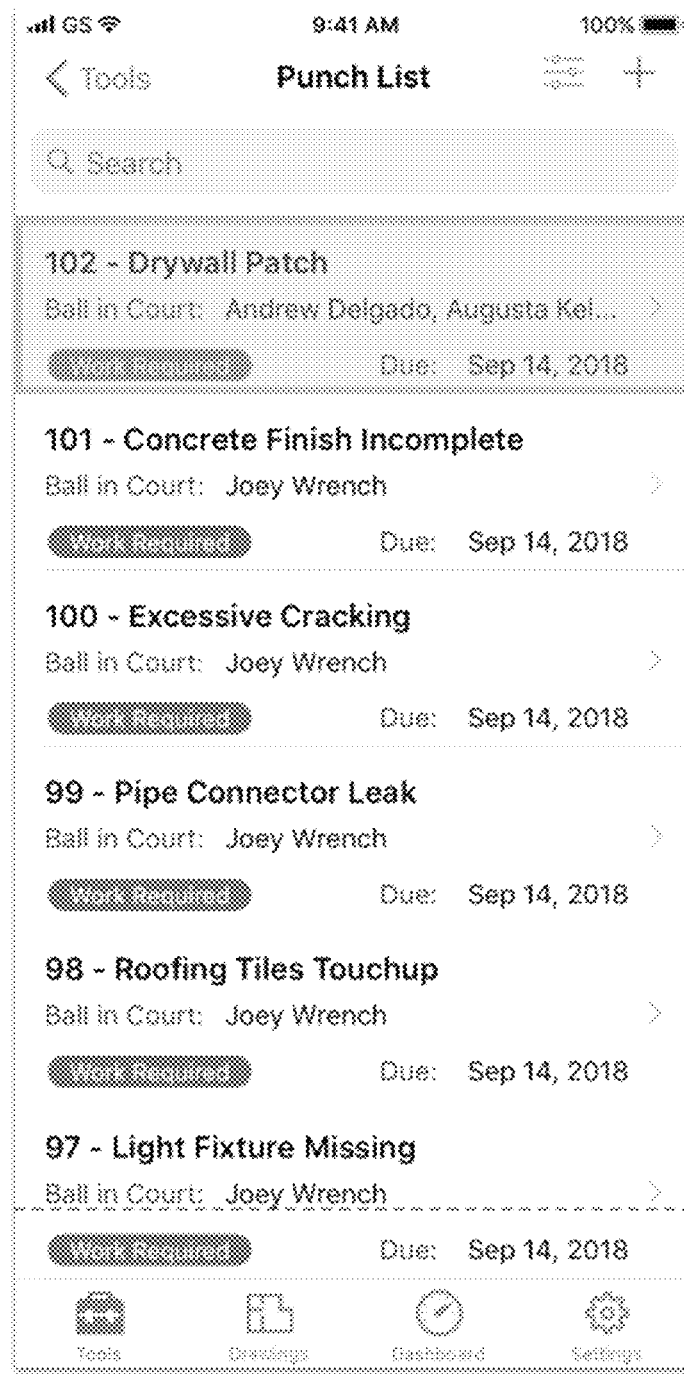
FIG. 17A depicts one example of a view that may be presented to an assignee while a punch item is in a "Work Required" state.

For instance, as with FIG. 8A, FIG. 17A depicts an example punch-list view that may be presented to a particular assignee of the given punch items, such as Daniel McCarthy. As shown, the example punch-list view depicted in FIG. 17A shows a plurality of punch items within an example punch list along with an indication of the state of each work item, which in this example is "Work Required" for each punch item displayed in the list. Additionally, the example punch-list view depicted in FIG. 17A shows the individual(s) having responsibility for the punch items, including the fact that the given punch item has been assigned to a group of assignees that includes Daniel McCarthy. The example punch list may be ordered by due date, or by other factors (such as whether the punch item is high risk, as described in U.S. patent application Ser. No. 16/120,147, the contents of which are incorporated by reference herein). In addition, if a punch item is overdue, the due date may be displayed in a different color (in any of the figures in which a due date appears), and may include an indication of how many days the punch item is overdue. The punch-list view presented to an assignee of a punch item may take various other forms as well.

From the punch-list view of FIG. 17A, an assignee may select and view further details regarding punch items that have been assigned to assignee. For example, a particular assignee of the given punch item (such as Daniel McCarthy) may select the given punch item in the punch-list view, which may trigger the particular assignee's client station to display a punch-item view for the given punch item. One example of such a punch-item view is depicted in FIG. 17B.

Figure 17B:
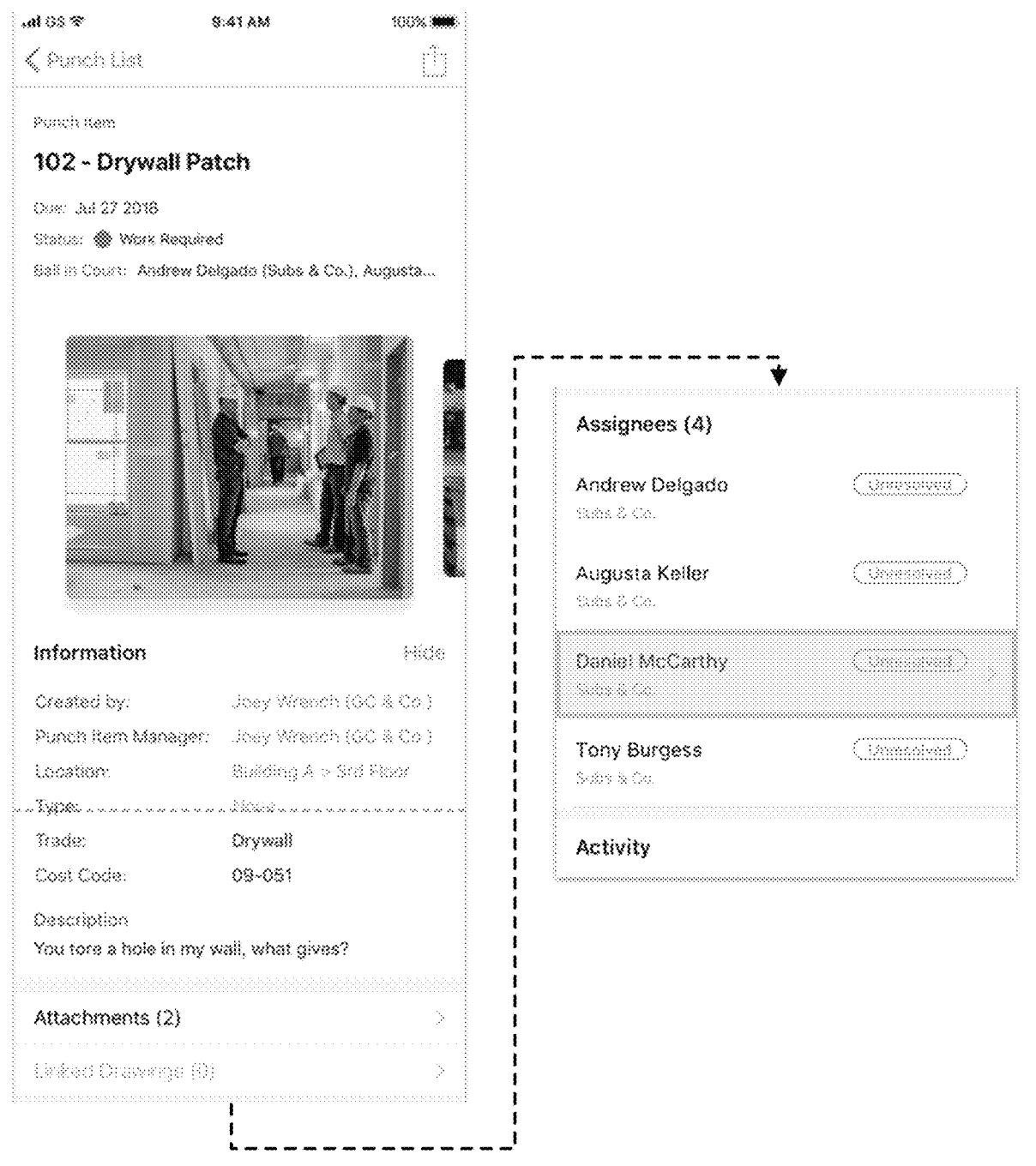
Figure 17C:
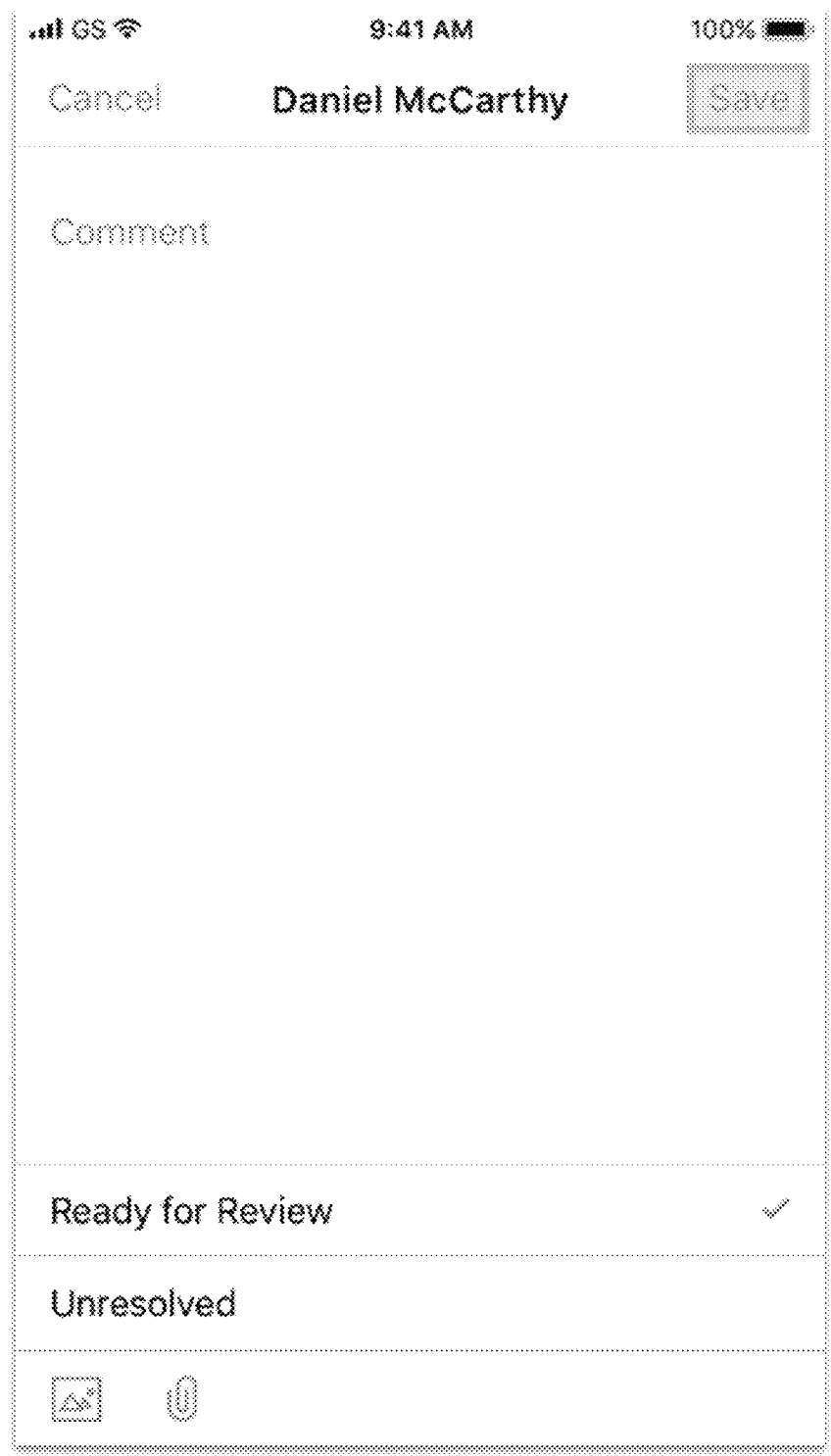
FIG. 17C depicts another example of a view that may be presented to an assignee while a punch item is in a "Work Required" state.
Figure 17D:
FIG. 17D depicts another example of a view that may be presented to an assignee while a punch item is in a "Work Required" state.

As shown in FIG. 17B, the punch-item view presented to the assignee may provide various details regarding the given punch item and may also enable the assignee to select his/her name from the list of assignees for the given punch item, which may in turn cause the assignee's client station to display a review view for the given punch item that enables the assignee to mark that the assignee's respective work on the given punch item either is ready for review or is unresolved. One example of such a review view is depicted in FIG. 17C. As shown in FIG. 17C, this review view for the given punch item may also allow the assignee to leave comments regarding the given punch item for the punch item manager and/or provide attachments for the given punch item, among other possibilities.

If a particular assignee of the given punch item (Daniel McCarthy in this example) decides that the assignee's respective work on the given punch item is ready for review by the punch item manager, that particular assignee may select the "Ready for Review" option in the example view of FIG. 8C and may then select the "Save" control. Thereafter, the particular assignee's client station may send a communication to the back-end platform indicating that the particular assignee has marked the given punch item as ready for review. In turn, the back-end platform may update the data defining the given punch item to reflect that the particular assignee has marked his/her respective work on the given punch item as ready for review.

Further, after the particular assignee selects/saves the "Ready for Review" option for the given punch item, the particular assignee's client station may display an updated punch-item view for the given punch item, which reflects that the particular assignee has marked his/her work on the given punch item as ready for review but that the given punch item is still marked as unresolved for the other assignees. One example of this punch-item view is illustrated in FIG. 8D, which shows that (a) the given punch item's state is still "Work Required" and the responsibility for the given punch item is still with the assignees rather than the PMC, (b) the assignment status for Daniel McCarthy is marked as "Ready for Review," and (c) the assignment status for the other assignees is still marked as "Unresolved."

The other assignees of the given punch item may each be presented with a similar sequence of screens, which may enable each assignee to mark the given punch item as ready to review after the assignee completes his/her work on the given punch item. Each time a different assignee marks his/her respective work on the given punch item as ready for review, the assignee's client station may send a communication to the back-end platform indicating that the assignee has marked his/her respective work on the given punch item as ready for review, and the back-end platform may update the data defining the given punch item to reflect that another assignee has marked his/her respective work on the given punch item as ready for review.

Figure 17E:
FIG. 17E depicts another example of a view that may be presented to an assignee while a punch item is in a "Work Required" state.

Further, once all of the assignees of the given punch item have marked their respective work on the given punch item as ready for review, the back-end platform may determine (and update the data defining the given punch item to reflect) that the state of the given punch item has transitioned from the "Work Required" state to the "Ready for Review" state, and that the responsibility for the given punch item has transitioned from the assignees back to the PMC for the given punch item. Thereafter, each assignee's client station may display an updated punch-item view for the given punch item that reflects the updated state of the given punch item. One example of this punch-item view is illustrated in FIG. 17E, which shows that the status of the given punch item has been changed from "Work Required" to "Ready for Review" and the responsibility for the given punch item has been transitioned back to the PMC for the given punch item.

Once the state of the given punch item has been transitioned from "Work Required" to "Ready for Review" and the responsibility for the given punch item has been transitioned back to the PMC, the PMC may be able to access one or more views of the punch item management tool that allow the PMC to review and/or take other actions with respect to the given punch item while it is in the "Ready for Review" state, such as indicating whether or not the PMC is going to accept the work performed by the assignees on the given punch item. Some possible examples of these views are illustrated in FIGS. 18A-D, which are similar to the views illustrated in FIGS. 9A-D.

Figure 18A:
FIG. 18A depicts one example of a view that may be presented to a PMC while a punch item is in a "Work Not Accepted" state from a "Ready for Review" state.

For instance, FIG. 18A depicts an updated punch-list view that may be presented to the punch item manager at this stage of the workflow, which indicates that the state of the given punch item has been transitioned to "Ready for Review" and that responsibility for the given punch item has again transitioned back to the PMC. From this punch-list view, the PMC may then select the given punch item to review the details of that given punch item, which may cause the PMC's client station to display an updated punch-item view for the given punch item, one example of which is depicted in FIG. 18B.

Figure 18B:
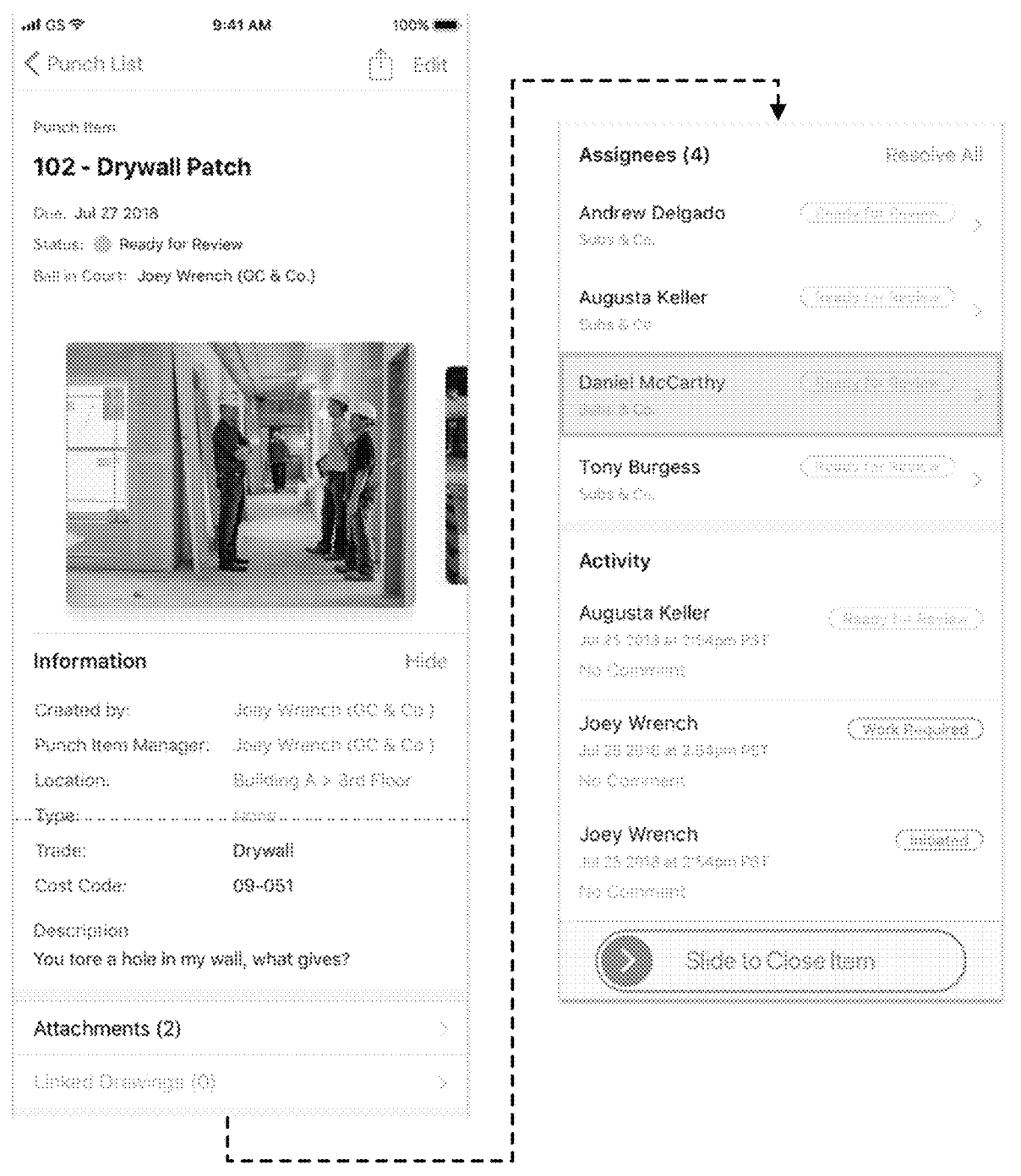

From the punch-item view depicted in FIG. 18B, the PMC may select a particular assignee of the given punch item that has marked his/her respective work as ready to review, which may trigger the PMC's client station to display a review view that enables the PMC to indicate whether or not the work of that particular assignee is accepted. One example of such a review view is depicted in FIG. 18C.

Figure 18C:
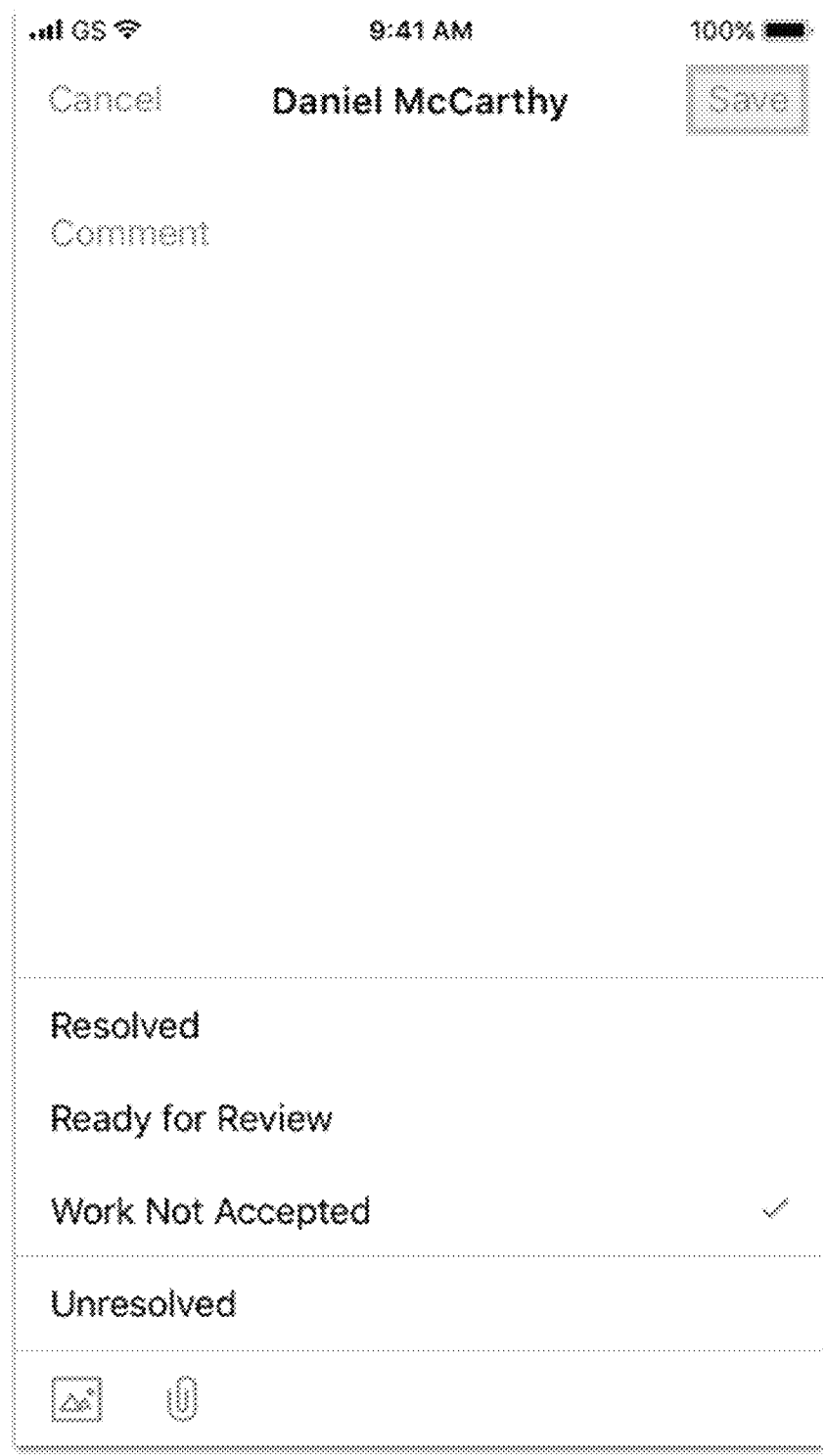
FIG. 18C depicts another example of a view that may be presented to a PMC while a punch item is in a "Work Not Accepted" state from a "Ready for Review" state.

To the extent that the PMC decides not to accept the particular assignee's respective work on the given punch item (e.g., if the punch item manager considers the assignee's work to be unsatisfactory), the PMC may select the "Work Not Accepted" option in the example view of FIG. 18C and may then select the "Save" control. Thereafter, the PMC's client station may send a communication to the back-end platform indicating that the punch item manager has declined to accept the particular assignee's respective work on the given punch item. In turn, the back-end platform may update the data defining the given punch item to reflect that (a) the assignment status for the particular assignee (Daniel McCarthy in this example) has changed from "Ready for Review" to "Work Not Accepted," (b) the state of the given punch item has transitioned from the "Ready for Review" state to a "Work Not Accepted" state, and (c) the responsibility for the given punch item has transitioned from the PMC to the particular assignee for which the work was not accepted.

Figure 18D:
FIG. 18D depicts another example of a view that may be presented to a PMC while a punch item is in a "Work Not Accepted" state from a "Ready for Review" state.

Further, after the PMC selects/saves the "Work Not Accepted" option for the particular assignee of the given punch item, the PMC's client station may display an updated punch-item view for the given punch item that reflects the updated state of the given punch item. One example of this punch-item view is illustrated in FIG. 18D, which shows that (a) the status of the given punch item has been changed from "Ready for Review" to "Work Not Accepted," (b) the responsibility for the given punch item has been transitioned to the particular assignee for which the work was not accepted (Daniel McCarthy in this example), and (c) the assignment status for the particular assignee has changed from "Ready for Review" to "Work Not Accepted."

After the given punch item has been transitioned to the "Work Not Accepted" state, the PMC and/or another administrator may still make changes to the given punch item. For instance, the PMC or another administrator may edit the given punch item, change the assignees for the punch item or close the punch item. The PMC or another administrator may make other changes to a given punch item in the "Work Not Accepted" state as well.

Turning now to the "Work Not Accepted" state, the particular assignee(s) of the given punch item for which the work was not accepted may be able to access one or more views of the punch item management tool that allow the assignee(s) to review and/or take other actions with respect to the given punch item while it is in the "Work Not Accepted" state, such as updating the assignee's assignment status for the given punch item from not accepted back to ready for review. Some possible examples of these views are illustrated in FIGS. 19A-19D.

Figure 19A:
FIG. 19A depicts one example of a view that may be presented to an assignee while a punch item is in a "Work Not Accepted" state.

For instance, FIG. 19A depicts an updated punch-list view that may be presented to a particular assignee of the given punch item (such as Daniel McCarthy in this example) at this stage of the workflow, which indicates that the state of the given punch item has been transitioned to "Work Not Accepted" and that responsibility for the given punch item has transitioned back to the particular assignee. From this updated punch-list view, the particular assignee may then select the given punch item to review the details of that given punch item, which may cause the particular assignee's client station to display an updated punch-item view for the given punch item, one example of which is depicted in FIG. 19B.

Figure 19B:
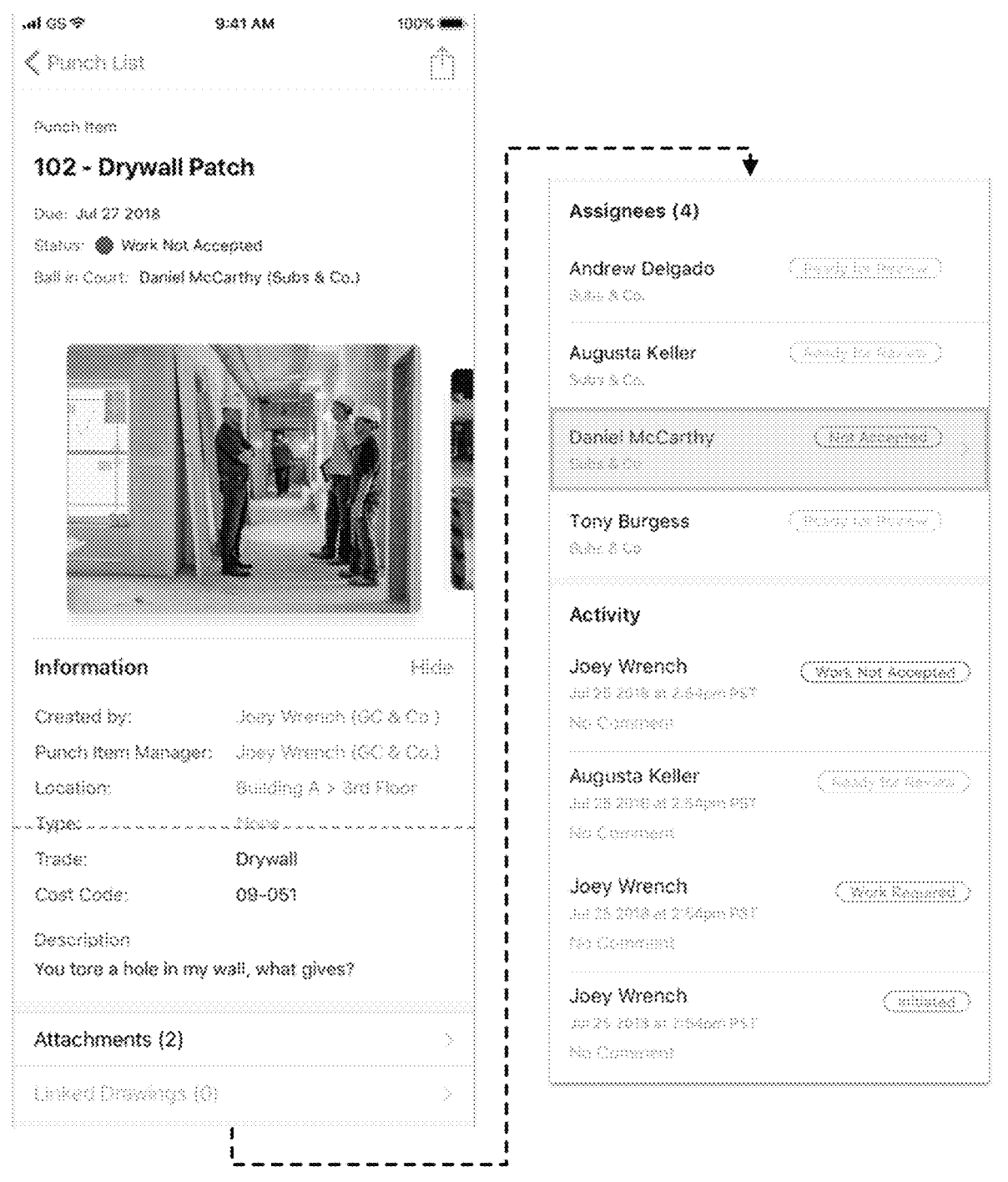
Figure 19C:
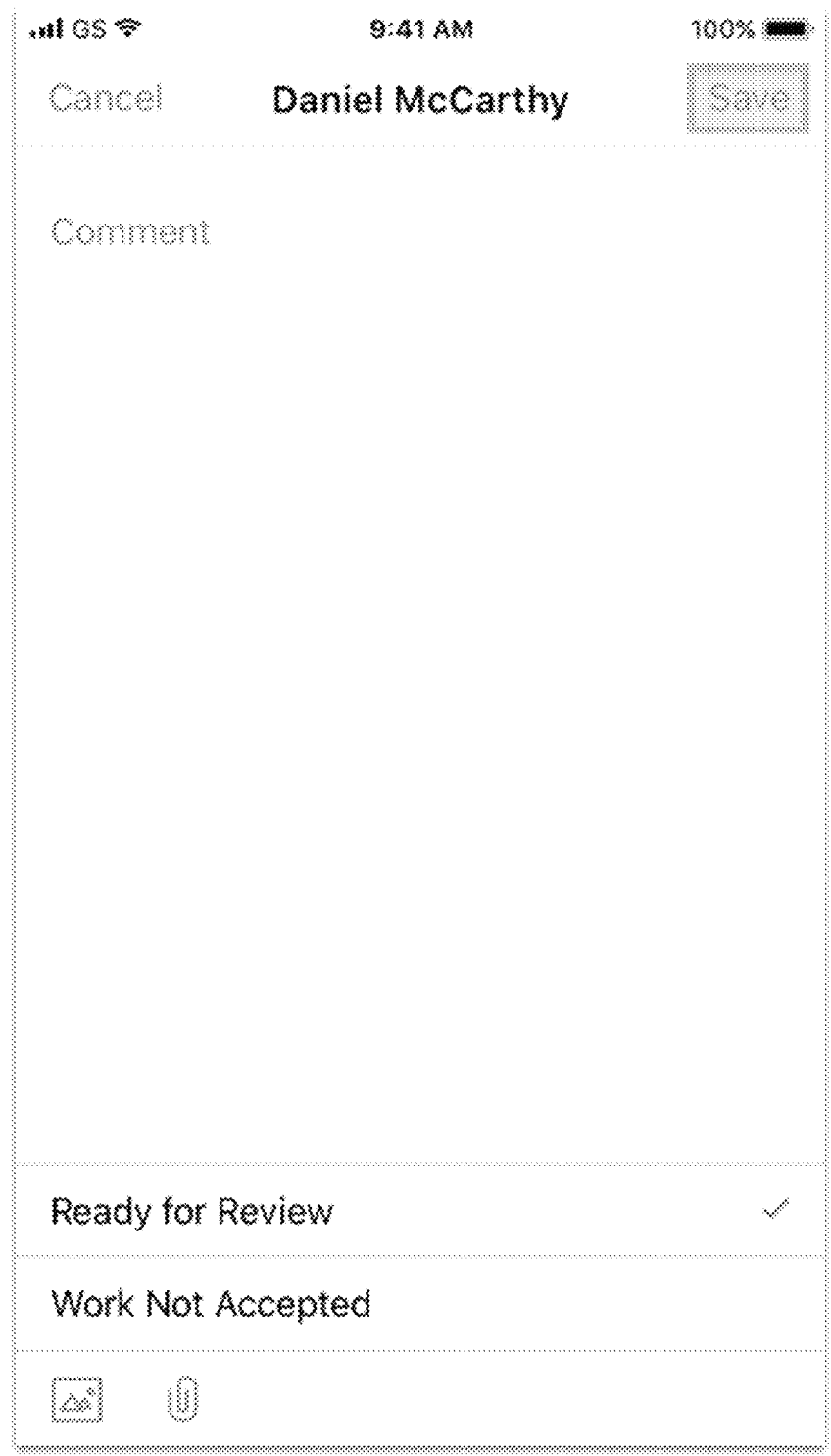
FIG. 19C depicts another example of a view that may be presented to an assignee while a punch item is in a "Work Not Accepted" state.

As shown in FIG. 19B, the updated punch-item view presented to the assignee may provide updated details regarding the given punch item (including the updated status) and may also enable the assignee to select his/her name from the list of assignees for the given punch item, which may in turn cause the assignee's client station to display a review view for the given punch item that enables the assignee to change his/her assignment status for the given punch item from not accepted back to ready for review. One example of such a review view is depicted in FIG. 19C. As shown in FIG. 19C, this review view for the given punch item may also allow the assignee to add comments or attachments to the given punch item, among other possibilities.

If the assignee believes that his/her respective work on the given punch item is acceptable, the assignee may select the "Ready for Review" option in the example view of FIG. 19C and may then select the "Save" control which may trigger the assignee's client station to send a communication to the back-end platform indicating that the particular assignee has again marked his/her respective work on the given punch item as ready for review. In turn, the back-end platform may update the data defining the given punch item to reflect that the particular assignee has again marked his/her respective work on the given punch item as ready for review. Further, if no other assignee's assignment status is designated as "Work Not Accepted," the back-end platform may determine (and update the data defining the given punch item to reflect) that the state of the given punch item has transitioned from the "Work Not Accepted" state back to the "Ready for Review" state, and that the responsibility for the given punch item has transitioned from the particular assignee(s) for which the work was not accepted back to the PMC.

Figure 19D:
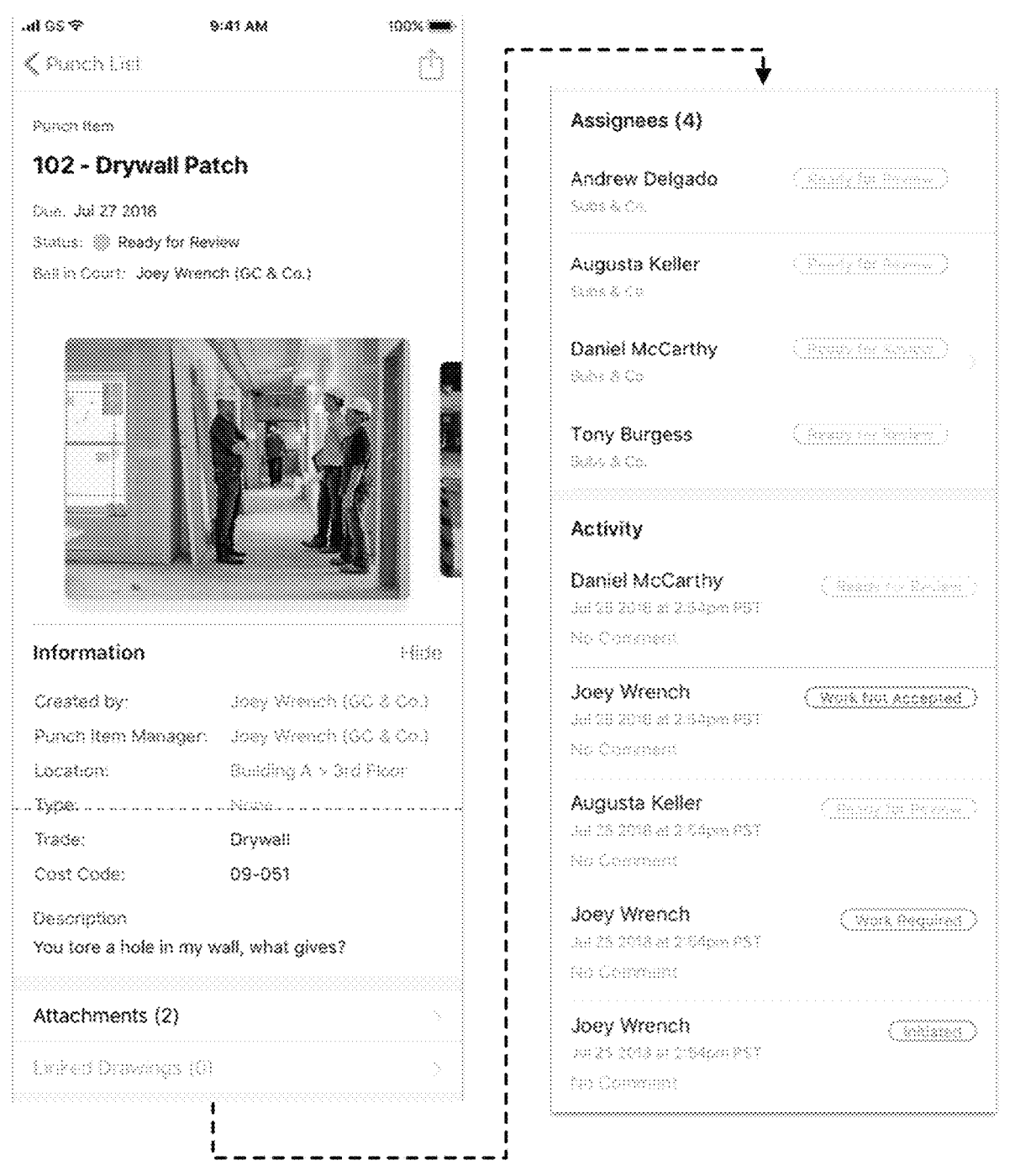

Thereafter, each assignee's client station may display a further updated punch-item view for the given punch item that reflects the further updated state of the given punch item. One example of this punch-item view is illustrated in FIG. 19D, which shows that (a) the status of the given punch item has been changed from "Work Not Accepted" back to "Ready for Review," (b) the responsibility for the given punch item has been transitioned back to the PMC for the given punch item, and (c) the assignment status for the particular assignee for which the work was not accepted (Daniel McCarthy in this example) has changed from "Work Not Accepted" back to "Ready for Review."

Once the given punch item has been transitioned back to the "Ready for Review" state, the PMC of the given punch item may again access one or more views of the punch item management tool that allow the PMC to review and/or take other actions with respect to the given punch item while it is in the "Ready for Review" state, such as indicating whether or not the PMC is going to accept the work performed by the assignees on the given punch item. Some possible examples of these views are illustrated in FIGS. 20A-E, which share similarities with the views illustrated in FIGS. 18A-D.

Figure 20A:
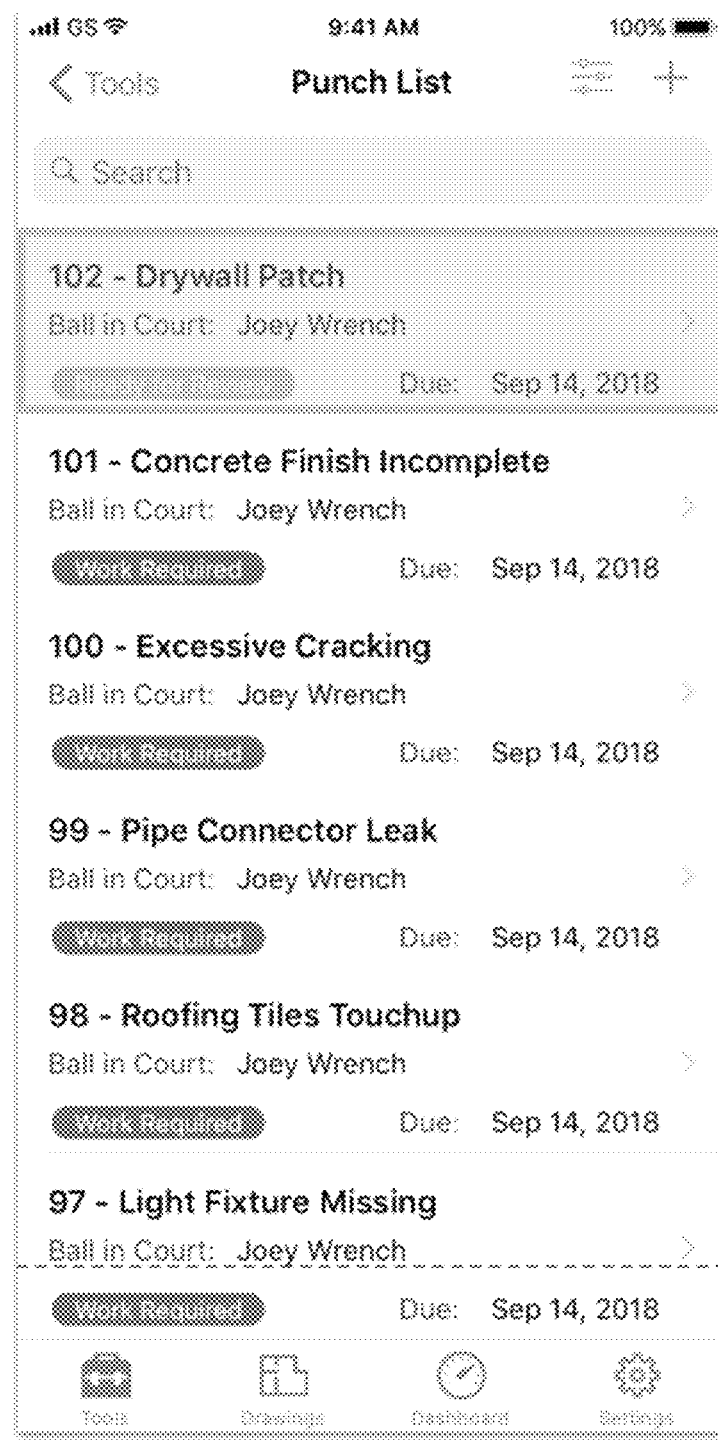
FIG. 20A depicts one example of a view that may be presented to a PMC while a punch item is in a "Ready for Review" state.

For instance, FIG. 20A depicts still another updated punch-list view that may be presented to the PMC, which indicates that the state of the given punch item has been transitioned back to "Ready for Review" and that responsibility for the given punch item has transitioned back to the PMC. From this updated punch-list view, the PMC may then select the given punch item from the punch list to review the details of that given punch item, which may cause the PMC's client station to display another updated punch-item view for the given punch item, one example of which is depicted in FIG. 20B.

Figure 20B:
FIG. 20B depicts another example of a view that may be presented to a PMC while a punch item is in a "Ready for Review" state.

From the punch-item view depicted in FIG. 20B, the PMC may select a particular assignee of the given punch item, which may trigger the PMC's client station to again display a review view that enables the PMC to indicate whether or not the work of that particular assignee is accepted. One example of such a review view is depicted in FIG. 20C, which is similar to the review view depicted in FIG. 18C.

Figure 20C:
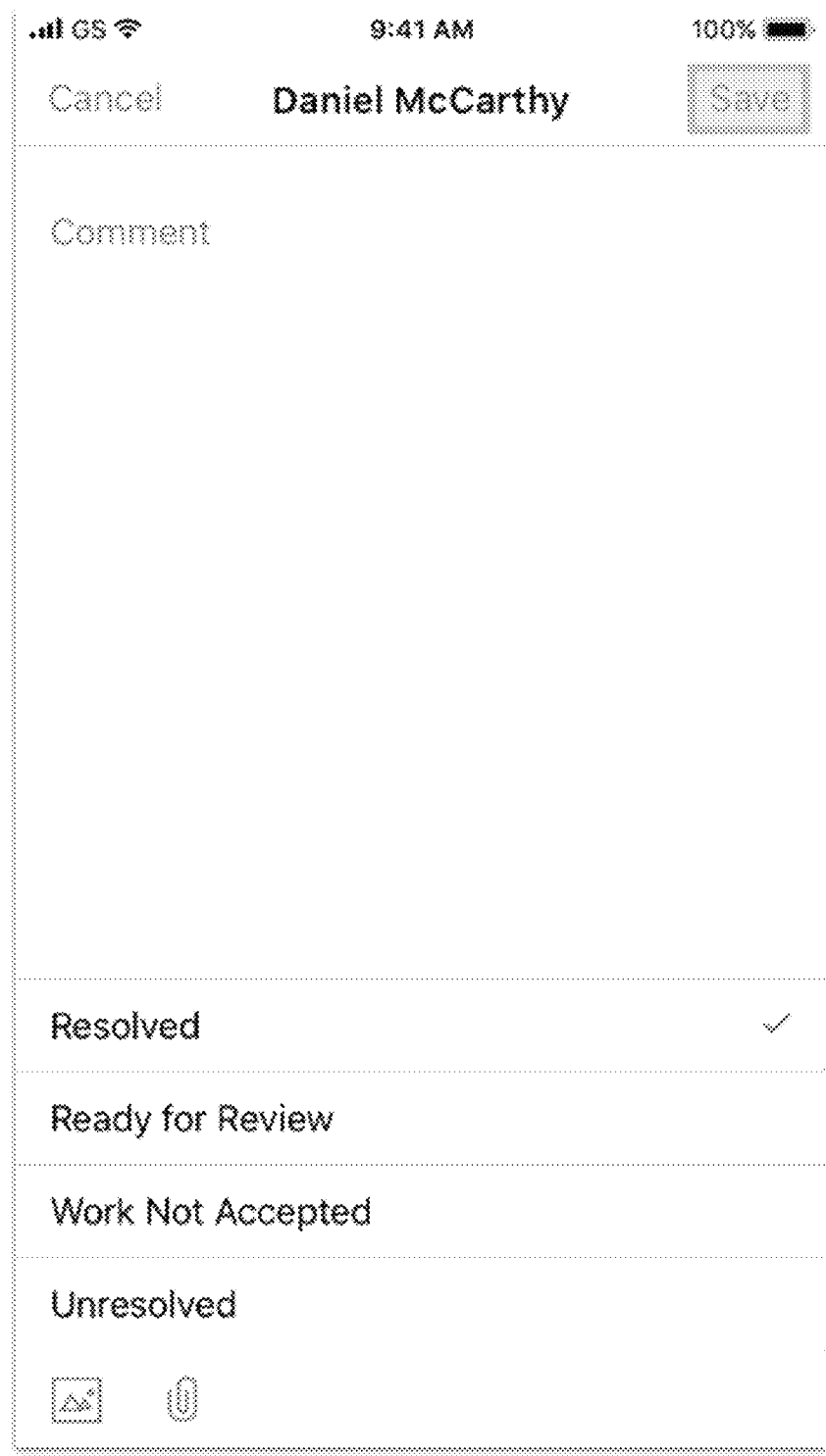
FIG. 20C depicts another example of a view that may be presented to a PMC while a punch item is in a "Ready for Review" state.

If the PMC chooses to accept the particular assignee's work (e.g., if the PMC considers the assignee's work to be satisfactory), the PMC may select the "Resolved" option in the example view of FIG. 20C and may then select the "Save" control, which may trigger the PMC's client station to send a communication to the back-end platform indicating that the punch item manager has accepted the particular assignee's work. In turn, the back-end platform may update the data defining the given punch item to reflect that the PMC has deemed the particular assignee's work to be accepted.

Figure 20D:
FIG. 20D depicts another example of a view that may be presented to a PMC while a punch item is in a "Ready for Review" state.

Further, after the PMC selects/saves the "Resolved" option for the particular assignee of the given punch item, the PMC's client station may display an updated punch-item view for the given punch item, which reflects that the particular assignee's respective work on the given punch item has been accepted but that the respective work of the other assignees on the given punch item has not yet been accepted. One example of this punch-item view is illustrated in FIG. 20D, which shows that (a) the given punch item's state is still "Ready for Review" and the responsibility for the given punch item is still with the PMC, (b) the assignment status for Daniel McCarthy is marked as "Resolved," and (c) the assignment status for the other assignees is still marked as "Ready for Review."

The PMC may then carry out a similar sequence of steps for each of the other assignees, in order to indicate that the PMC has accepted each assignee's respective work on the given punch item. In this respect, each time the PMC indicates that a different assignee's respective work is accepted, the PMC's client station may send a communication to the back-end platform indicating that the PMC has accepted the assignee's respective work on the given punch item, and the back-end platform may update the data defining the given punch item to reflect that the PMC has accepted another assignee's respective work on the given punch item.

Or as another option, as shown in FIG. 20B, the punch-item view presented to the PMC may include a "Resolve All" control, which may enable the PMC to accept the respective work of every assignee of the given punch item in bulk fashion. In this respect, if the PMC selects the "Resolve All" control, the PMC's client station may send a communication to the back-end platform indicating that the PMC has accepted the respective work of every assignee of the given punch item, and the back-end platform may update the data defining the given punch item to reflect that the PMC has accepted every assignee's respective work on the given punch item.

Figure 20E:
FIG. 20E depicts another example of a view that may be presented to a PMC while a punch item is in a "Ready for Review" state.

Once the PMC has accepted the respective work of every assignee of the given punch item (e.g., either one-by-one or in a bulk fashion), the back-end platform may then determine that the state of the given punch item has transitioned from the "Ready for Review" state to the "Ready to Close" state. However, whereas the responsibility for the given punch item at this stage of the "Full" workflow transitioned from the punch item manager back to the creator for the given punch item, the responsibility for the given punch item at this stage of the "PMC" workflow remains with the PMC. Thereafter, the PMC's client station may display an updated punch-item view for the given punch item that reflects the updated state of the given punch item. One example of this punch-item view is illustrated in FIG. 20E, which shows that the status of the given punch item has been changed from "Ready for Review" to "Ready to Close" but that the responsibility for the given punch item has remained with the PMC.

After the given punch item has been transitioned to the "Ready to Close" state, the PMC (or another individual with a "final approver" role) may be able to access one or more views of the punch item management tool that allow the PMC to review and/or take other actions with respect to the given punch item while it is in the "Ready to Close" state, such as indicating that the work performed on the given punch item is deemed acceptable such that the given punch item can be closed. Some possible examples of these views are illustrated in FIGS. 21A-21C.

Figure 21A:
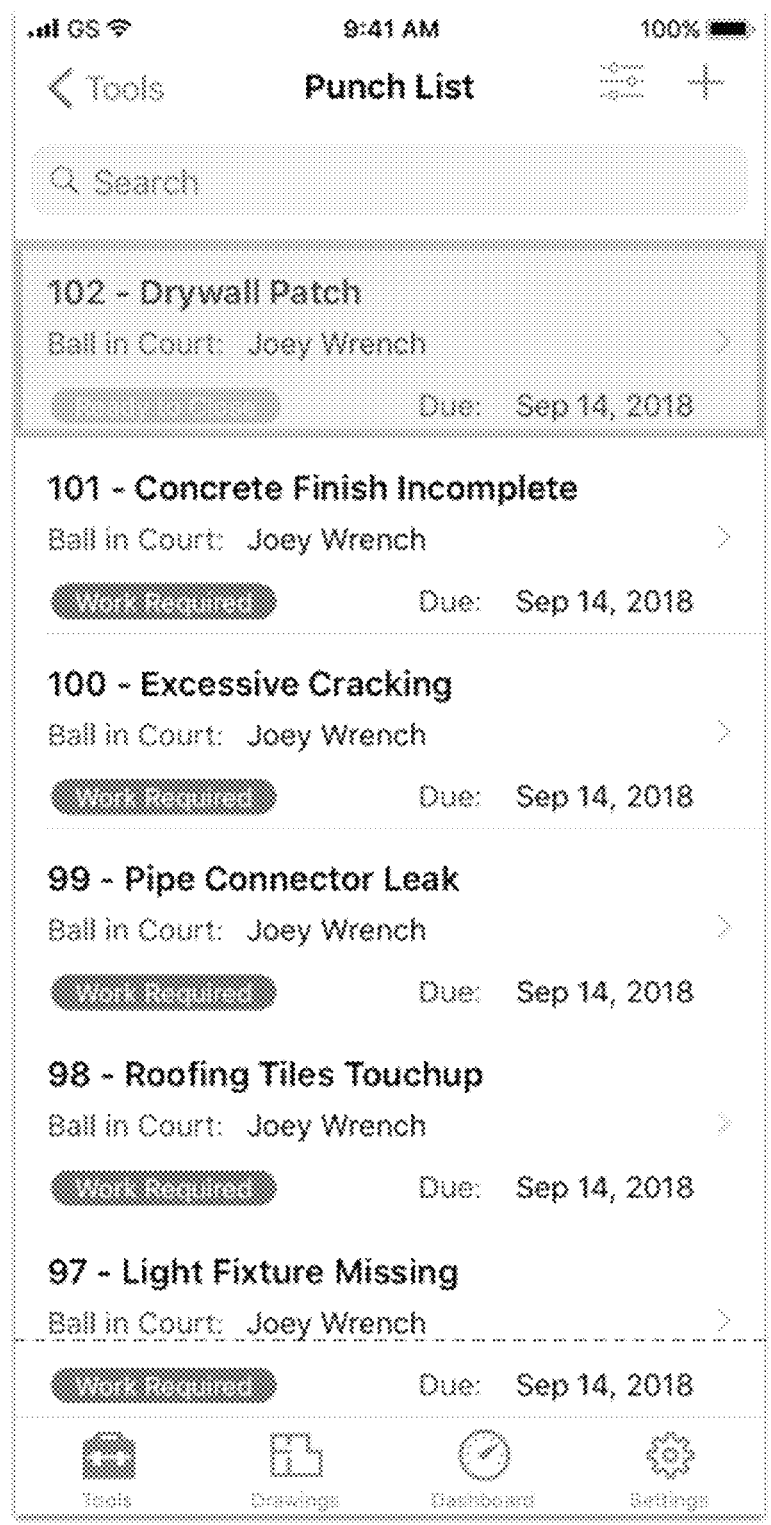
FIG. 21A depicts one example of a view that may be presented to a PMC while a punch item is in a "Ready to Close" state.
Figure 21B:
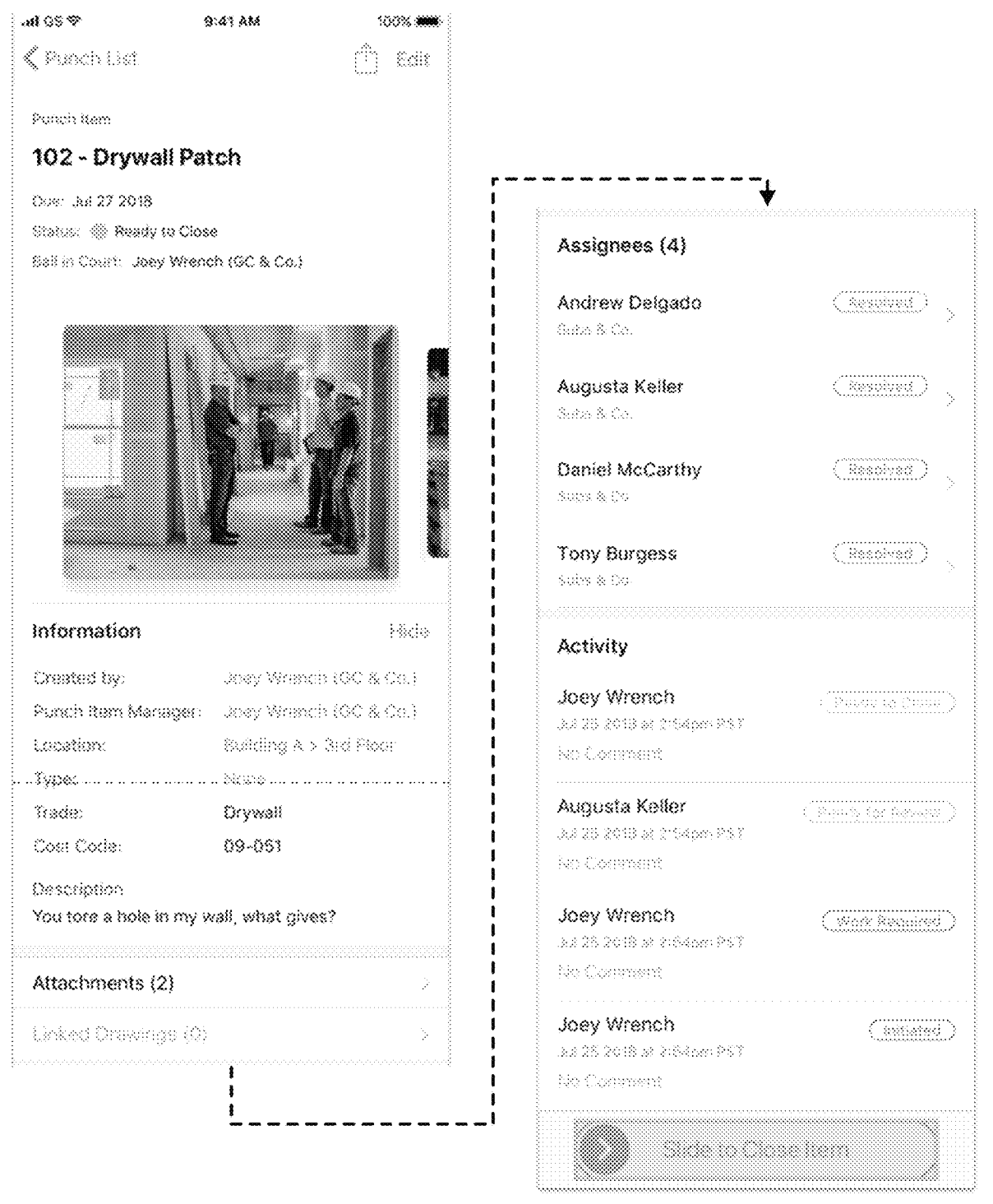
Figure 21C:
FIG. 21C depicts another example of a view that may be presented to a PMC while a punch item is in a "Ready to Close" state.

For instance, FIG. 21A depicts an updated punch-list view that may be presented to the PMC (or another individual with a "final approver" role) at this stage of the workflow, which indicates that the state of the given punch item has been transitioned to "Ready to Close" and that responsibility for the given punch item remains with the PMC. From the punch-list view of FIG. 21A, the PMC may select the given punch item to review the details of that given punch item, which may cause the PMC's client station to display an updated punch-item view for the given punch item. One example of such an updated punch-item view is depicted in FIG. 21B.

As shown in FIG. 21B, the updated punch-item view presented to the PMC may include one or more controls that may be used by the PMC (or another individual with a "final approver" role) to indicate that the PMC believes that the work performed on the given punch item is acceptable enough to close the given punch item. For example, if the PMC believes that the work performed on the given punch item is acceptable such that the given punch item can be closed, the PMC can slide the "Slide to Close Item" control on the updated punch-item view of FIG. 21B, which may trigger the PMC's client station to send a communication to the back-end platform indicating that the PMC has requested that the given punch item be closed. In turn, the back-end platform may determine (and update the data defining the given punch item to reflect) that the state of the given punch item has transitioned from the "Ready to Close" state to the "Closed" state, and that the responsibility for the given punch item has transitioned from the creator to "none" (i.e., no individual has responsibility for the given punch item).

Further, after the PMC requests that the given punch item be closed, the PMC's client station may display a further updated punch-item view for the given punch item that reflects the further updated state of the given punch item. One example of this punch-item view is illustrated in FIG. 21C, which shows that the status of the given punch item has been changed from "Ready to Close" to "Closed" and the responsibility for the given punch item is listed as "none."

Once the given punch item has transitioned to the "Closed" state, the "PMC" workflow for the given punch item is considered to be complete.

While the "PMC" workflow is described as being performed in a given order, it should be understood that the "PMC" workflow may be performed in various other orders as well. Further, the "PMC" workflow may include other states and/or take other forms.

Although not depicted in the figures, the workflows may also be utilized to collect information regarding the performance of a given punch item manager and/or assignee. For example, during (or at the end of) the workflow, a creator and/or a punch manager may access a report to identify which assignees have had unaccepted work, and how many times a given assignee's work was not accepted. As another example, the report may identify which assignees completed punch items on time, or the amount of time that was lost due to a given assignee. The creator/punch manager may use this information to assist in staffing future projects.

Additionally, it should be understood that some users may have expanded roles and the ability to enter information assigned to other parties in the workflow. By way of example, a punch item manager may be able to set an assignee status of a punch item as "Ready to Review." Another example is that tool administrators can set the status of a punch item to "Closed" at any time. Other examples are possible as well.

Additionally yet, it should be understood that a user may have multiple roles on a punch item, and in that case, they assume the role with the most privilege to review/edit/modify/close the item. For example, a user could be an assignee and a punch item manager. In that case, they would have the privileges offered to the punch item manager, which are greater than those offered to the assignee. Other examples are possible as well.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

For instance, those in the art will understand that the disclosed approach for workflows for managing punch items may be implemented in other construction-related areas. The disclosed approach for managing punch items could be used in other contexts as well.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing platform comprising:
a network interface;
at least one processor;
at least one non-transitory computer-readable medium; and
program instructions stored on the at least one non-transitory computer-readable medium that are executable by the at least one processor such that the computing platform is configured to:
receive, from a first client station associated with a creator of a punch item, a request that the punch item be sent to a punch item manager;
based on receiving the request that the punch item be sent to the punch item manager:
  automatically determine that responsibility for the punch item has transitioned from the creator to the punch item manager;
  cause a second client station associated with the punch item manager to (i) display an indication that the punch item manager has responsibility for the punch item and (ii) display one or more user interface (UI) views that enable the punch item manager to input either an indication that the punch item manager disputes the punch item or a request to assign the punch item; and
  receive, from the second client station, a request that the punch item be assigned to an assignee, wherein a third client station of the assignee is restricted from editing any data defining the punch item;
based on receiving the request that the punch item be assigned to the assignee:
  automatically (i) determine that responsibility for the punch item has transitioned from the punch item manager to the assignee, (ii) restrict the first client station associated with the creator from editing data defining the punch item, and (iii) enable the third client station to edit the data defining the punch item;
  cause the third client station to (i) display an indication that the assignee has responsibility for the punch item and (ii) display one or more UI views that enable the assignee to input an indication that work performed by the assignee on the punch item is ready for review; and
  receive, from the third client station, an indication that work performed by the assignee on the punch item is ready for review by the punch item manager;
based on receiving, from the third client station, the indication that the work performed by the assignee on the punch item is ready for review by the punch item manager:
  automatically (i) determine that responsibility for the punch item has transitioned from the assignee back to the punch item manager, and (ii) restrict the third client station from editing any data defining the punch item;
  cause the second client station to (i) display an indication that the punch item manager again has responsibility for the punch item and (ii) display one or more UI views that enable the punch item manager to input an indication that the punch item manager either accepts the work performed by the assignee or declines to accept the work performed by the assignee; and
  receive, from the second client station, an indication that the punch item manager has accepted the work performed by the assignee;
based on receiving the indication that the punch item manager has accepted the work performed by the assignee:
  automatically (i) determine that responsibility for the punch item has transitioned from the punch item manager to a punch item reviewer, wherein a fourth client station of the punch item reviewer is restricted from editing any data defining the punch item, and (ii) enable the fourth client station to edit data defining the punch item;
  cause the fourth client station to (i) display an indication that the punch item reviewer has responsibility for the punch item and (ii) display one or more UI views that enable the punch item reviewer to input an indication that the punch item reviewer either accepts the work performed by the assignee on the punch item such that the punch item can be closed or declines to accept the work performed by the assignee on the punch item; and
  receive, from the fourth client station, an indication that the punch item reviewer accepts the work performed by the assignee on the punch item; and
based on receiving the indication that the punch item reviewer accepts the work performed by the assignee on the punch item, automatically determine that the punch item is closed.

2. The computing platform of claim 1, further comprising program instructions stored on the at least one non-transitory computer-readable medium that are executable by the at least one processor such that the computing platform is configured to:
receive, from the first client station associated with the creator, information defining the punch item.

3. The computing platform of claim 1, further comprising program instructions stored on the at least one non-transitory computer-readable medium that are executable by the at least one processor such that the computing platform is configured to:
after receiving the request that the punch item be sent to the punch item manager, (i) determine that the punch item has transitioned from a draft state to an initiated state and (ii) cause one or both of the first client station or the second client station to display an indication that the punch item has transitioned from the draft state to the initiated state;
after receiving the request that the punch item be assigned to the assignee, (i) determine that the punch item has transitioned from the initiated state to a work-required state and (ii) cause one or more of the second client station or the third client station to display an indication that the punch item has transitioned from the initiated state to the work-required state;
after receiving, from the third client station, the indication that the work performed by the assignee on the punch item is ready for review by the punch item manager, (i) determine that the punch item has transitioned from the work-required state to a ready-for-review state and (ii) cause one or more of the third client station or the second client station to display an indication that the punch item has transitioned from the work-required state to the ready-for-review state; and
after receiving the indication that the punch item manager has accepted the work performed by the assignee, (i) determine that the punch item has transitioned from the ready-for-review state to a ready-to-close state and (ii) cause one or more of the second client station or the first client station to display an indication that the punch item has transitioned from the ready-for-review state to the ready-to-close state.

4. The computing platform of claim 1, further comprising program instructions stored on the at least one non-transitory computer-readable medium that are executable by the at least one processor such that the computing platform is configured to, before receiving the request that the punch item be assigned to the assignee:
  receive, from the second client station, an indication that the punch item manager has disputed the punch item;
  after receiving the indication that the punch item manager has disputed the punch item:
    automatically determine that responsibility for the punch item has transitioned from the punch item manager back to the creator;
    cause the first client station to display an indication that the creator again has responsibility for the punch item; and
    receive, from the first client station, a request to return the punch item to the punch item manager; and
  after receiving the request to return the punch item to the punch item manager, cause the second client station to display an indication that the punch item manager again has responsibility for the punch item.

5. The computing platform of claim 1, further comprising program instructions stored on the at least one non-transitory computer-readable medium that are executable by the at least one processor such that the computing platform is configured to, before receiving the indication that the punch item manager has accepted the work performed by the assignee:
  receive, from the second client station, an indication that the punch item manager has declined to accept the work performed by the assignee;
  after receiving the indication that the punch item manager has declined to accept the work performed by the assignee:
    automatically determine that responsibility for the punch item has transitioned from the punch item manager back to the assignee;
    re-enable the third client station to edit the data defining the punch item;
    cause the third client station to display an indication that the assignee again has responsibility for the punch item; and
    receive, from the third client station, an indication that the work performed by the assignee is again ready for review by the punch item manager; and
  after receiving the indication that the work performed by the assignee is again ready for review by the punch item manager, (i) restrict the third client station from editing any data defining the punch item and (ii) cause the second client station to display an indication that the punch item manager again has responsibility for the punch item.

6. The computing platform of claim 1, further comprising program instructions stored on the at least one non-transitory computer-readable medium that are executable by the at least one processor such that the computing platform is configured to, before receiving the indication that the punch item reviewer accepts the work performed by the assignee on the punch item:
  receive, from the fourth client station, an indication that the punch item reviewer has declined to accept the work performed by the assignee on the punch item in its current state;
  after receiving the indication that the punch item reviewer has declined to accept the work performed by the assignee on the punch item in its current state:
    automatically determine that responsibility for the punch item has transitioned from the punch item reviewer back to the punch item manager;
    cause the second client station to display an indication that the punch item manager again has responsibility for the punch item; and
    receive, from the second client station, a request that the punch item be sent back to the assignee;
  after receiving the request that the punch item be sent back to the assignee:
    automatically determine that responsibility for the punch item has transitioned from the punch item manager back to the assignee;
    restrict the fourth client station associated with the punch item reviewer from editing data defining the punch item;
    re-enable the third client station to edit the data defining the punch item;
    cause the third client station to display an indication that the assignee again has responsibility for the punch item; and
    receive, from the third client station, an indication that the work performed by the assignee is again ready for review by the punch item manager;
  after receiving the indication that the work performed by the assignee is again ready for review by the punch item manager:
    automatically determine that responsibility for the punch item has again transitioned from the assignee back to the punch item manager;
    restrict the third client station from editing any data defining the punch item;
    cause the second client station to display an indication that the punch item manager again has responsibility for the punch item; and
    receive, from the second client station, an indication that the punch item manager has again accepted the work performed by the assignee; and
  after receiving the indication that the punch item manager has again accepted the work performed by the assignee, (i) re-enable the fourth client station associated with the punch item reviewer to edit the data defining the punch item and (ii) cause the fourth client station to display an indication that the punch item reviewer again has responsibility for the punch item.

7. The computing platform of claim 1, wherein the request that the punch item be sent to the punch item manager is received as part of a bulk request to send a plurality of punch items created by the creator to the punch item manager.

8. The computing platform of claim 1, wherein the request that the punch item be assigned to the assignee is received as part of a bulk request to assign a plurality of punch items for which the punch item manager has responsibility.

9. The computing platform of claim 1, further comprising program instructions stored on the at least one non-transitory computer-readable medium that are executable by the at least one processor such that the computing platform is configured to:
  based on receiving the request that the punch item be sent to the punch item manager, update the data defining the punch item to indicate a first change in the punch item's state;
  based on receiving the request that the punch item be assigned to the assignee, update the data defining the punch item to indicate a second change in the punch item's state;
  based on receiving the indication that the work performed by the assignee on the punch item is ready for review by the punch item manager, update the data defining the punch item to indicate a third change in the punch item's state;

based on receiving the indication that the punch item manager has accepted the work performed by the assignee, update the data defining the punch item to indicate a fourth change in the punch item's state;

based on receiving the indication that the punch item reviewer accepts the work performed by the assignee on the punch item, update the data defining the punch item to indicate a fifth change in the punch item's state; and automatically generate a log for the punch item comprising each change to the punch item's state, wherein the log is viewable by at least the second client station associated with the punch item manager.

10. The computing platform of claim 1, wherein the program instructions that are executable by the at least one processor such that the computing platform is configured to restrict the first client station associated with the creator from editing data defining the punch item comprise program instructions that are executable by the at least one processor such that the computing platform is configured to restrict the first client station associated with the creator from editing any data defining the punch item.

11. The computing platform of claim 1, wherein the program instructions that are executable by the at least one processor such that the computing platform is configured to restrict the first client station associated with the creator from editing data defining the punch item comprise program instructions that are executable by the at least one processor such that the computing platform is configured to restrict the first client station associated with the creator from editing data defining the punch item such that the first client station associated with the creator is enabled to close the punch item but is restricted from editing any other data defining the punch item.

12. The computing platform of claim 1, wherein the creator of the punch item is the punch item reviewer, and wherein the first client station comprises the fourth client station.

13. A non-transitory computer-readable medium, wherein the non-transitory computer-readable medium is provisioned with program instructions that, when executed by at least one processor, cause a computing platform to:

receive, from a first client station associated with a creator of a punch item, a request that the punch item be sent to a punch item manager;

based on receiving the request that the punch item be sent to the punch item manager:
  automatically determine that responsibility for the punch item has transitioned from the creator to the punch item manager;
  cause a second client station associated with the punch item manager to (i) display an indication that the punch item manager has responsibility for the punch item and (ii) display one or more user interface (UI) views that enable the punch item manager to input either an indication that the punch item manager disputes the punch item or a request to assign the punch item; and
  receive, from the second client station, a request that the punch item be assigned to an assignee, wherein a third client station of the assignee is restricted from editing any data defining the punch item;

based on receiving the request that the punch item be assigned to the assignee:
  automatically (i) determine that responsibility for the punch item has transitioned from the punch item manager to the assignee, (ii) restrict the first client station associated with the creator from editing data defining the punch item, and (iii) enable the third client station to edit the data defining the punch item;
  cause the third client station to (i) display an indication that the assignee has responsibility for the punch item and (ii) display one or more UI views that enable the assignee to input an indication that work performed by the assignee on the punch item is ready for review; and
  receive, from the third client station, an indication that work performed by the assignee on the punch item is ready for review by the punch item manager;

based on receiving, from the third client station, the indication that the work performed by the assignee on the punch item is ready for review by the punch item manager:
  automatically (i) determine that responsibility for the punch item has transitioned from the assignee back to the punch item manager, and (ii) restrict the third client station from editing any data defining the punch item;
  cause the second client station to (i) display an indication that the punch item manager again has responsibility for the punch item and (ii) display one or more UI views that enable the punch item manager to input an indication that the punch item manager either accepts the work performed by the assignee or declines to accept the work performed by the assignee; and
  receive, from the second client station, an indication that the punch item manager has accepted the work performed by the assignee;

based on receiving the indication that the punch item manager has accepted the work performed by the assignee:
  automatically (i) determine that responsibility for the punch item has transitioned from the punch item manager to a punch item reviewer, wherein a fourth client station of the punch item reviewer is restricted from editing any data defining the punch item, and (ii) enable the fourth client station to edit data defining the punch item;
  cause the fourth client station to (i) display an indication that the punch item reviewer has responsibility for the punch item and (ii) display one or more UI views that enable the punch item reviewer to input an indication that the punch item reviewer either accepts the work performed by the assignee on the punch item such that the punch item can be closed or declines to accept the work performed by the assignee on the punch item; and
  receive, from the fourth client station, an indication that the punch item reviewer accepts the work performed by the assignee on the punch item; and based on receiving the indication that the punch item reviewer accepts the work performed by the assignee on the punch item, automatically determine that the punch item is closed.

14. The non-transitory computer-readable medium of claim 13, wherein the non-transitory computer-readable medium is also provisioned with program instructions that, when executed by at least one processor, cause the computing platform to:

receive, from the first client station associated with the creator, information defining the punch item.

15. The non-transitory computer-readable medium of claim 13, wherein the non-transitory computer-readable medium is also provisioned with program instructions that, when executed by at least one processor, cause the computing platform to:
   after receiving the request that the punch item be sent to the punch item manager, (i) determine that the punch item has transitioned from a draft state to an initiated state and (ii) cause one or both of the first client station or the second client station to display an indication that the punch item has transitioned from the draft state to the initiated state;
   after receiving the request that the punch item be assigned to the assignee, (i) determine that the punch item has transitioned from the initiated state to a work-required state and (ii) cause one or more of the second client station or the third client station to display an indication that the punch item has transitioned from the initiated state to the work-required state;
   after receiving, from the third client station, the indication that the work performed by the assignee on the punch item is ready for review by the punch item manager, (i) determine that the punch item has transitioned from the work-required state to a ready-for-review state and (ii) cause one or more of the third client station or the second client station to display an indication that the punch item has transitioned from the work-required state to the ready-for-review state; and
   after receiving the indication that the punch item manager has accepted the work performed by the assignee, (i) determine that the punch item has transitioned from the ready-for-review state to a ready-to-close state and (ii) cause one or more of the second client station or the first client station to display an indication that the punch item has transitioned from the ready-for-review state to the ready-to-close state.

16. The non-transitory computer-readable medium of claim 13, wherein the non-transitory computer-readable medium is also provisioned with program instructions that, when executed by at least one processor, cause the computing platform to, before receiving the request that the punch item be assigned to the assignee:
   receive, from the second client station, an indication that the punch item manager has disputed the punch item;
   after receiving the indication that the punch item manager has disputed the punch item:
      automatically determine that responsibility for the punch item has transitioned from the punch item manager back to the creator;
      cause the first client station to display an indication that the creator again has responsibility for the punch item; and
      receive, from the first client station, a request to return the punch item to the punch item manager; and
   after receiving the request to return the punch item to the punch item manager, cause the second client station to display an indication that the punch item manager again has responsibility for the punch item.

17. The non-transitory computer-readable medium of claim 13, wherein the non-transitory computer-readable medium is also provisioned with program instructions that, when executed by at least one processor, cause the computing platform to, before receiving the indication that the punch item manager has accepted the work performed by the assignee:
   receive, from the second client station, an indication that the punch item manager has declined to accept the work performed by the assignee;
   after receiving the indication that the punch item manager has declined to accept the work performed by the assignee:
      automatically determine that responsibility for the punch item has transitioned from the punch item manager back to the assignee;
      re-enable the third client station to edit the data defining the punch item;
      cause the third client station to display an indication that the assignee again has responsibility for the punch item; and
      receive, from the third client station, an indication that the work performed by the assignee is again ready for review by the punch item manager; and
   after receiving the indication that the work performed by the assignee is again ready for review by the punch item manager, (i) restrict the third client station from editing any data defining the punch item and (ii) cause the second client station to display an indication that the punch item manager again has responsibility for the punch item.

18. The non-transitory computer-readable medium of claim 13, wherein the non-transitory computer-readable medium is also provisioned with program instructions that, when executed by at least one processor, cause the computing platform to, before receiving the indication that the punch item reviewer accepts the work performed by the assignee on the punch item:
   receive, from the fourth client station, an indication that the punch item reviewer has declined to accept the work performed by the assignee on the punch item in its current state;
   after receiving the indication that the punch item reviewer has declined to accept the work performed by the assignee on the punch item in its current state:
      automatically determine that responsibility for the punch item has transitioned from the punch item reviewer back to the punch item manager;
      cause the second client station to display an indication that the punch item manager again has responsibility for the punch item; and
      receive, from the second client station, a request that the punch item be sent back to the assignee;
   after receiving the request that the punch item be sent back to the assignee:
      automatically determine that responsibility for the punch item has transitioned from the punch item manager back to the assignee;
      restrict the fourth client station associated with the punch item reviewer from editing data defining the punch item;
      re-enable the third client station to edit the data defining the punch item;
      cause the third client station to display an indication that the assignee again has responsibility for the punch item; and
      receive, from the third client station, an indication that the work performed by the assignee is again ready for review by the punch item manager;
   after receiving the indication that the work performed by the assignee is again ready for review by the punch item manager:

automatically determine that responsibility for the punch item has again transitioned from the assignee back to the punch item manager;

restrict the third client station from editing any data defining the punch item;

cause the second client station to display an indication that the punch item manager again has responsibility for the punch item; and receive, from the second client station, an indication that the punch item manager has again accepted the work performed by the assignee; and after receiving the indication that the punch item manager has again accepted the work performed by the assignee, (i) re-enable the fourth client station associated with the punch item reviewer to edit the data defining the punch item and (ii) cause the fourth client station to display an indication that the punch item reviewer again has responsibility for the punch item.

19. The non-transitory computer-readable medium of claim 13, wherein the request that the punch item be sent to the punch item manager is received as part of a bulk request to send a plurality of punch items created by the creator to the punch item manager.

20. A method implemented by a computing platform, the method comprising:

receiving, from a first client station associated with a creator of a punch item, a request that the punch item be sent to a punch item manager;

based on receiving the request that the punch item be sent to the punch item manager:

automatically determining that responsibility for the punch item has transitioned from the creator to the punch item manager;

causing a second client station associated with the punch item manager to (i) display an indication that the punch item manager has responsibility for the punch item and (ii) display one or more user interface (UI) views that enable the punch item manager to input either an indication that the punch item manager disputes the punch item or a request to assign the punch item; and receiving, from the second client station, a request that the punch item be assigned to an assignee, wherein a third client station of the assignee is restricted from editing any data defining the punch item;

based on receiving the request that the punch item be assigned to the assignee:

automatically (i) determining that responsibility for the punch item has transitioned from the punch item manager to the assignee, (ii) restricting the first client station associated with the creator from editing data defining the punch item, and (iii) enabling the third client station to edit the data defining the punch item;

causing the third client station to (i) display an indication that the assignee has responsibility for the punch item and (ii) display one or more UI views that enable the assignee to input an indication that work performed by the assignee on the punch item is ready for review; and receiving, from the third client station, an indication that work performed by the assignee on the punch item is ready for review by the punch item manager;

based on receiving, from the third client station, the indication that the work performed by the assignee on the punch item is ready for review by the punch item manager:

automatically (i) determining that responsibility for the punch item has transitioned from the assignee back to the punch item manager, and (ii) restricting the third client station from editing any data defining the punch item;

causing the second client station to (i) display an indication that the punch item manager again has responsibility for the punch item and (ii) display one or more UI views that enable the punch item manager to input an indication that the punch item manager either accepts the work performed by the assignee or declines to accept the work performed by the assignee; and receiving, from the second client station, an indication that the punch item manager has accepted the work performed by the assignee;

based on receiving the indication that the punch item manager has accepted the work performed by the assignee:

automatically (i) determining that responsibility for the punch item has transitioned from the punch item manager to a punch item reviewer, wherein a fourth client station of the punch item reviewer is restricted from editing any data defining the punch item, and (ii) enabling the fourth client station to edit data defining the punch item;

causing the fourth client station to (i) display an indication that the punch item reviewer has responsibility for the punch item and (ii) display one or more UI views that enable the punch item reviewer to input an indication that the punch item reviewer either accepts the work performed by the assignee on the punch item such that the punch item can be closed or declines to accept the work performed by the assignee on the punch item; and receiving, from the fourth client station, an indication that the punch item reviewer accepts the work performed by the assignee on the punch item; and based on receiving the indication that the punch item reviewer accepts the work performed by the assignee on the punch item, automatically determining that the punch item is closed.

* * * * *